United States Patent [19]
Cushman et al.

[11] 3,779,070
[45] Dec. 18, 1973

[54] PARTICLE SIZE AND PERCENT SOLIDS MONITOR

[75] Inventors: Charles R. Cushman, Golden, Colo.; James C. Hale, Pea Ridge, Ark.; Vernon A. Anderson, Boulder, Colo.

[73] Assignee: Autometrics Co., Boulder, Colo.

[22] Filed: Nov. 23, 1971

[21] Appl. No.: 201,504

Related U.S. Application Data

[63] Continuation-in-part of Ser. No. 866,976, Oct. 16, 1969, abandoned.

[52] U.S. Cl. .................................... 73/432 PS
[51] Int. Cl. .................................... G01n 15/00
[58] Field of Search .................. 73/432 PS, 61 R

[56] References Cited
UNITED STATES PATENTS
3,133,445   5/1964   Richard .................... 73/432 PS
3,220,261   11/1965  Kriebel .................... 73/432 PS FOREIGN PATENTS OR APPLICATIONS
1,197,130   6/1959   France ..................... 73/61
205,356     1/1968   U.S.S.R. .................. 73/432 PS Primary Examiner—S. Clement Swisher
Attorney—Anderson, Spangler & Wymore

[57] ABSTRACT

This invention relates to a method and apparatus for developing signals representative of the size and number of particles, such as ore in a slurry. In a preferred form, the invention comprises directing two beams of ultrasonic energy through the slurry, each beam operating at a different frequency and with the beam frequencies so chosen that the attenuation of each beam is a different function of the percent solids by volume, the geometric means particle diameter, the standard deviation of the distribution of the particles and the largest sized particles in the slurry. The two signals resulting therefrom are compared and processed electronically so as to provide two output signals, one of which indicates the particle size and the other, the percent solids by volume in the slurry.

57 Claims, 40 Drawing Figures

INCREASED PERCENT SOLIDS →

INCREASINGLY COARSE →

INCREASINGLY COARSE →

INVENTORS
CHARLES R. CUSHMAN
JAMES C. HALE
VERNON A. ANDERSON

Anderson, Spangler & Wymore
ATTORNEYS

PARTICLE SIZE AND PERCENT SOLIDS MONITOR

This application discloses and claims subject matter in common with application for U.S. Letters Patent Ser. No. 866,976 filed Oct. 16, 1969, now abandoned for "PARTICLE SIZE AND PERCENT SOLIDS MONITOR" of which this application is a continuation-in-part assigned to the same assignee.

The field of the invention is directed to a process where it is desirable to monitor the particle size distribution of solids in a slurry under dynamic conditions and determine the deviation, if any, of the actual particle size distribution in a process flowstream from a predetermined particle size distribution. While the invention may have utility in any situation where it is desirable to determine the change of particle size distribution of solids in a slurry in processes such as grinding, sizing, separating, recovery and/or treating of materials, the invention is particularly useful in the mining and milling industry. Further, the development of an electrical signal which is a function of the amount and direction of deviation, permits the control, correction and maintenance of a predetermined particle size distribution.

The mining and milling industry is presently engaged in a rapid transition toward automating their processes. The milling of mined ores is especially important because it is the most costly of the processes by which valuable mineral is recovered from ore. The efficiency of the milling process is therefore of extreme importance. The size of the particles to which the ore is ground is one of the most important considerations for controlling the operation of a modern mill circuit. There is usually a particular distribution of particle size that represents the best compromise between the cost of making a further size reduction and the amount of additional mineral that will be liberated by so doing. Accurate, continuous determination of particle size distribution in the milled ore slurry would enable more efficient control of the grinding circuit by either manual or automatic means. No such instrumentation has previously been made to operate successfully. Present methods for determining particle size are not continuous and are too slow. Screen analysis of the product is the only reliable method now used. This requires the removal of a representative sample from the flowstream and a laboratory analysis to determine the particle size distribution. On the basis of these results, the equipment is adjusted to bring it closer to the optimum particle size. Because of practical limitations, these tests are seldom if ever run more than a few tests a shift.

These infrequent adjustments mean that the equipment can run for many hours producing a product that is not of the desired particle size. Producing too fine a product is known as over-grinding and too coarse is termed under-grinding; either case produces inefficiencies in subsequent concentration processes. Under-grinding produces particles that may be too large to liberate the desired mineral. Also, where concentration of the milled, mineral-bearing ore is accomplished by froth flotation, too-large particles may be lost due to the inability of the attached bubbles to lift the greater weight. Over-grinding produces a relatively high proportion of particles that are so small that the time to recover those containing minerals becomes very long. Since the time to accomplish separation must be held to a practical minimum, in order to achieve a satisfactory output rate, many of these very small particles of mineral-bearing ore will not be recovered, which will reduce the overall efficiency of the ore concentration process. Because of the increased surface area of the very small particles, more reagent, at increased expense, is required to achieve selective flotation of the mineral-bearing ore. When additional reagent is used to compensate for the undersized particles, the selectivity of the process often suffers, thus reducing the overall efficiency of mineral recovery.

In the production of concentrated iron ore pellets, the ore is milled to a size that is determined more by the compacting characteristics of the particles of ore than by efficiency of separation, which may be accomplished magnetically. The pellets must retain their shape during shipment to eliminate waste in handling; particle size has a very prominent effect on the strength of the compacted pellets.

Also, in all milling operations, wear, power consumption and time-to-grind are major contributors to cost, and so there is a strong motivation on the part of mill operators to grind only as long as necessary. In order to determine this they need to have a direct and current indication of the size distribution of the particles they are producing compared to the optimum particle size distribution.

Most mill operators attempt to control the equipment in their mill circuit to maintain an output to flotation (or other concentration means) having an optimum particle size distribution. Measurement of particle size distribution is made by removing one or more samples from the flowstream, often between the classifier and flotation, and performing a screen analysis thereon. A screen analysis involves a series of procedures by which a measurement is made of the proportion of the sample that remains on each of several screens having progressively smaller openings of known size. While this kind of measurement can provide a reasonably accurate determination of particle size distribution, it is representative only of the particular sample taken, and cannot accurately and reliably indicate either the average condition in the flowstream over a period of time, or the changes that occur between sampling. Therefore, this technique does not lend itself to precise control of the milling circuit by either manual or automatic control methods.

As an example of methods previously tried, attempts have been made to use the percent by weight of solids present in the slurry flowing from classifier to flotation as an indicator of particle size. However, because the relationship between percent by weight of solids and particle size is not consistent, this method of determining particle size has proven unreliable.

It is apparent that the mining and milling industry needs an instrument that is sensitive substantially only to the size of particles and can make continuous measurements. Only this type of instrument will enable precise control of the milling circuit, to maintain optimum efficiency of the milling and flotation processes. One method of controlling a mill circuit would involve sensing the particle size distribution in the slurry prior to flotation and regulating the amount of unmilled ore being delivered to the circuit on the basis of the difference between measured and optimum particle size. This method is often effective because the hardness or grindability of ore coming into the mill frequently changes, requiring an appropriate variation of the time to mill the ore to the desired particle size. This kind of control can be very effective in regulating the size of particles of ore going to flotation, and thus can enable improvement in the efficiency of ore recovery.

It is a primary objective of the present invention to provide an improved particle size monitoring apparatus and method which is sensitive substantially only to changes in size parameters, with instrument operating frequencies chosen to achieve good correlation to the size distribution of the sample over a predetermined percent solids range.

It is a further object of the invention to provide an apparatus and method of monitoring the magnitude and direction of change in the particle size distribution of a slurry, which method is only minimally affected by changes in the specific gravity and/or the amount of solids in the slurry.

It is a further object of the invention to provide an improved particle size monitoring apparatus which is stable, consistent and reliable under all normal conditions of mill circuit operation, and which provides a sufficiently well damped signal to avoid causing hunting of automatic control systems, and is therefore well suited for use in successfully automating the operation of milling circuits.

A still further object of the present invention is to provide an improved particle size monitoring system which is capable of continuous monitoring of particle size distribution of a slurry under dynamic conditions.

Another important object of the present invention is to provide an improved particle size monitoring system which provides easy readout of the results, and is simple and inexpensive to operate and maintain.

According to the present invention, the improved particle size monitoring system comprises a source of ultrasonic energy and an ultrasonic energy detector, positioned to transmit and detect the amount of ultrasonic energy transmitted through a fluid containing solid particles in suspension, i.e., a slurry, with the system being adapted to develop a signal representative of the percent solids by volume ($P_v$), the geometric mean particle diameter ($\overline{M}$), the standard deviation of the distribution of the particles ($\sigma$) and the largest sized particles in the slurry ($M_\infty$). Additional means may also be provided to develop a second signal which is also representative of the above parameters which define the characteristics of the slurry but in a different fashion or as a different function of the parameters. Means are provided to electronically process and compare the two signals which are different functions of $P_v$, $\overline{M}$, $\sigma$, and $M_\infty$ so as to develop two output signals, one of which indicates particle size by correlation with the amount retained on a standard sieve from a sieve analysis and the other of which indicates the percent solids by volume in the slurry. The two signals to be compared, which are different functions of the slurry defining parameters, are derived from two pairs of ultrasonic transducers, each pair operating at a different frequency. The actual frequencies of operation are chosen to provide the proper sensitivities to the slurry characteristics as a function of those characteristics as will be explained presently. The frequency of the transmitted ultrasonic energy may preferably be selected to produce a particular type of attenuation, or loss, of the transmitted energy or signal, so as to provide maximum sensitivity of readings and to provide readout which is substantially directly proportional to changes in particle size distribution.

Other and further objects and advantages of the present invention will become apparent as the description progresses.

FIG. 13 is a graphical representation of the effect of temperature on the characteristic attenuation of a single particle as derived from the solution of Equation 22a;

FIG. 14 is a graphical representation of the effect of changes in specific gravity of the particles on the attenuation of a single particles as derived from the solution of Equation 22a;

Figure 15:
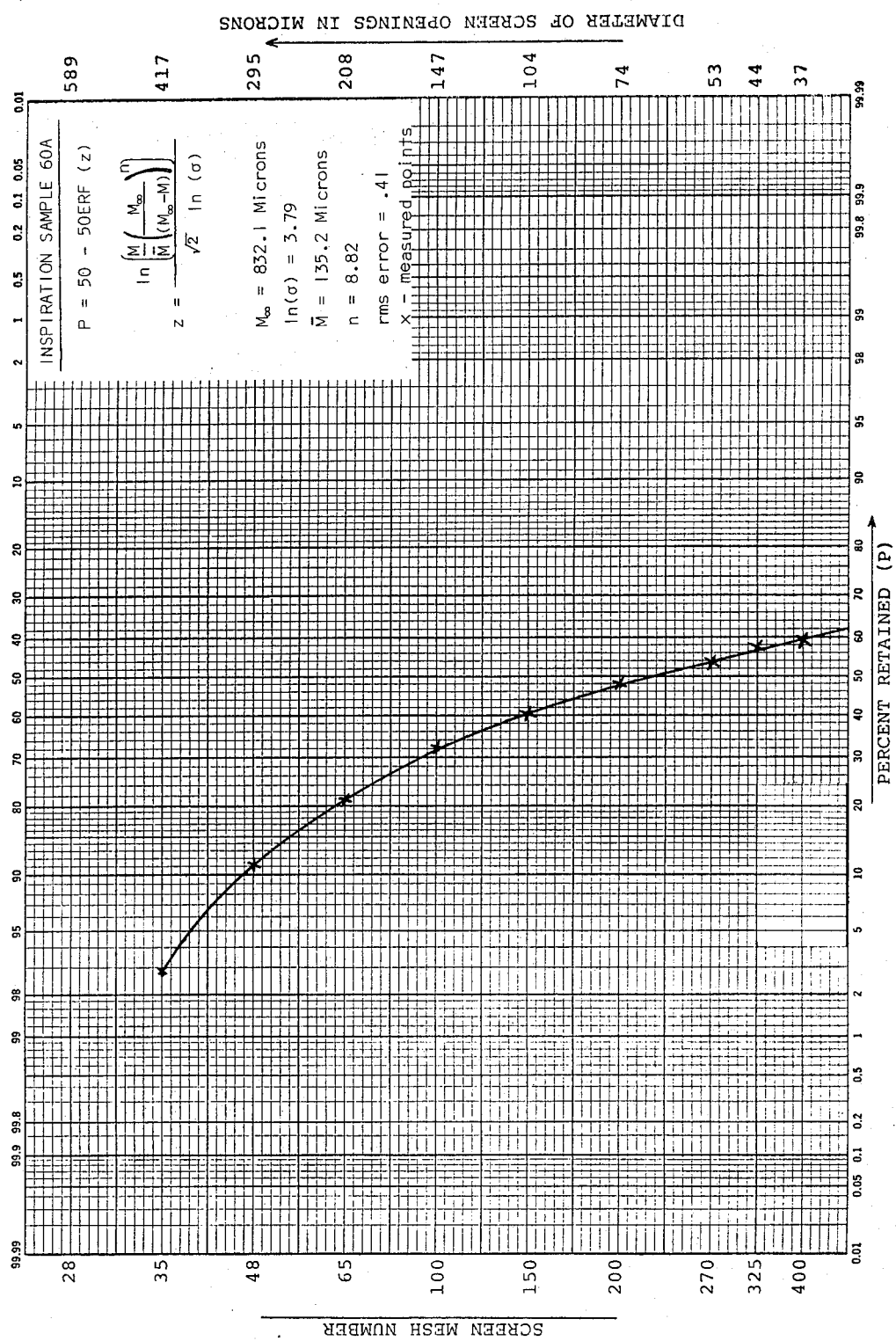
Figure 16:
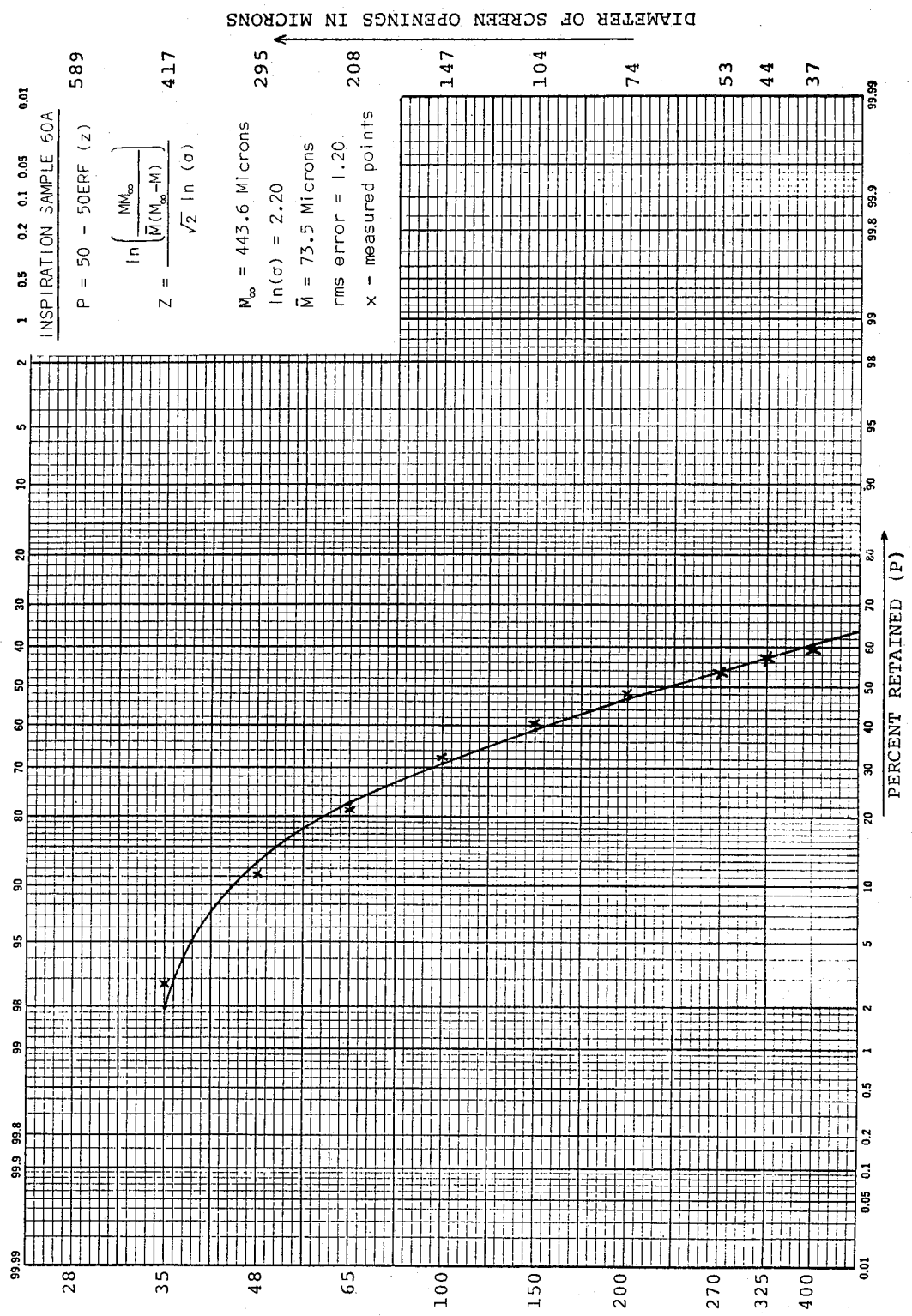
Figure 17:
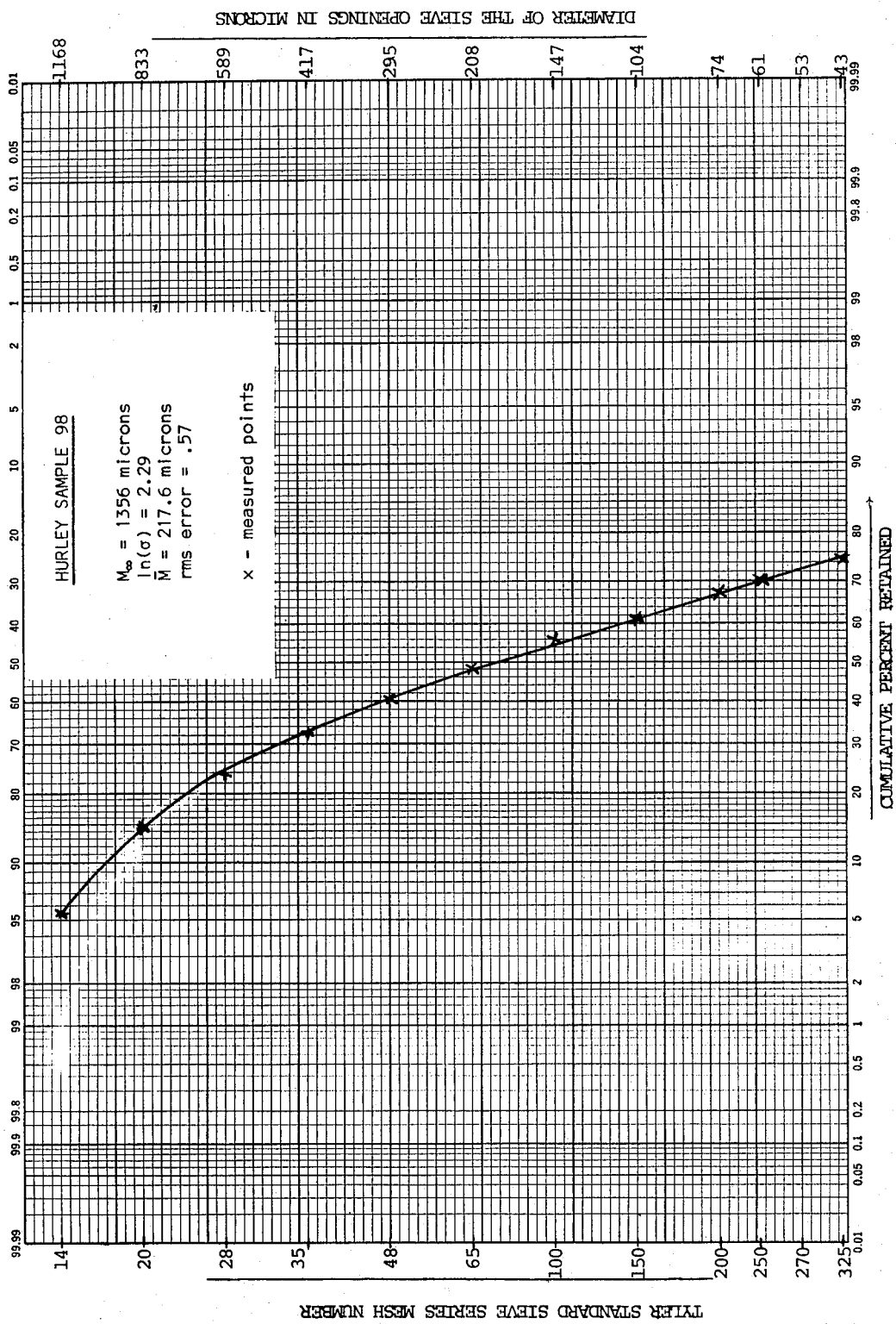
Figure 18:
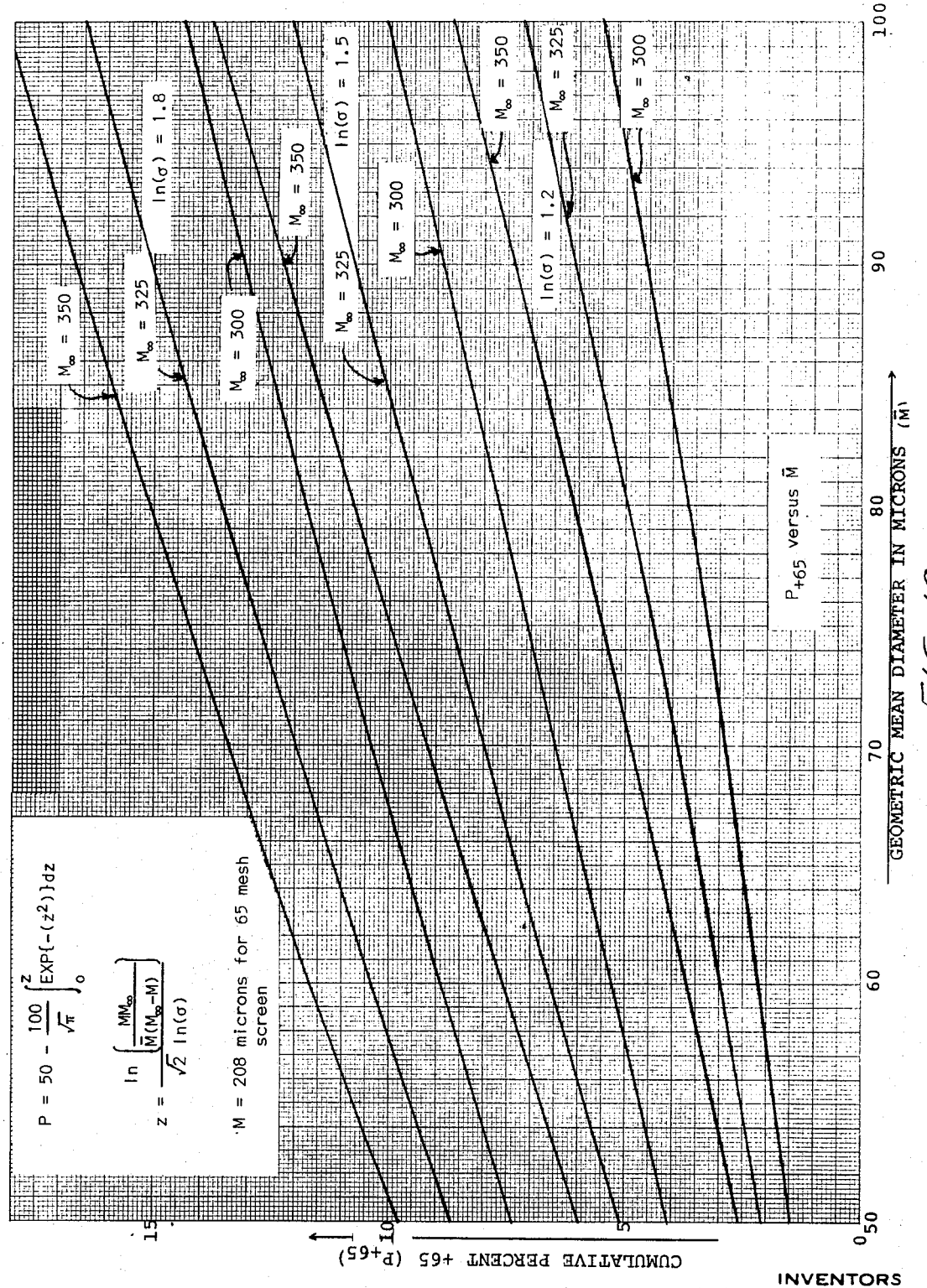
Figure 19:
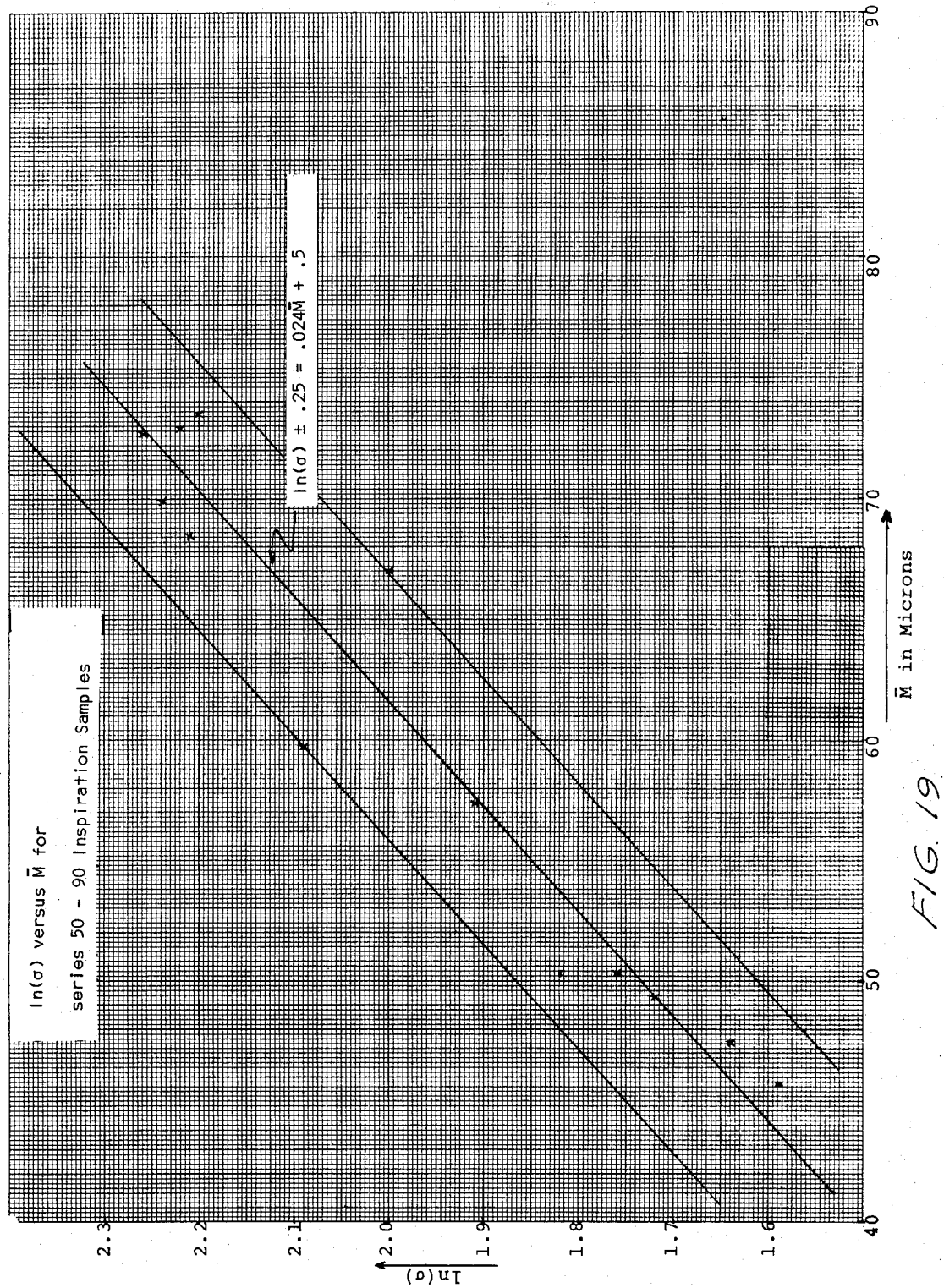
Figure 20:
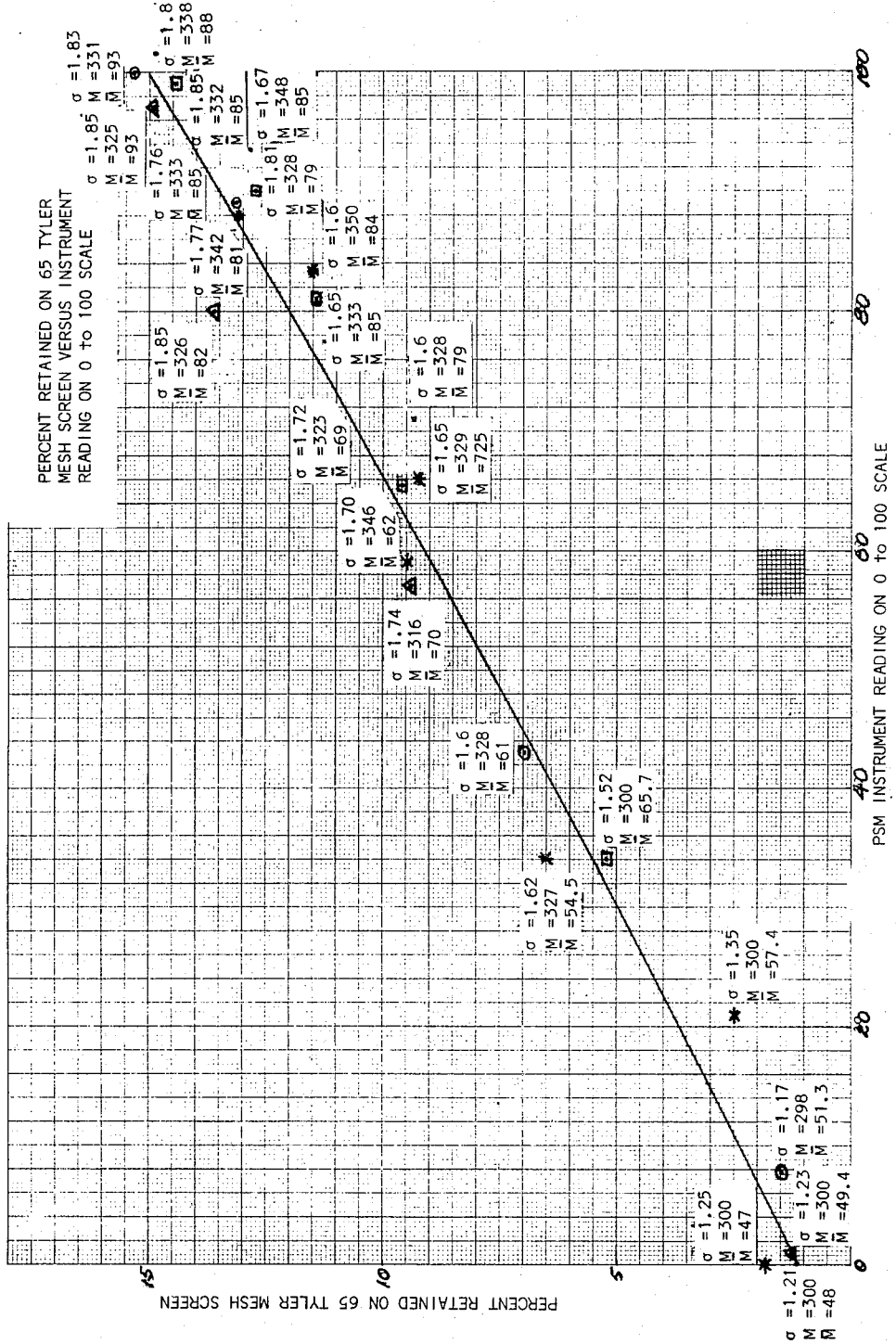
Figure 21:
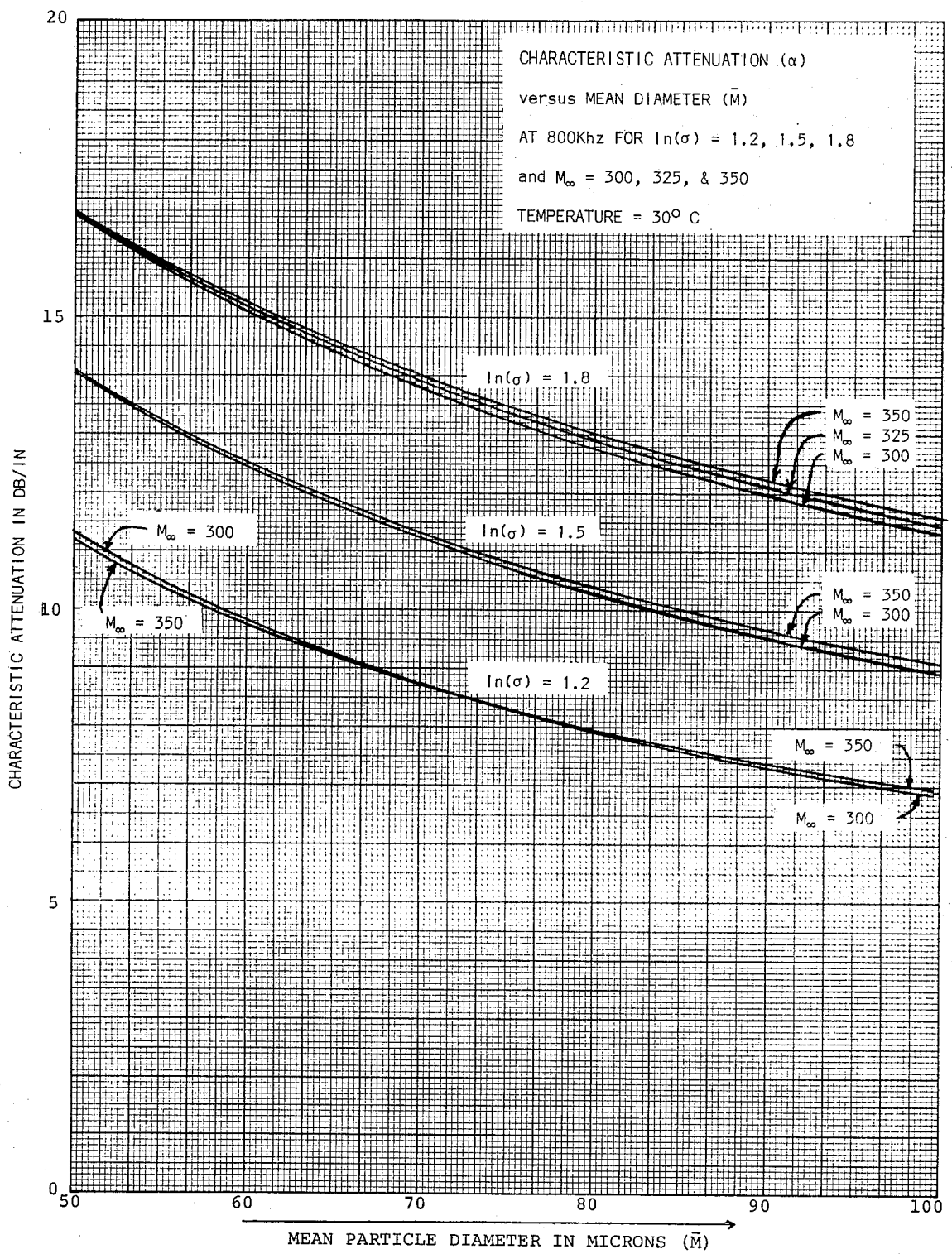
Figure 22:
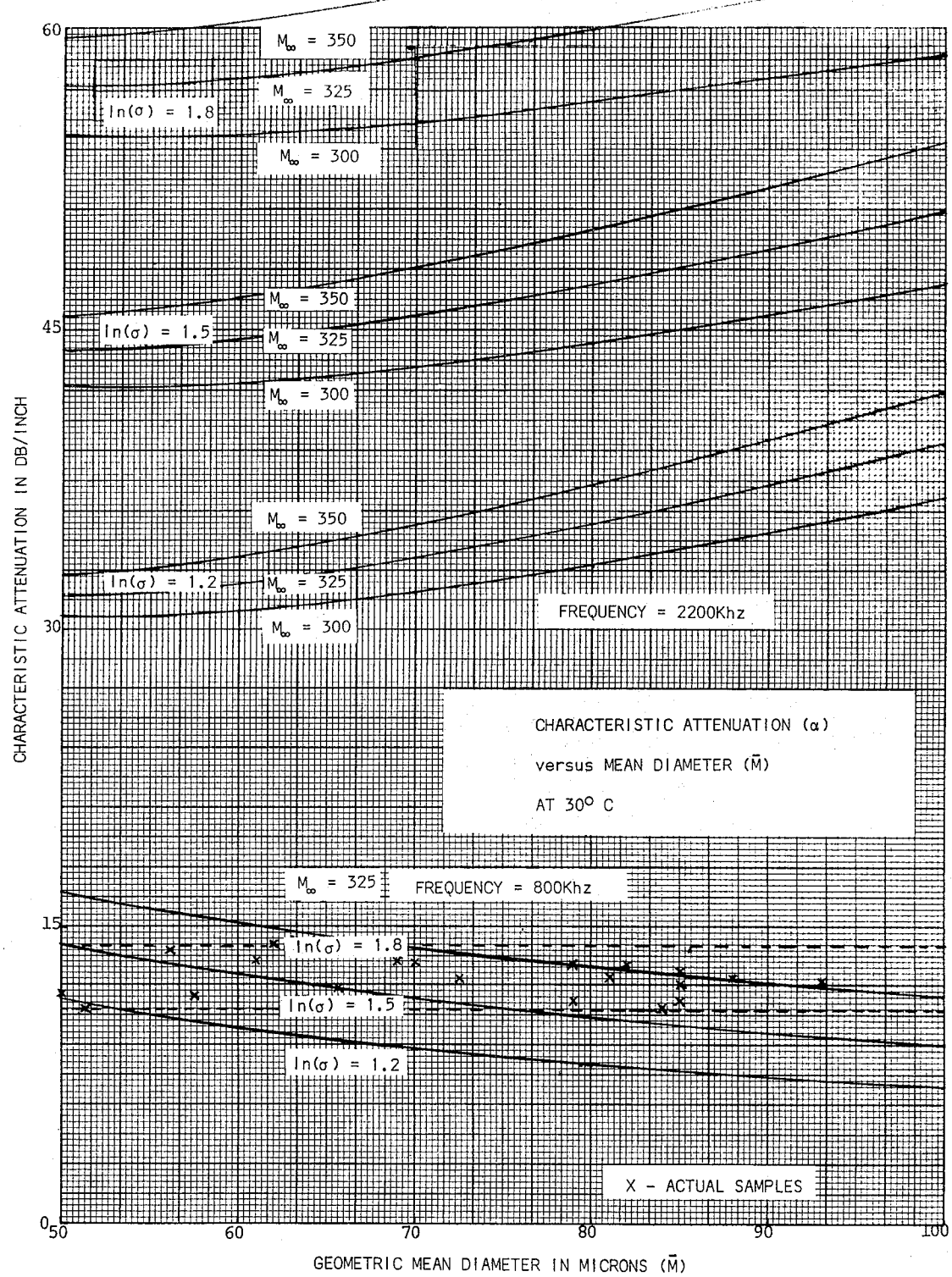
Figure 23:
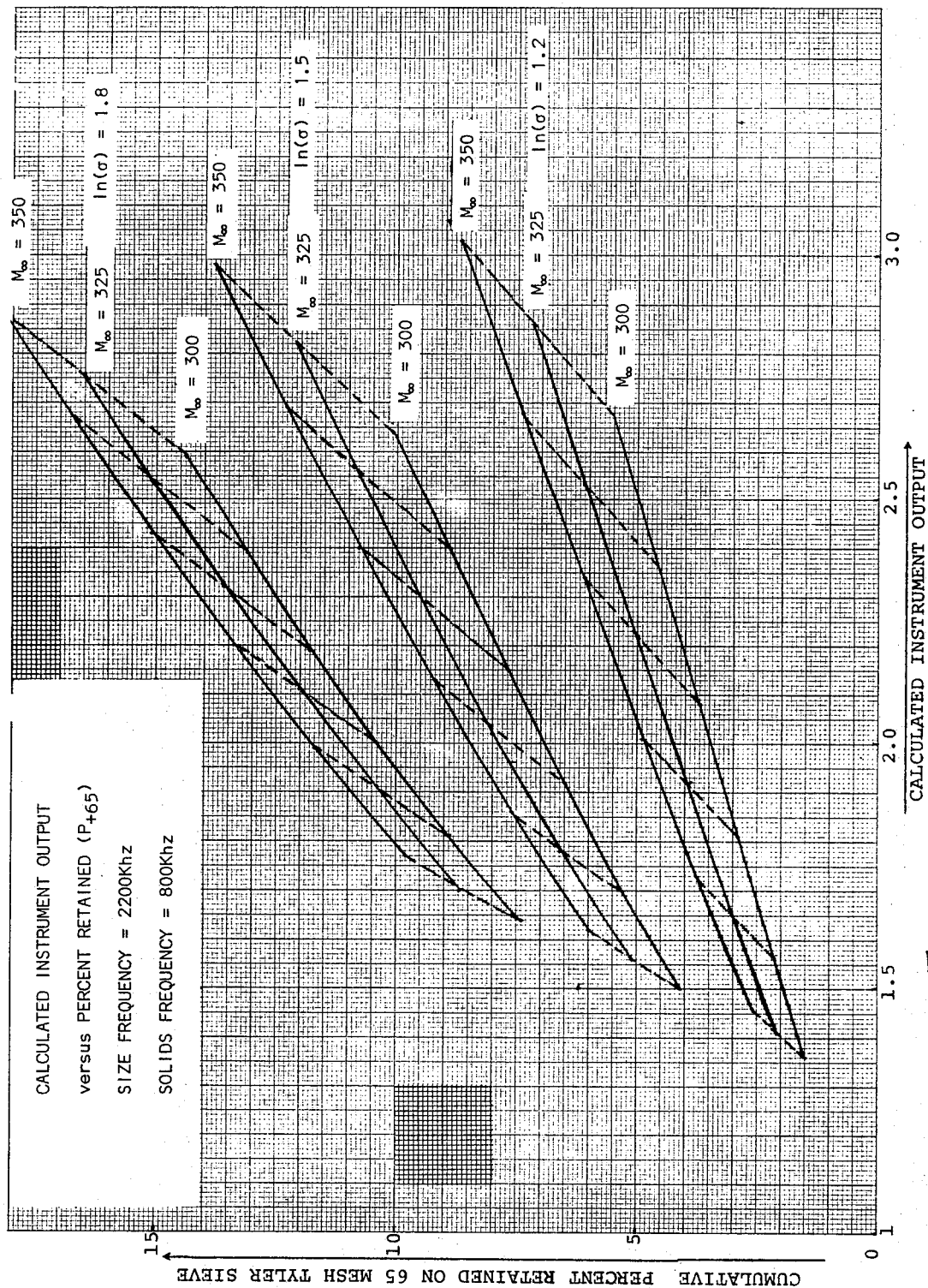
Figure 24:
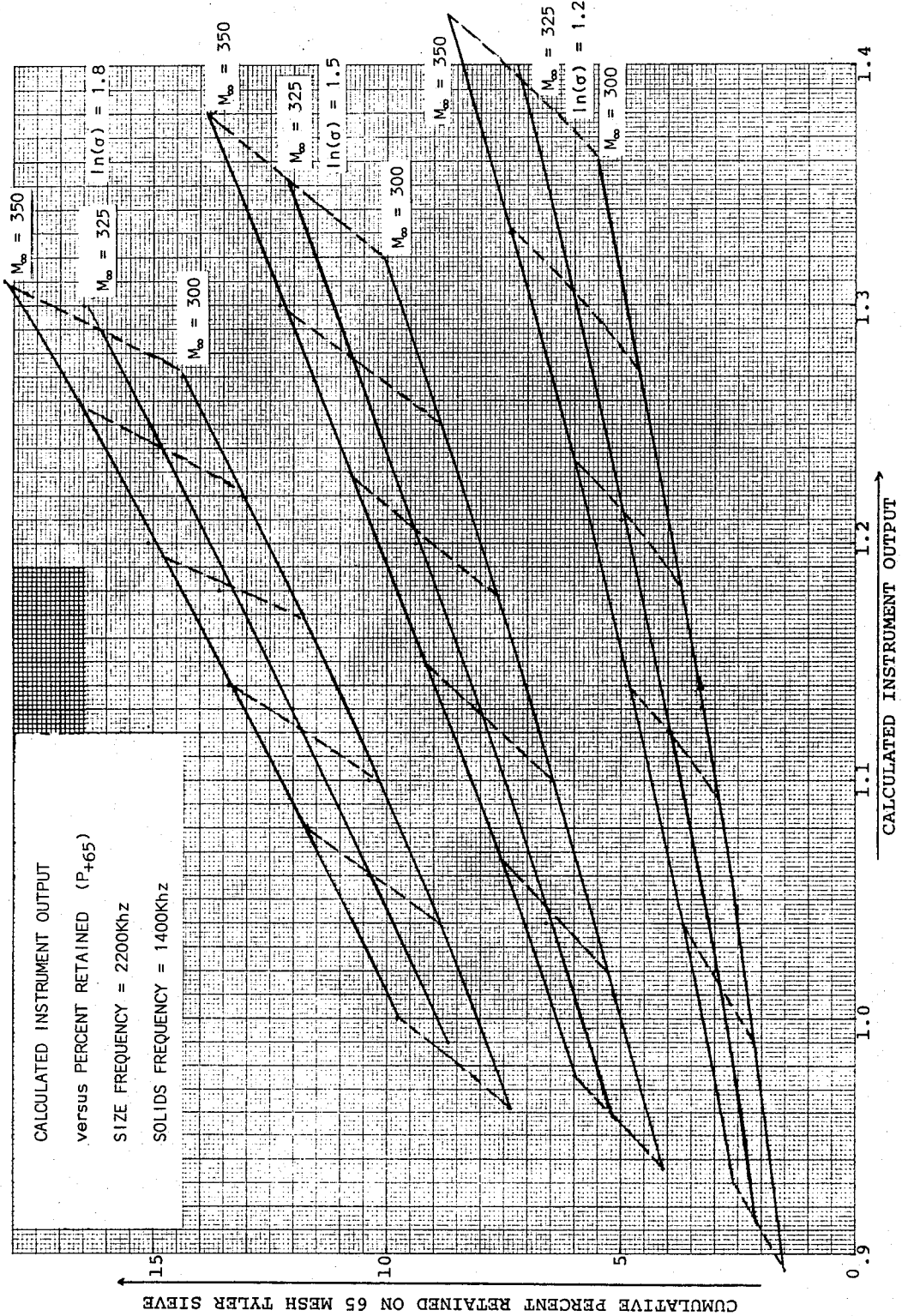
Figure 25:
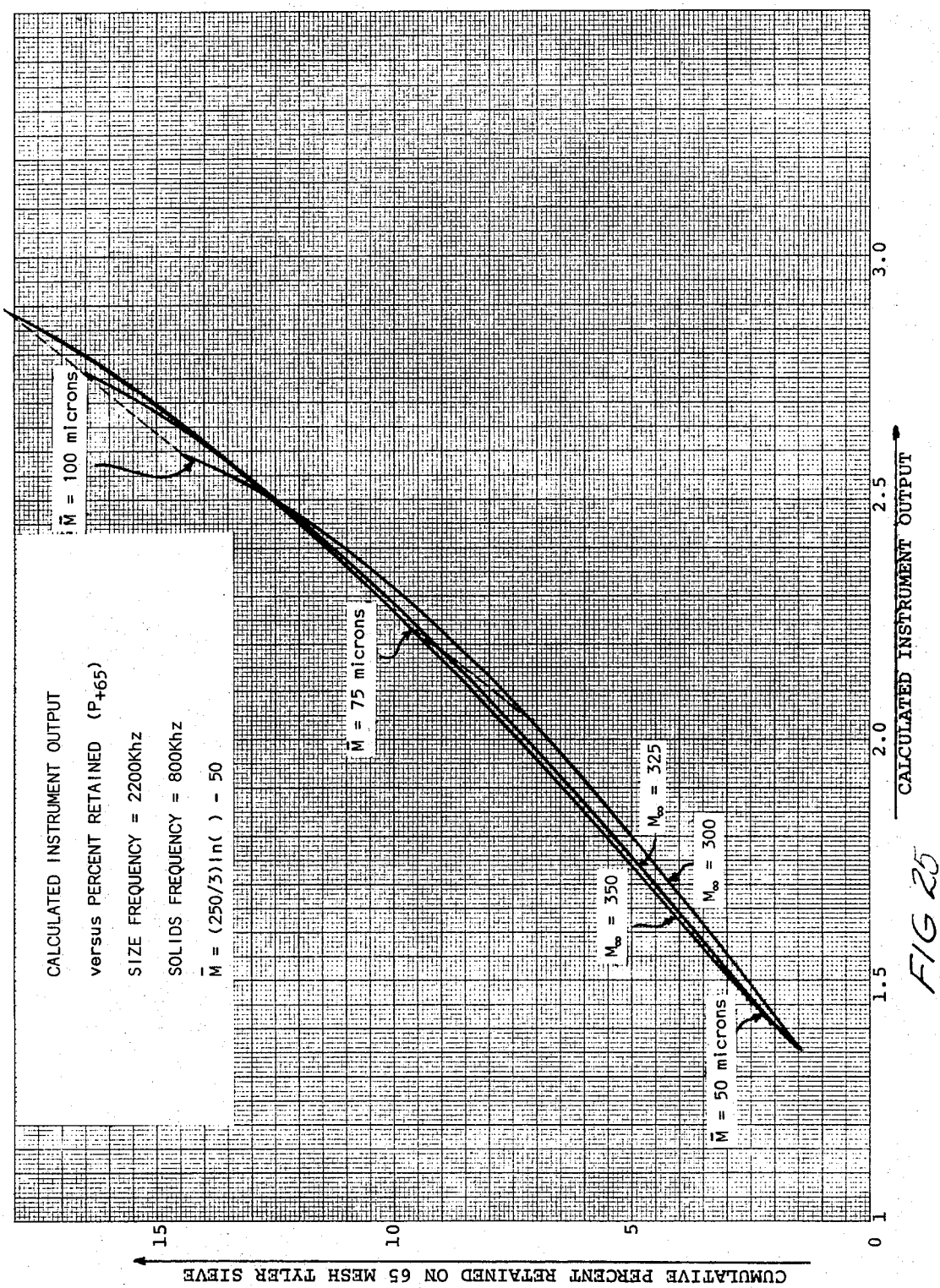
Figure 26:
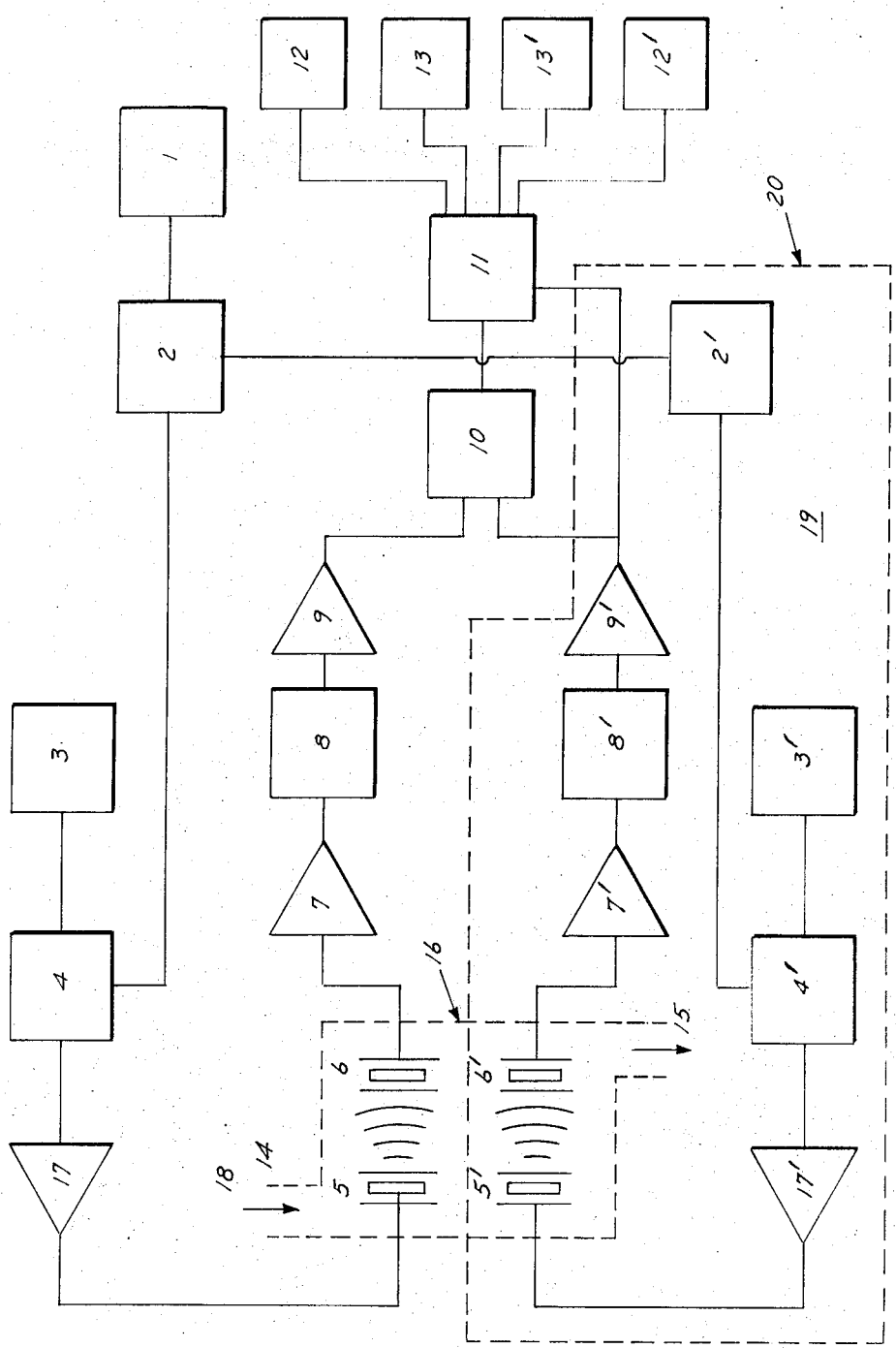
Figure 27:
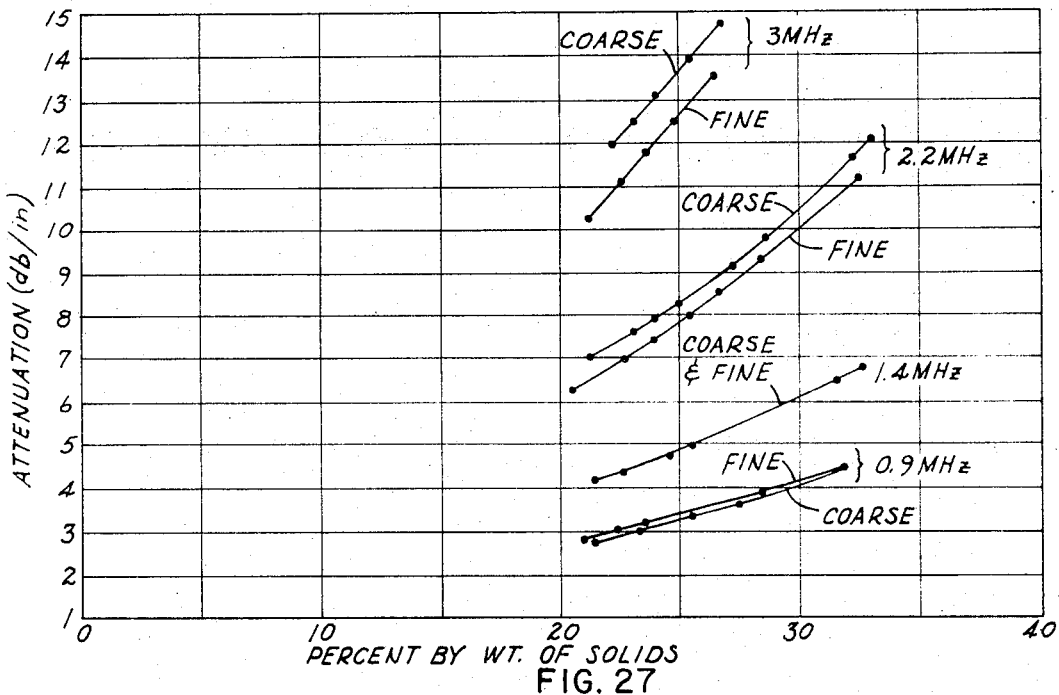
Figure 31:
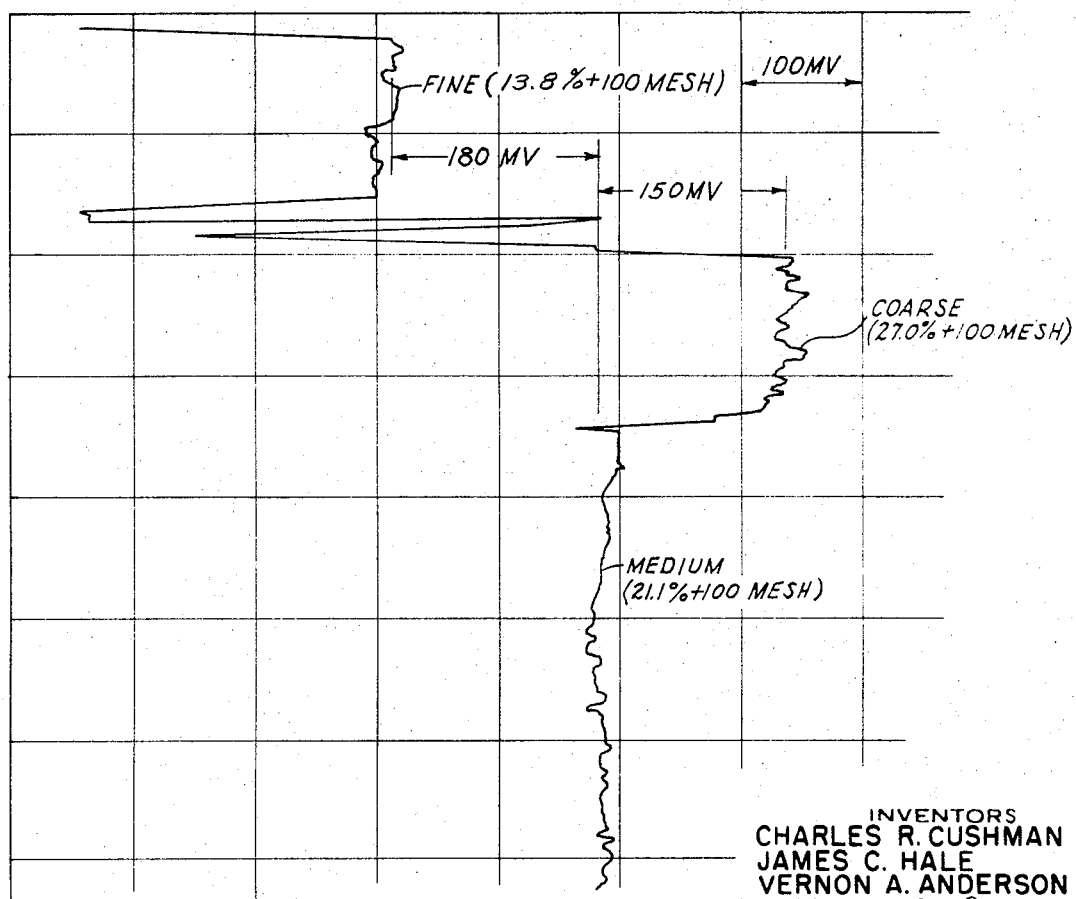
Figure 28:
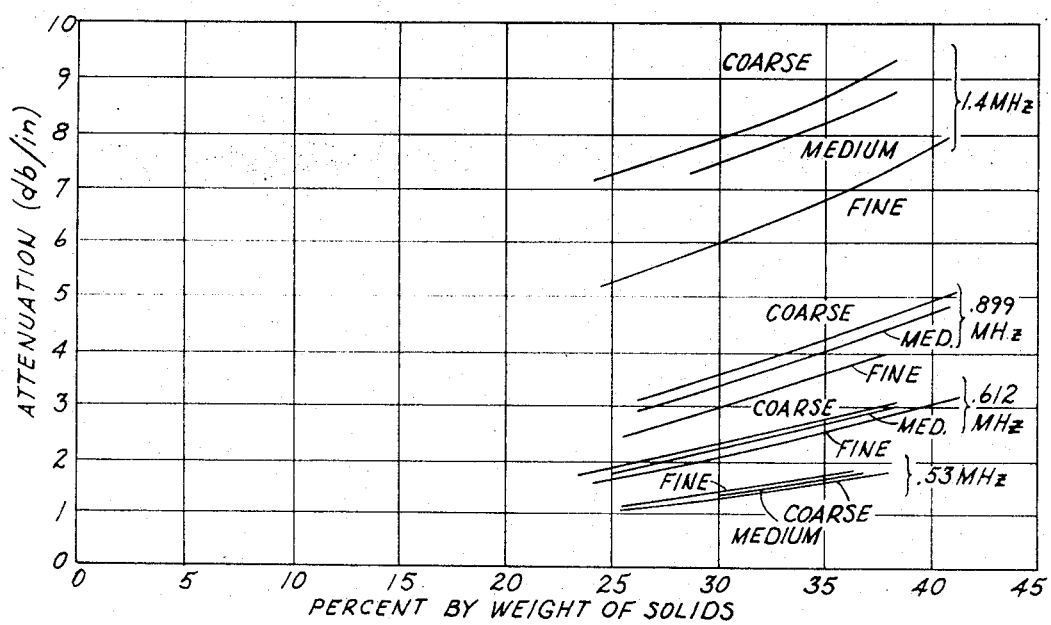
Figure 29:
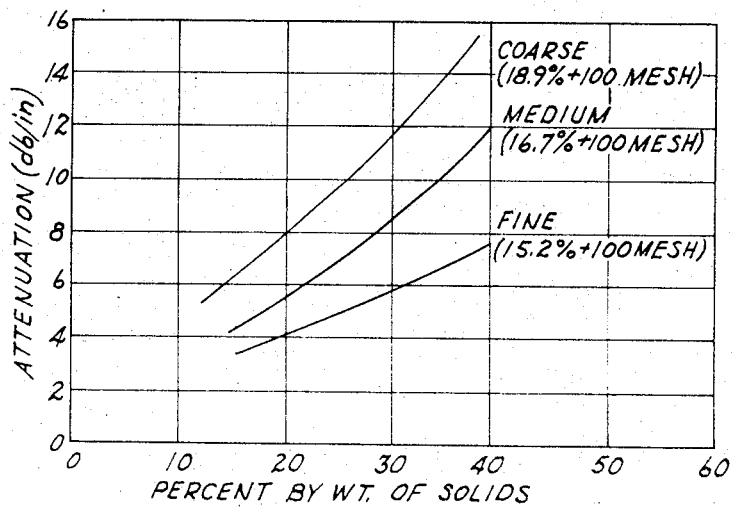
Figure 30:
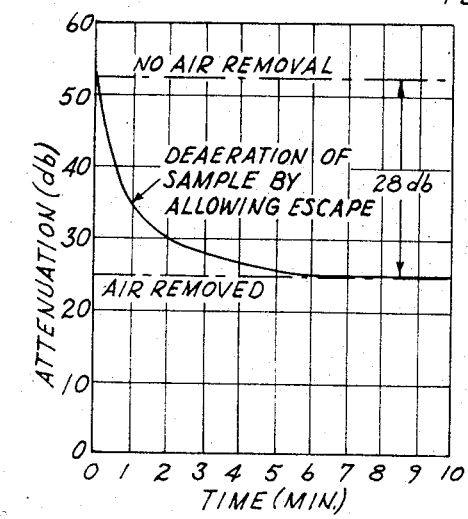
Figure 32:
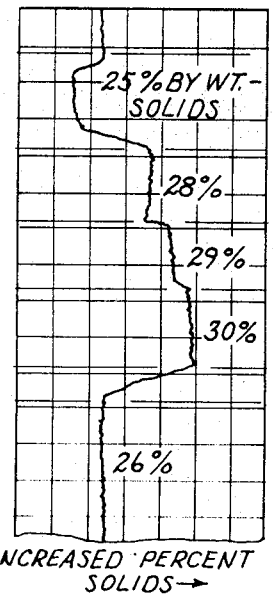
Figure 33:
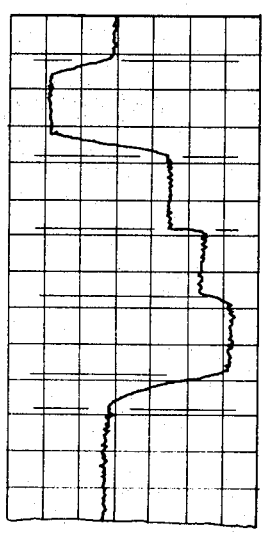
Figure 34:
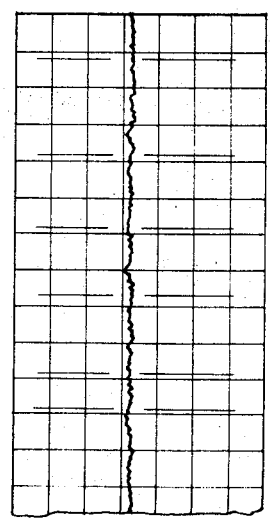
Figure 36:
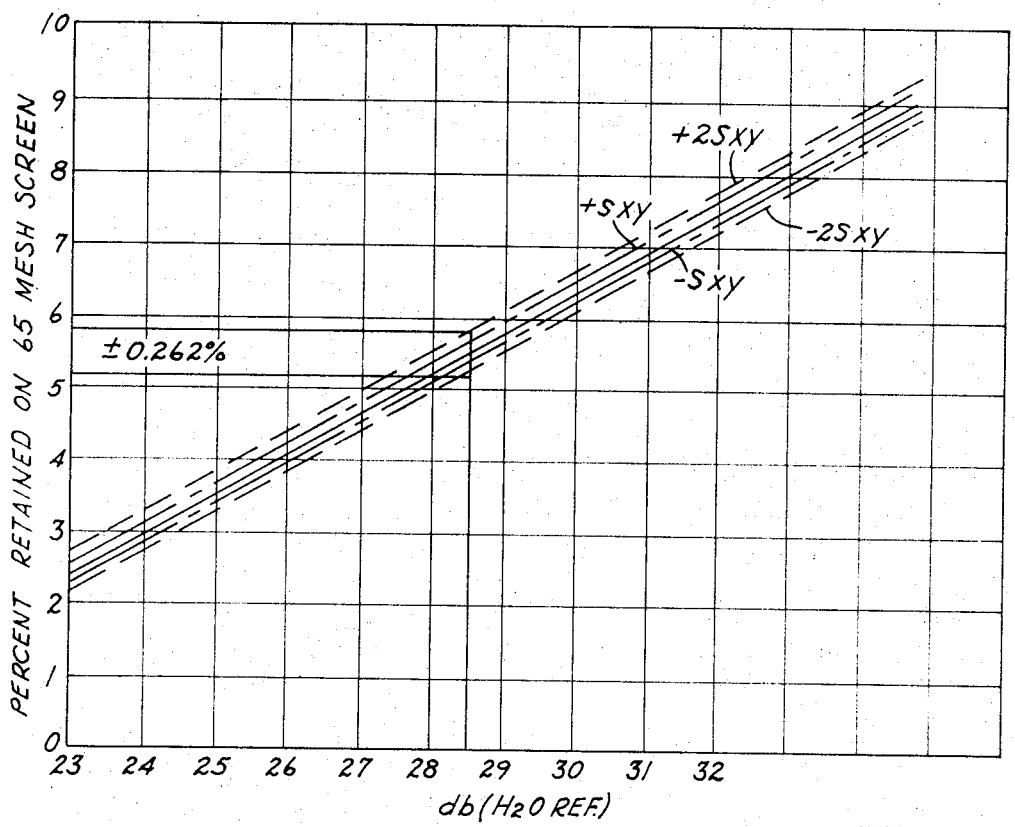
Figure 35:
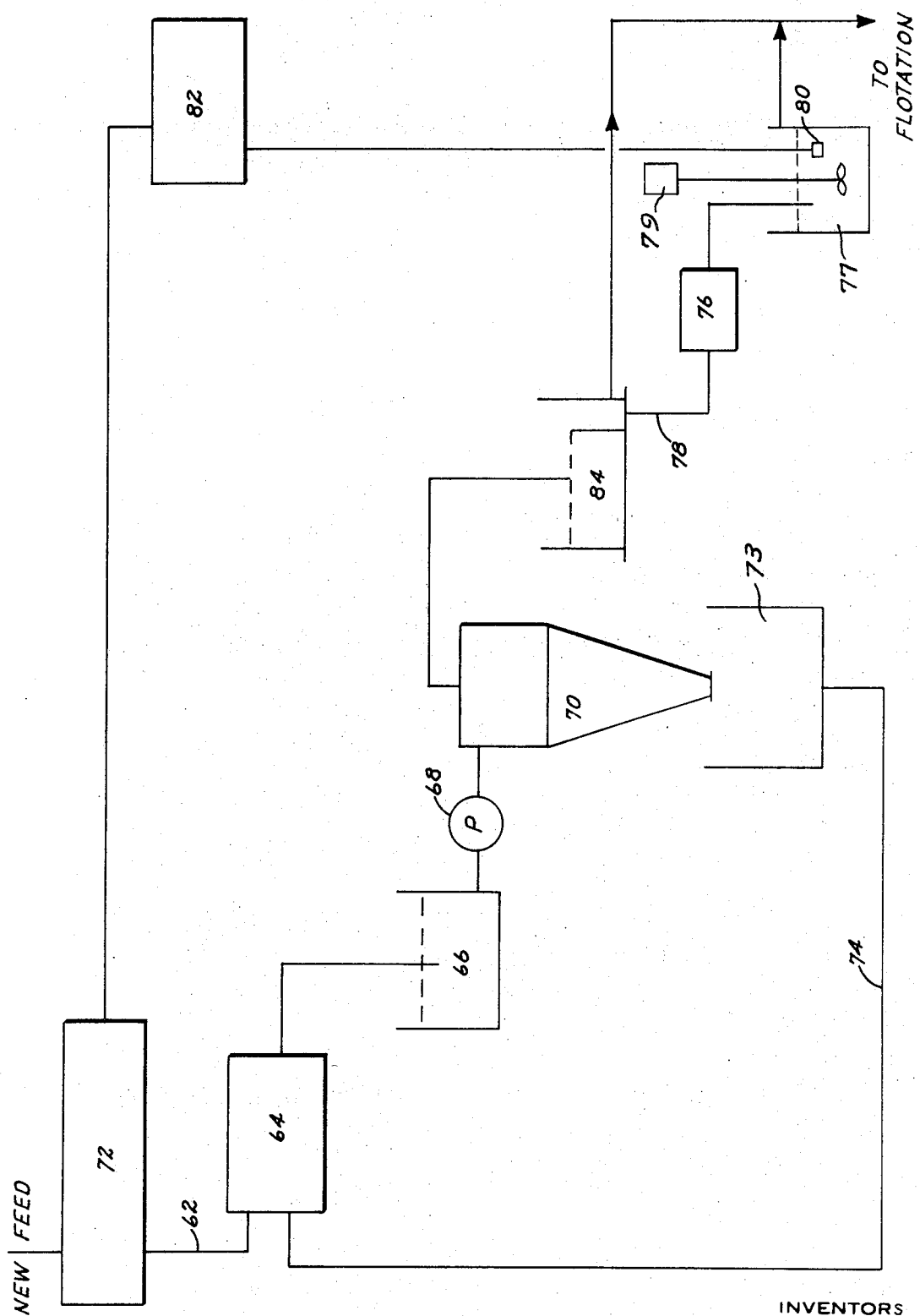
Figure 37:
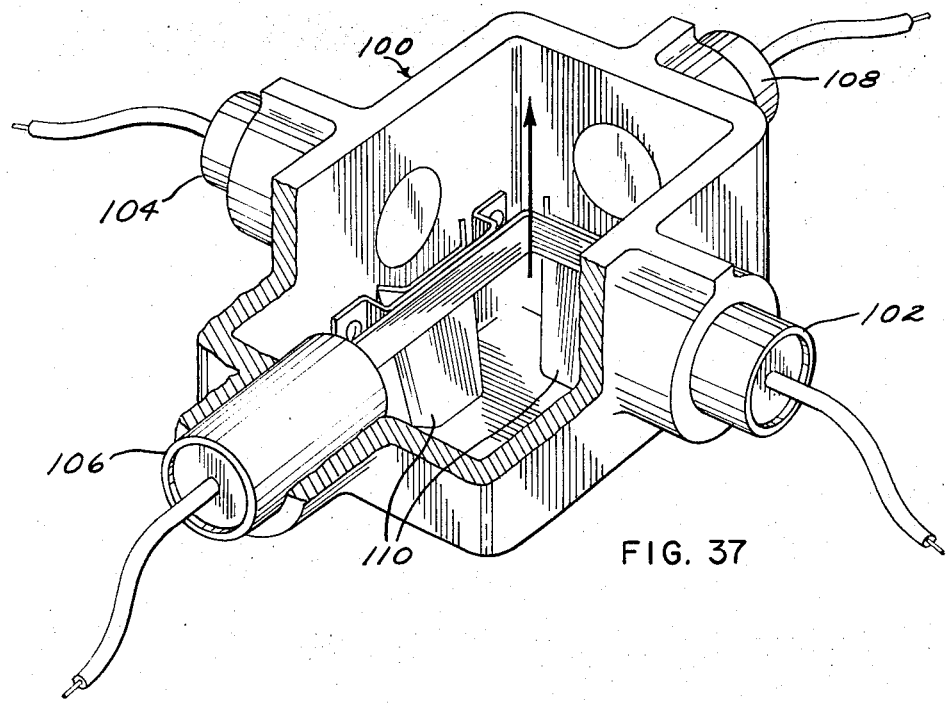
Figure 39:
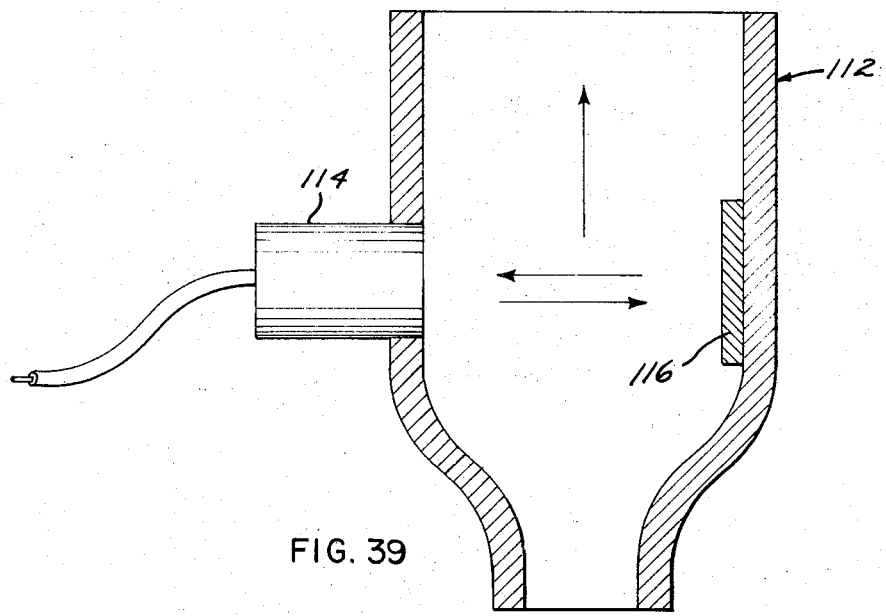
Figure 38:
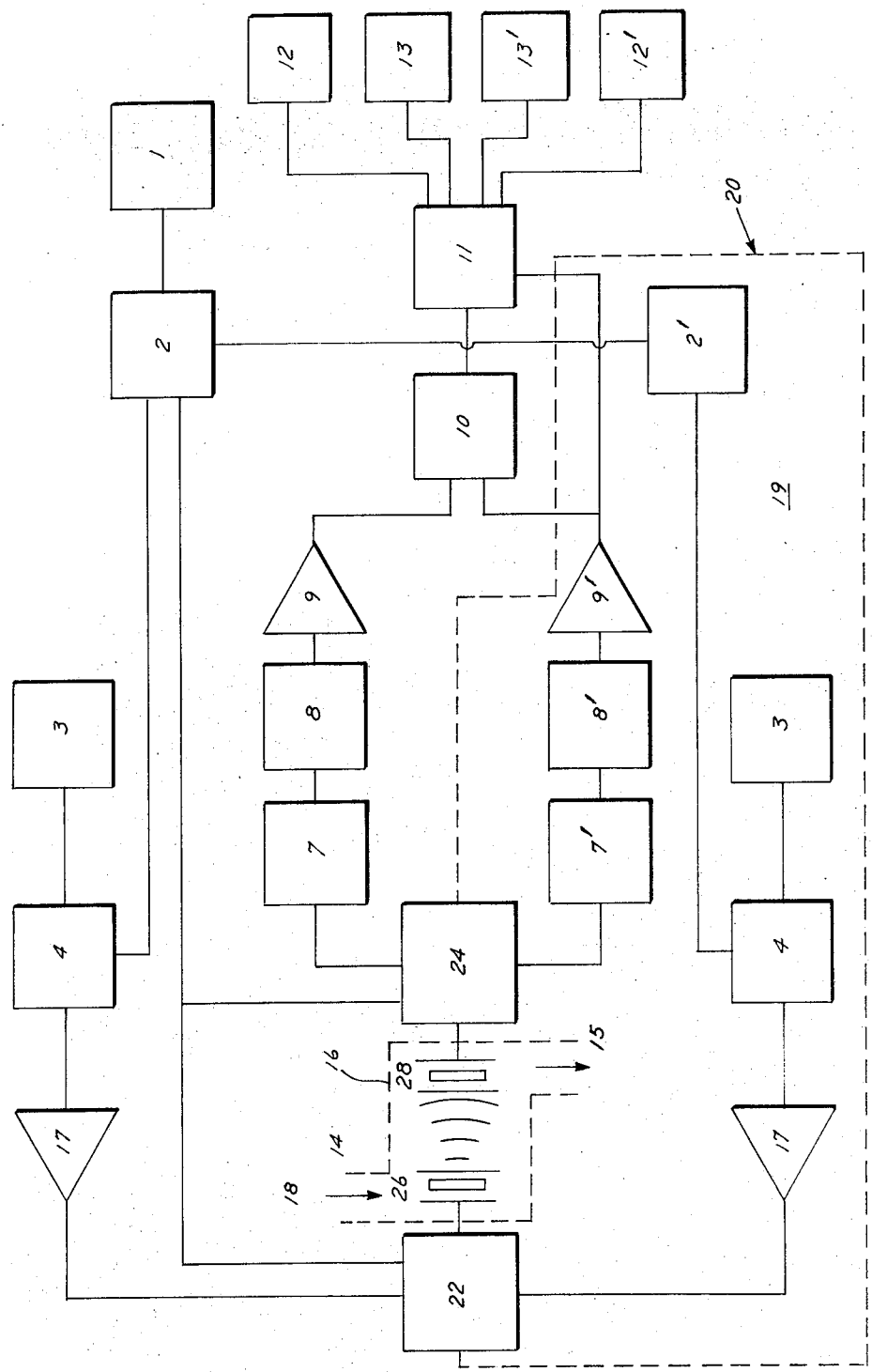
Figure 40:
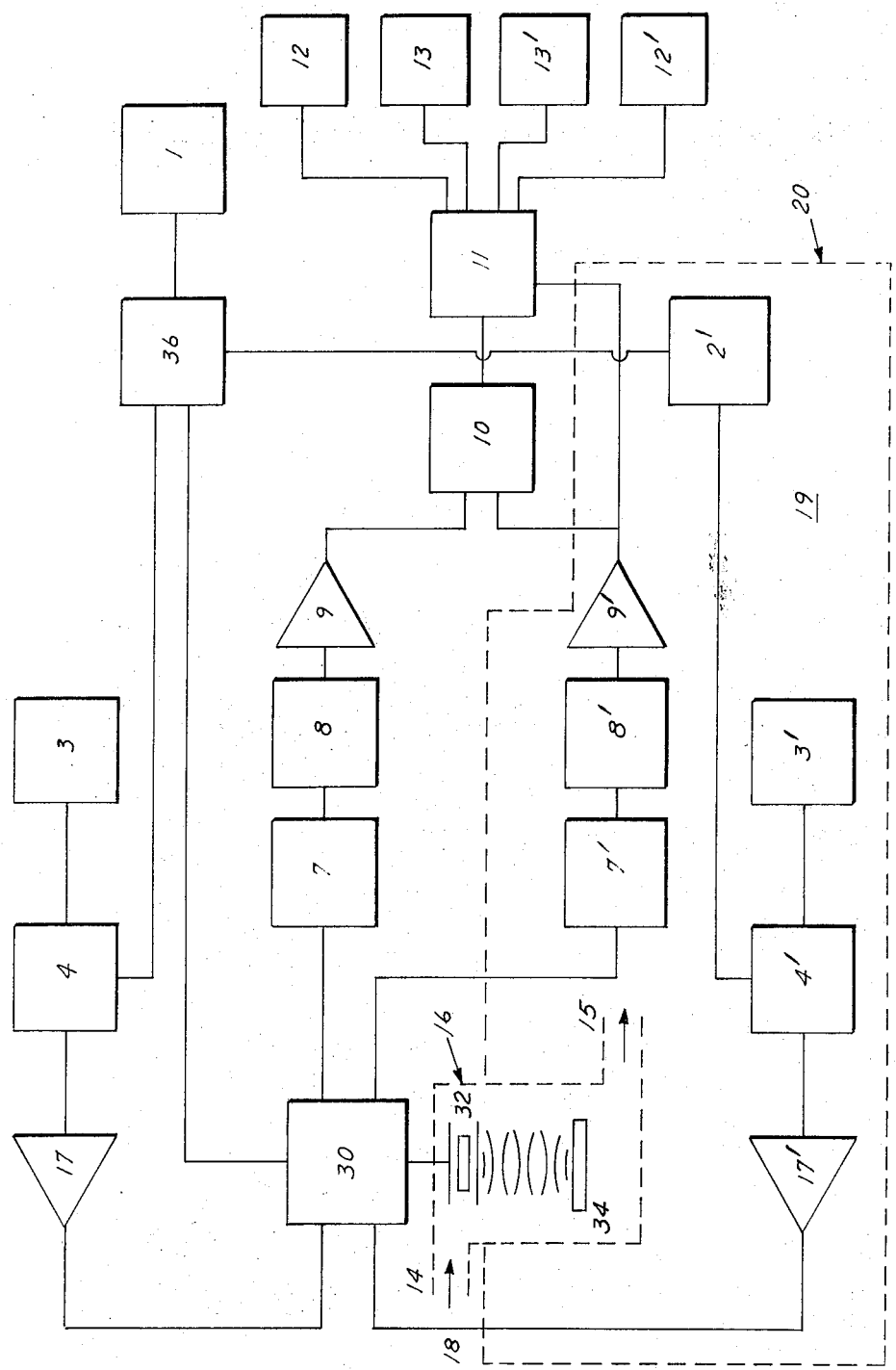

FIGS. 15, 16, and 17 are graphical representations of test data derived from actual ore slurry samples showing particle size diameter as a function of the cumulative percent retained on standard Tyler sieves;

FIG. 18 is a graphical representation of $P_{+65}$ (weight percent retained larger than 65 mesh) as a function of $\overline{M}$ (geometric mean particle size) for variations in $M_\infty$ and $ln(\sigma)$;

FIG. 19 is a graphical representation of the relationship between $ln(\sigma)$ and $\overline{M}$ for Inspiration Samples series 50–90;

FIG. 20 is a graphical representation of the percent solids retained on a 65 mesh Tyler screen versus the reading obtained on an instrument according to the present invention on 24 samples from Magma Copper Corp. of San Manuel, Arizona;

FIG. 21 is a graphical representation of the effect on attenuation at the solids frequency for changes in $\ln(\sigma)$ and $\overline{M}_\infty$;

FIG. 22 is a graphical representation of the data shown in FIG. 21 on a different scale and also for a frequency of 2,200 Khz;

FIG. 23 is a graphical representation of the calculated size output versus cumulative percent +65 for typical variations of Magma ore at a size frequency of 2,200 Khz and a solids frequency of 800 Khz;

FIG. 24 is a graphical representation of the calculated size output versus cumulative percent +65 for the same information as FIG. 25 with a solids frequency of 1,400 Khz;

FIG. 25 is a graphical representation of the reduction in error when the data of FIG. 25 is replotted using the relationship of $\overline{M} = (250/3) \ln(\sigma) - 50$;

FIG. 26 is a block diagram of the circuitry of the particle size and percent solids monitor according to the present invention;

FIG. 27 is a graphical representation of the attenuation of ultrasonic signals at four different frequencies versus percent by weight of solids for two typical samples of milled copper ore;

FIG. 28 is a graphical representation of attenuation at four different frequencies versus percent by weight of solids for three samples of milled copper ore;

FIG. 29 is a graphical representation of attenuation versus percent by weight of solids for three typical samples of milled tungsten ore;

FIG. 30 is a graphical representation showing the attenuation of an ultrasonic signal produced by entrained air in a milled ore slurry, the effect on such attenuation as the air is allowed to escape, and the amount of attenuation in the same slurry after entrained air has been allowed to escape;

FIG. 31 is a reproduction of traces of a strip chart recorder, showing the differences in attenuation, as indicated by the particle size and percent solids monitor of this invention, produced by three milled ore slurry samples having different particle size distributions, but equal percent by volume of solids;

FIGS. 32, 33, and 34 are reproductions of traces from a strip chart recorders, showing the effects on attenuation of an ultrasonic signal of the particle size and percent solids monitor as a result of intentional changes in percent by volume of solids in a milled ore slurry sample having constant particle size distribution;

FIG. 35 is a flow diagram of a milling circuit in an ore processing mill, incorporating the particle size and percent solids monitor and a control system, according to the present invention;

FIG. 36 is a plot of the percent by weight of particles retained on a standard 65 mesh screen versus the attenuation of an ultrasonic signal, illustrating the correlation between the indications of the particle size monitor and the actual screen analysis of the same samples of milled ore slurries;

FIG. 37 is a perspective view with parts broken away of one form of a transducer array;

FIG. 38 is a block diagram of the circuitry according to this invention using a single pair of transducers;

FIG. 39 is an elevational view in cross section of another form of transducer array; and, FIG. 40 is a block diagram of the circuitry according to this invention using a single transducer and a reflector.

The present invention provides a solution for many process industries where it is desirable and necessary to monitor and/or control the particle size in a liquid medium on a continuous basis without delay or interruption of the process being monitored and controlled.

The particle size monitor of the invention uses the principle of ultrasonic attenuation in a liquid medium and the preferred embodiment differs from conventional application of ultrasonics to the measurement of liquid systems in that two different ultrasonic frequencies are used and compared to derive a final output signal which is a function of particle size and is essentially independent of the amount of solids in the slurry. Use is made of the principle of ultrasonic attenuation by the suspended particles. The attenuation of a beam of ultrasonic energy propogated through a liquid medium containing substantial quantities of solid particles is a function of the size of the particles in the medium and the wave length, i.e., the frequency of the ultrasonic energy. In general, when operating in the scattering region of ultrasonic attenuation with a fixed frequency ultrasonic signal, larger particles cause more scattering, and thus a greater loss or attenuation of the transmitted signal, than smaller particles.

The changes in attenuation can be determined by sensing the amplitude of the ultrasonic signal or signals that have passed through the suspension of particles and comparing it with the known amplitude of the transmitted signal or signals in water.

The amount of attenuation of a beam of energy passed through a slurry is also affected by the number of particles in the suspension per unit volume of slurry. Within the range of solids content normally found in the classifier overflow of milled ore slurries and for any given particle size distribution, attenuation increases as the number of particles is increased.

The use of the invention therefore contemplates either a condition wherein the solids content of a slurry is known or maintained constant, or the development of a signal representative of the amount of solids in the slurry, and the changes thereof used to correct or compensate the output signal representative of the particle size distribution so as to effectively remove therefrom the effects of changes in solids content.

In order for ultrasonic slurry measurements to be correlated to particle size distribution, they must be substantially insensitive to percent solids changes; therefore, the effects of percent solids variations on the attenuation of ultrasonic energy by a slurry must be known. The following description derives an expression for ultrasonic attenuation versus percent solids for a slurry. A sample with a single particle size and no particle interaction is considered first, then the effects of particle interaction are considered, and finally, the complication of having a distributed sample like a milled ore slurry is considered with the result yielding an expression for ultrasonic attenuation as a function of percent solids.

Figure 1:
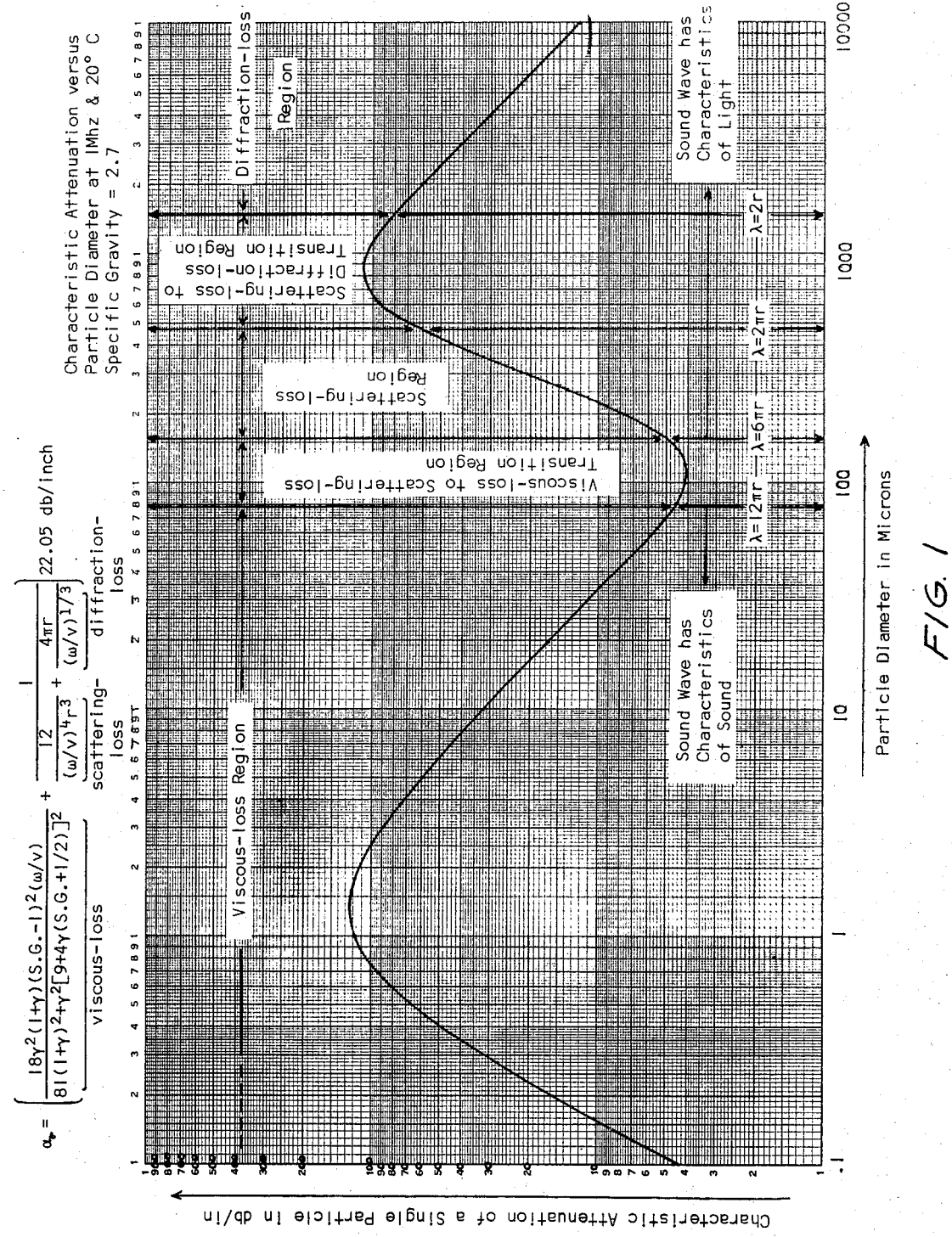
FIG. 1 is a graphical representation of the characteristic attenuation due to a single particle at a single ultrasonic frequency versus particle size.

Two loss mechanisms are responsible for the major part of the attenuation of a sound wave by particles in a liquid medium. Urick, R.J. 1948, "The absorption of sound in suspension of irregular particles": Acoustical Soc. America Journ., V. 20 No. 3, pp. 283–289. These two loss mechanisms arise because the sound wave acts as if it were a light wave for $\lambda \leq 6\pi r$ ($\lambda$ = wavelength, $r$ = particle radius); and the particles vibrate in response to, but lag behind, the sound wave for $\lambda \geq$ $12\pi r$. These loss mechanisms have maximums at different sizes, thus giving the attenuation versus size curve as shown in FIG. 1 for a frequency of 1 Mhz.

For a sample with a single size of spherical particles with no particle interaction, using the basic assumption that ultrasonic attenuation with no particle interaction is directly proportional to the number and size of particles in the sound path, we have:

$$\alpha_T = nx\alpha_\epsilon \qquad (1)$$

$\alpha_T$ = total attenuation coefficient in db/inch
$n$ = number of particles per unit volume of solution
$x$ = length of the sound path in inches
$\alpha_\epsilon$ = attenuation coefficient due to one particle of size $r$ (a function of frequency, temperature, particle specific gravity and particle radius)

$$(2) \quad n = \frac{\text{Total number of particles}}{\text{Total volume of solution}}$$

$$= \frac{\text{Total volume of particles}}{\text{Total volume of solution}} \cdot \frac{V_s}{\text{Volume of one particle}} = \frac{V_s}{V_s+V_w} \cdot \frac{1}{4/3\pi r^3} = \frac{P_v}{4/3\pi r^3}$$

$r$ = particle radius in cm
$V_s$ = total volume of solids (or particles) in ml
$V_w$ = volume of water in ml
$P_v = V_s/(V_s+V_w)$ = amount of solids present per unit volume in percent Therefore, combining Equations 1 and 2

$$\alpha_T = (P_v/4/3\pi r^3)(x\alpha_\epsilon) = P_v x\alpha_r \text{ where } \alpha_r = \alpha_\epsilon \cdot \frac{24}{3\pi r^3} \qquad (3)$$

Note that for low levels of concentration Equation 3 can be approximated by:

$$\alpha_T = Cx\alpha_r \text{ since } P_v = V_s/(V_s+V_w) = C/1+C \cong C \text{ for } C<<1 \text{ where } C = V_s/V_w \qquad (4)$$

Figure 5:
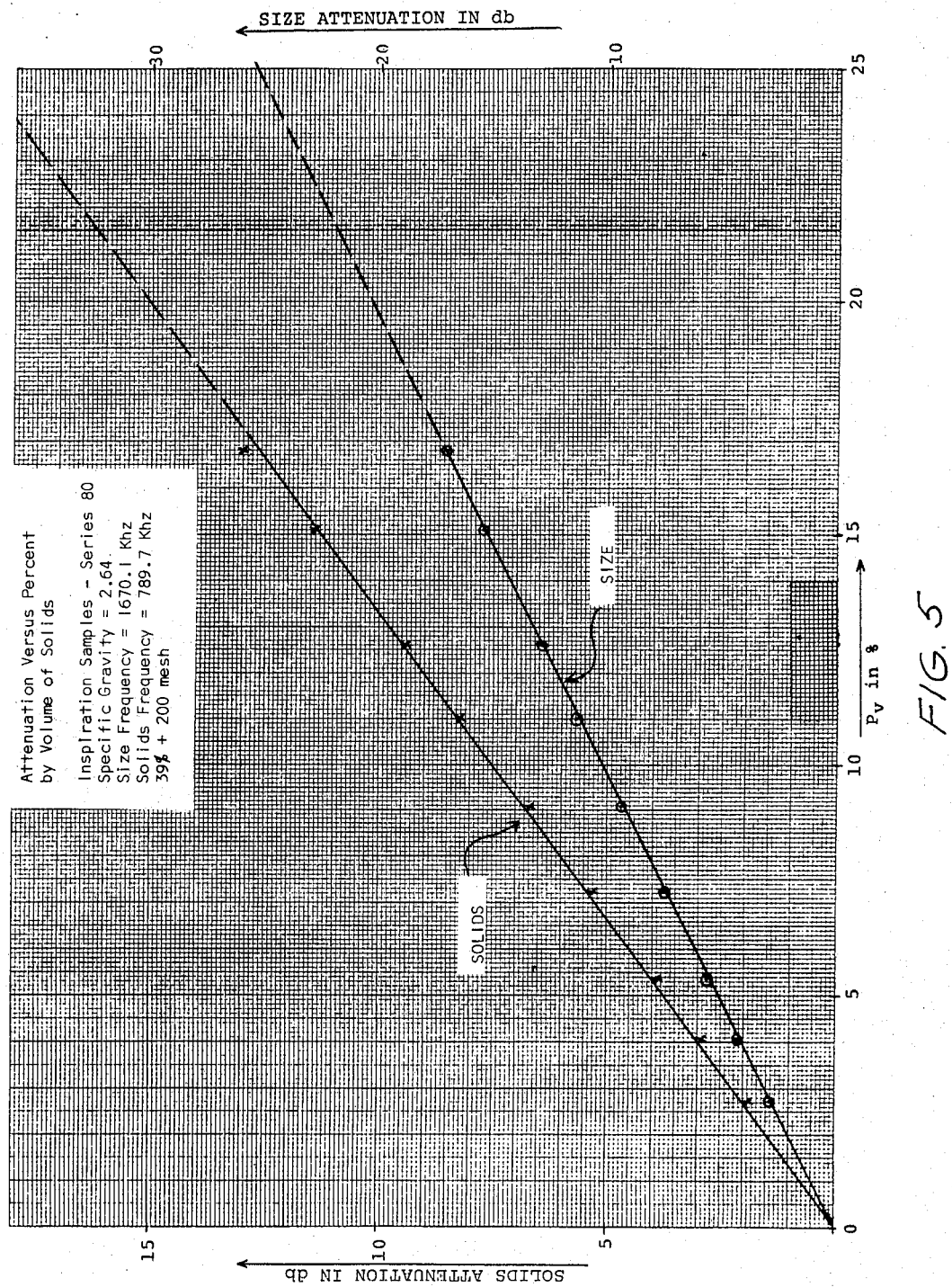
FIG. 5 is a graphical representation of attenuation versus percent by volume of solids for Inspiration Sample Series 80 at two frequencies.
Figure 6:
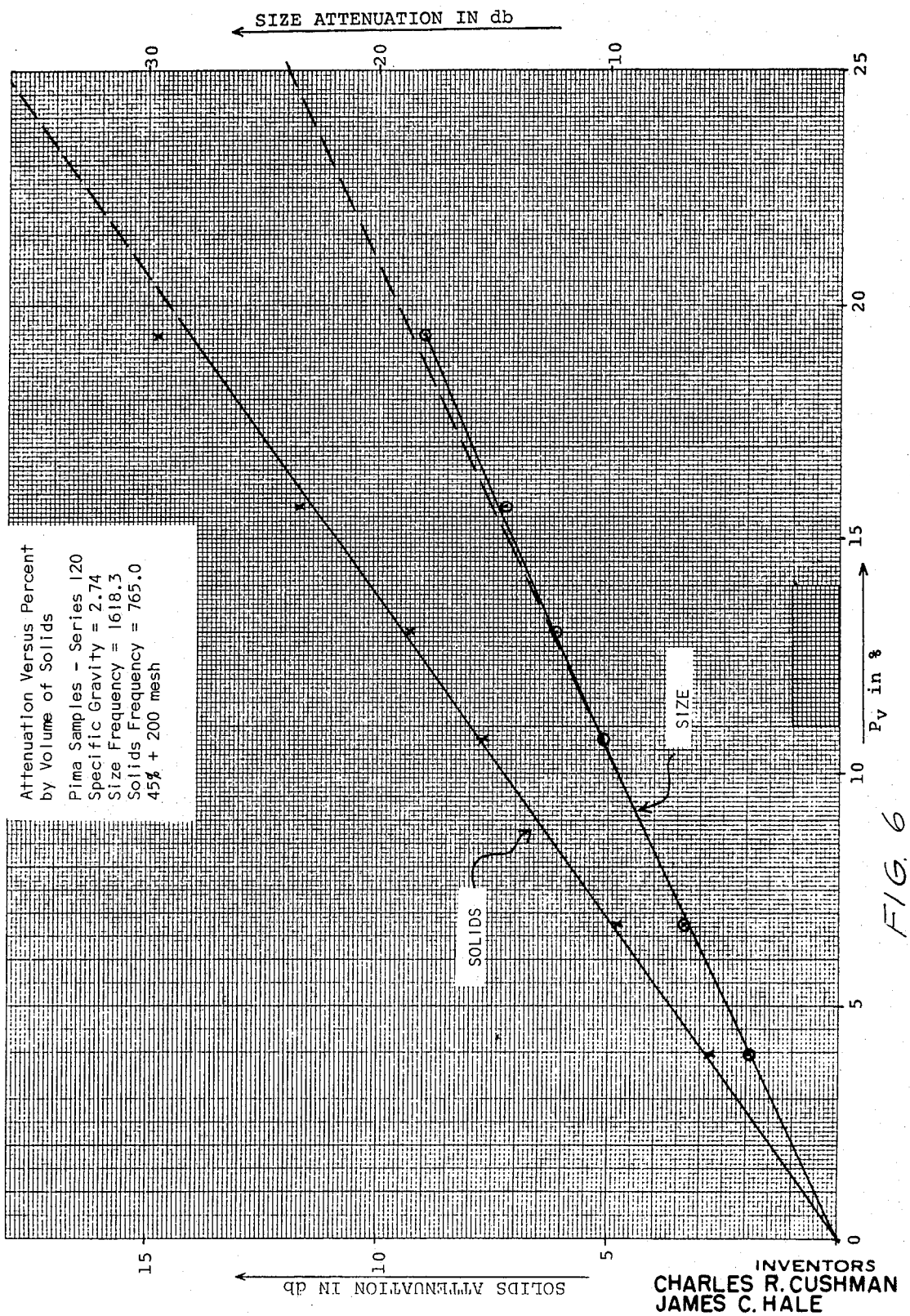
FIG. 6 is a graphical representation of attenuation versus percent by volume of solids for Pima Mining Series 120 at two frequencies.
Figure 7:
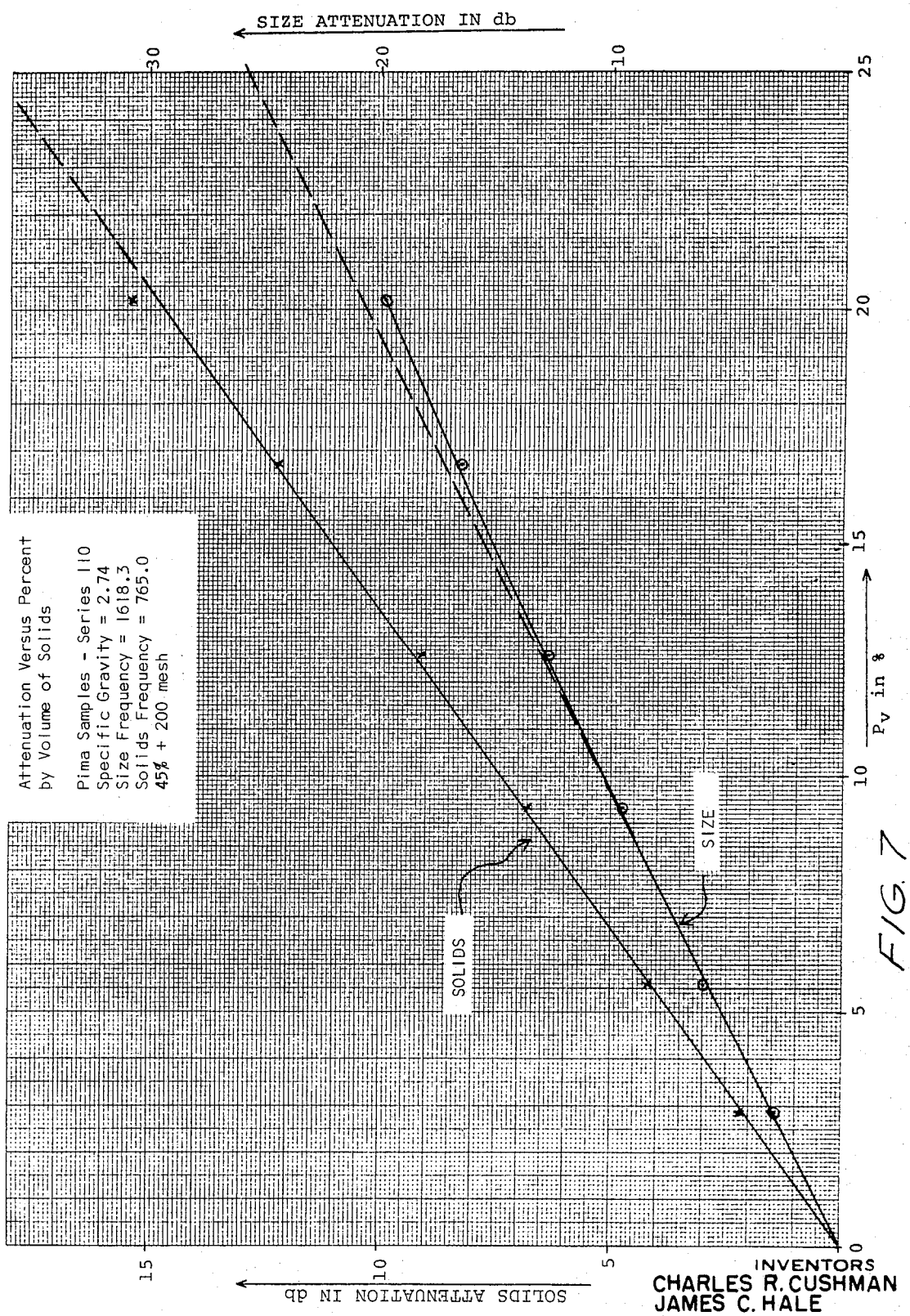
FIG. 7 is a graphical representation of attenuation versus percent by volume of solids for Pima Mining Series 110 at two frequencies.
Figure 8:
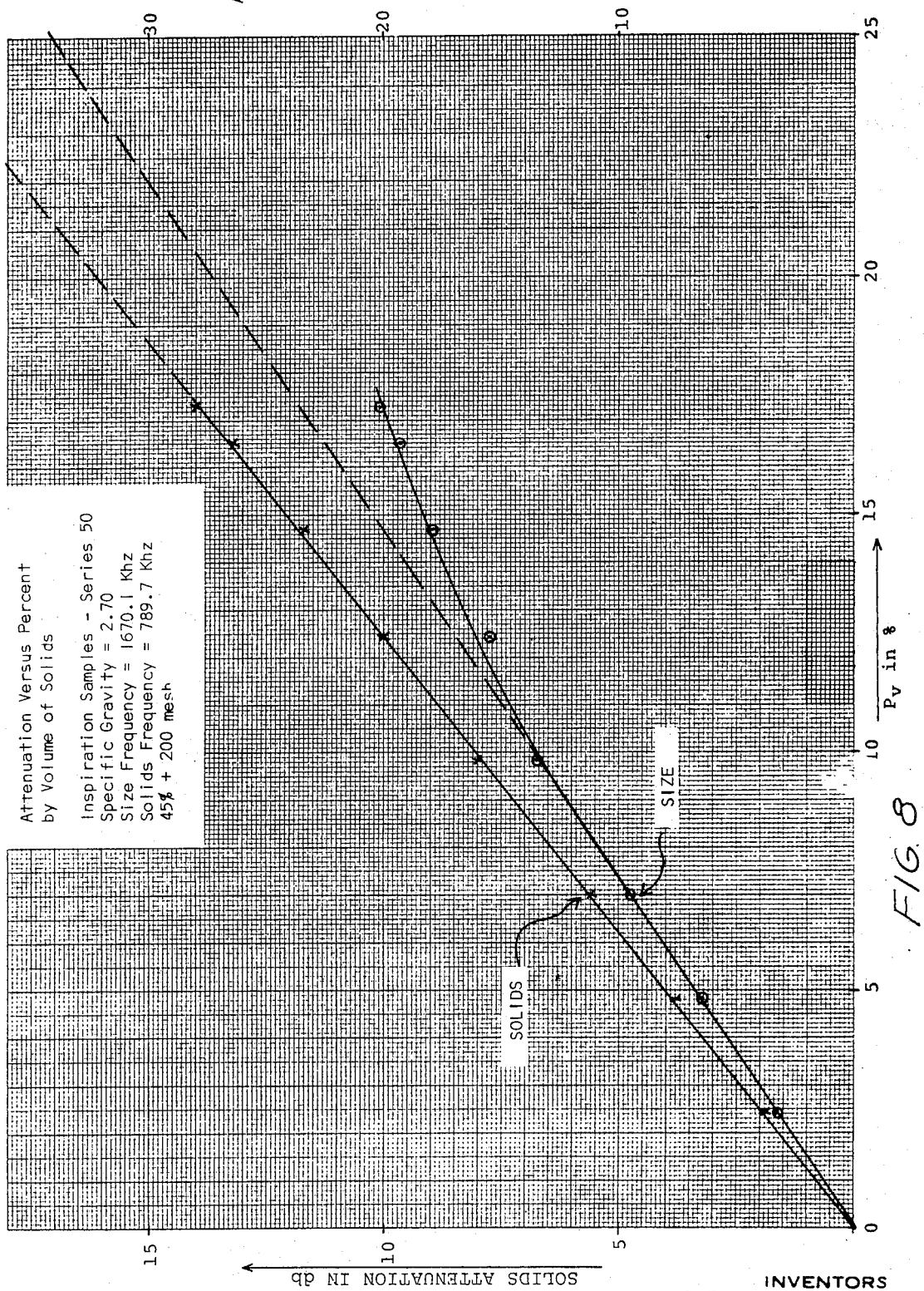
FIG. 8 is a graphical representation of attenuation versus percent by volume of solids for Inspiration Sample Series 50 at two frequencies.
Figure 9:
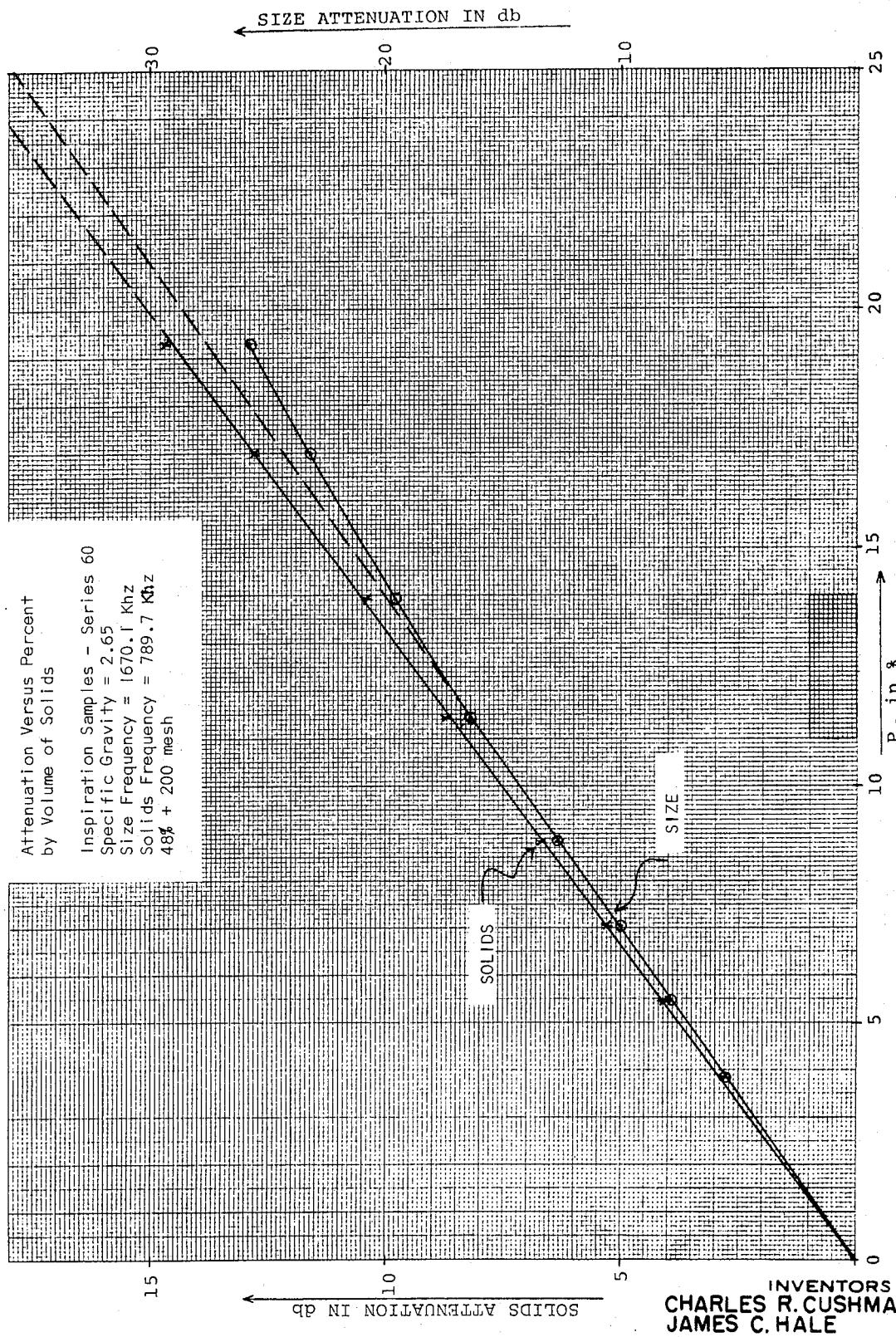
FIG. 9 is a graphical representation of attenuation versus percent by volume of solids for Inspiration Sample Series 60 at two frequencies.
Figure 10:
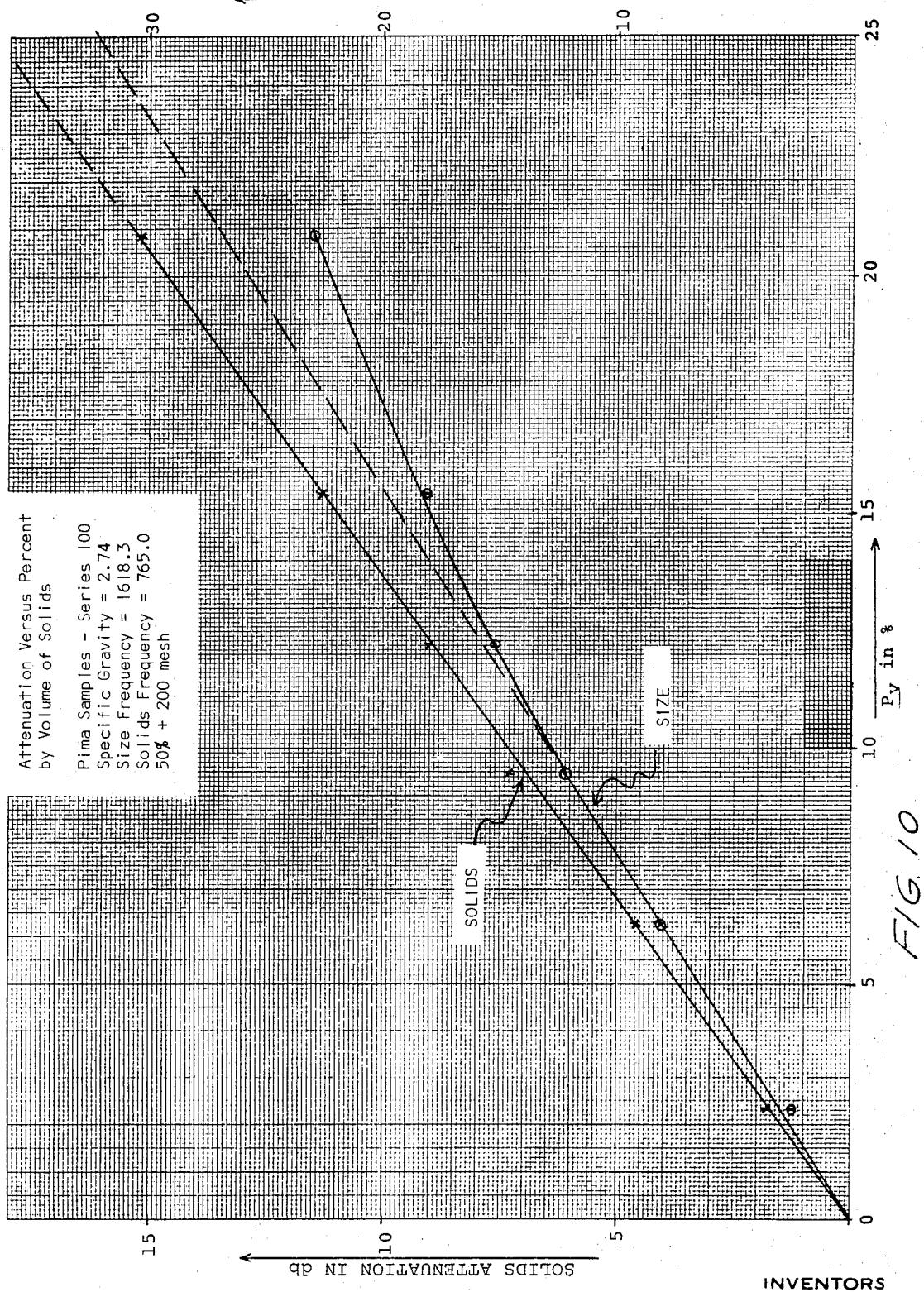
FIG. 10 is a graphical representation of attenuation versus percent by volume of solids for Pima Mining Series 100 at two frequencies.

$C = V_s/V_w$ = concentration by volume
Urick, R.J., Supra, p. 286, FIG. 5; Busby, J., and Richardson, E.G. 1955, "The propagation of ultrasonics in suspensions of particles in a liquid": Phys. Soc. (London) Proc., v. 69, no. B, FIG. 2, p. 197; and Gordon H. Flammer, 1962, "Ultrasonic Measurement of Suspended Sediment," Geological Survey Bulletin 1141-A, p. A15, FIG. 21, p. A40 give experimental data to support Equation 4. Results published in the above reference articles and experimental data derived by applicants as shown in FIGS. 4 through 10 support the basic assumption of direct proportion between ultrasonic attenuation and the number of particles. All samples have a characteristic attenuation which is independent of $P_v$ and $x$. This characteristic attenuation (defined as $\alpha_r$ for a single particle of radius $r$) is a function of frequency, temperature, particle specific gravity, and particle size. FIG. 1 is a graphical representation of $\alpha_r$ at 1 Mhz which will be discussed further presently. Equation 3 shows that the total attenuation of a single size sample with no particle interference is directly proportional to the characteristic attenuation.

An expression for the characteristic attenuation of slurry, $\alpha$, is derived later in this discussion and is represented by Equation 15. The characteristic attenuation of a single particle is important because it is used in the expression for the characteristic attenuation of slurry.

Now considering the attenuation of a sample with a single size with particle interaction, three types of interaction or interference can occur as the particles get closer together (increasing $P_v$):

a. particles close to the sound source shadow some particles further away.
b. scattered energy is reflected from the sound path.
c. particles touching will appear as a larger single particle.

The three types of particle interaction are related in that they all involve considering the sound wave as if it were a light wave. Thus, particle interaction becomes significant when the sound waves have the characteristics of light. Sound waves have the characteristics of light in what are commonly called the scattering-loss and diffraction-loss regions when the sound wavelength $\lambda$ is less than or equal to $6\pi r$ where $r$ is the particle radius, as shown in FIG. 1.

Interaction caused by particles touching should be negligible for $P_v \leq 26$ percent. When the particles are all of a single size, $P_v = 26$ percent turns out to be the point where the minimum distance between equally spaced sperical particles is approximately the same as the particle radius. This can be shown by taking one particle center as the focal point and building 20 tetrahedrons around this focal point to completely enclose it. The particle centers are the tetrahedron corners. Thus, since a particle is divided by 20 tetrahedrons:

$P_v$ = Particle volume enclosed by one tetrahedron/Volume of tetrahedron =
$[4/20(4/3\pi r^3)]/[0.11785011785(3r)^3] = 0.263 = 26.3$ percent.

Therefore, interaction caused by (c) is assumed to be negligible in the following analysis. Under normal mill conditions $P_v$ seldom exceeds 25 percent. Attenuation measurements in other than the viscous-loss region with $P_v$'s in excess of 10 percent results in a non-linear relation between $P_v$ and attenuation, see Equation 17.

When $\lambda \geq 12\pi r$, the particles vibrate in response to, but lag behind the sound wave. Particle interaction does not occur in this region (viscous-loss region) because the sound wave passes through each particle. Therefore, if the frequency is such that the particles are all in the viscous-loss region, there is no particle interaction, and Equation 3 for the attenuation coefficient is valid with no modifications.

If the frequency is such that the particles are in the scattering or diffraction-loss region, (a) and (b) may both be significant. Shadowed particles will subtract from the total number of particles per unit volume. Energy scattered from a number of particles will have an additive effect upon the attenuation coefficient. Equation 5 includes these effects due to (a) and (b) on Equation 1.

$$\alpha_T = (n-n_{sh})(x\alpha_\epsilon) + \alpha_s \qquad (5)$$

$n_{sh}$ = number of shadowed particles due to (a)
$\alpha_s$ = attenuation increase due to multiple scattering (b)

The increase in attenuation due to multiple scattering occurs because of the increase in the number of particles present per unit volume. Therefore, $\alpha_s$ is proportional to the number of particles present per unit volume. Defining $K_{sc}$ as the scattering constant:

$$\alpha_s = K_{sc} n \alpha_\epsilon = K_{sc} P_v x \alpha_r$$

(6)

(same derivation as equation 1 to 3)

The number of shadowed particles is proportional to the number of particles present per unit volume and the amount of solids present per unit volume. Defining $K_{sh}$ as the shadowing constant:

$$n_{sh} = K_{sh} P_v n = K_{sh} P_v (P_v / 4/3 \pi r^3)$$

(7)

Combining equations 6 and 7 with equation 5:

(8) $\alpha_T = \left( \dfrac{P_v}{4/3\pi r^3} - \dfrac{K_{sh} P_v^2}{4/3\pi r^3} \right)(x\alpha_\epsilon) + K_{sc} P_v x \alpha_r$ $= P_v(1 - K_{sh} P_v)(x\alpha_r) + K_{sc} P_v x \alpha_r$ (same derivation as equation 1 to 3)

$= P_v(1 + K_{sc} - K_{sh} P_v)(x\alpha_r)$

Equation 8 shows that as particle interaction becomes significant, attenuation becomes a nonlinear function of percent by volume of solids, for a sample with only a single size present.

Now considering the attenuation of a slurry with no particle interaction, it can be stated that the attenuation of a slurry mixture is due to the attenuation of each size fraction. Therefore, the total attenuation is a summation of the individual attenuations from each size fraction, Smoltezyk, H.U., 1955,"Beitrag zur ermittlung der feingeschiebe mengenganglinie": Inst. fur Wasserbau Mitt. 43, Technischen Univ. Berlin-Charlottenburg (in German), p. 25–60. Using Equation 3 for an expression of the attenuation of size fraction k (i.e., $\alpha_k = P_{vk} x \alpha_r$).

(9) $\quad \alpha_T = \sum_{r_0}^{r_\infty} P_{vk} x \alpha_r$ $P_{vk}$ = amount by volume of size fraction $k$
$\alpha_r$ = characteristic attenuation of one particle of size $k$
$r_0$ = smallest size occurring in the sample $\cong 0$
$r_\infty$ = largest size occurring in the sample A simplification of equation 9 can be shown breifly by noting that $P_{vk} = C_k$, where $C_k = V_{sk}/V_w$, at low concentration, $V_{sk}/V_s = W_{sk}/W_s$ and $W_{sk} = W_s(dP/dM)\Delta M$.

$\alpha_T = \sum_{r_0}^{r_\infty} C_k x \alpha_r = x \sum_{r_0}^{r_\infty} \dfrac{V_{sk}}{V_w} \alpha_r = x \sum_{r_0}^{r_\infty} \dfrac{V_{sk}}{V_s} \dfrac{V_s}{V_w} \alpha_r$ $= Cx \sum_{r_0}^{r_\infty} \dfrac{V_{sk}}{V_s} \alpha_r = Cx \sum_{r_0}^{r_\infty} \dfrac{W_{sk}}{W_s} \alpha_r$ $= Cx \sum_{r_0}^{r_\infty} \left( \dfrac{dP}{dM} \right) \Delta M = \lim_{\Delta M \to 0} Cx \sum_{r_0}^{r_\infty} \alpha_r \left( \dfrac{dP}{dM} \right) \Delta M$ $= Cx \int_{r_0}^{r_\infty} \alpha_r dP = Cx\alpha$ The new variables introduced are defined in the following more lengthy derivation of $\alpha_T$ which results without the $C_k$ substitution.

$P_{vk} = \dfrac{V_{sk}}{V_{sk}+V_w} = \dfrac{1}{1+\dfrac{V_w}{V_{sk}}} = \dfrac{1}{1+\dfrac{1}{\dfrac{V_{sk}}{V_s} \cdot \dfrac{V_s}{V_w}}} = \dfrac{1}{1+\dfrac{1}{C\left(\dfrac{V_{sk}}{V_s}\right)}}$ $= \dfrac{1}{1+\dfrac{1}{C\left(\dfrac{W_{sk}}{W_s}\right)}}$ since $\dfrac{V_{sk}}{V_s} = \dfrac{W_{sk}/(S.G.)}{W_s/(S.G.)} = \dfrac{W_{sk}}{W_s}$ S.G. = specific gravity of the particles
$W_{sk}$ = the weight of size fraction k
$W_s$ = the total weight of solids or particles Expanding this expression for $P_{vk}$ by division gives a rapidly convergent infinite series since $C \leq .3$ and $W_{sk}/W_s < 1$ $P_{vk} = C(W_{sk}/W_s) - C^2(W_{sk}/W_s)^2 + C^3(W_{sk}/W_s)^3 - \ldots$ (10)

Substitution of equation 10 into equation 9 gives:

(11) $\quad \alpha_T = \sum_{r_0}^{r_\infty} x\alpha_r \left( c\left(\dfrac{W_{sk}}{W_s}\right) - C^2\left(\dfrac{W_{sk}}{W_s}\right)^2 + C^3\left(\dfrac{W_{sk}}{W_s}\right)^3 \ldots \right)$ If $P$ is a mathematical expression for the weight fraction of the sample larger than size $M$, $(dP/dM)\Delta M$ equals the weight fraction of the sample between two sieves $\Delta M$ apart. Therefore, $W_s(dP/dM)\Delta M$ equals the weight between two sieves $\Delta M$ apart which is $W_{sk}$.

$(W_{sk}/W_s)^n = (dP/dM)^n \Delta M$ for $n = 1$ to $\infty$

Using this relationship equation 11 becomes:

(12) $\quad \alpha_T = \sum_{r_0}^{r_\infty} x\alpha_r \left( C\left(\dfrac{dP}{dM}\right)\Delta M - C^2\left(\dfrac{dP}{dM}\right)^2 \Delta M + C^3\left(\dfrac{dP}{dM}\right)^3 \Delta M \ldots \right)$ Let $\Delta M \to 0$ in equation 12 and use the fundamental theorem of integral calculus to get:

(13) $\quad \alpha_T = Cx \int_{r_0}^{r_\infty} \alpha_r \left(\dfrac{dP}{dM}\right) dM -$ $C^2 x \int_{r_0}^{r_\infty} \alpha_r \left(\dfrac{dP}{dM}\right)^2 dM + C^3 x \int_{r_0}^{r_\infty} \alpha_r \left(\dfrac{dP}{dM}\right)^3 dM - \ldots$ If the expressions for $\alpha_r$ and $dP/dM$ are used as a substitution $r = f(z)$ made so the integrals in Equation 13 go from $-\infty$ to $+\infty$ it can be shown with some difficulty that $g(z)$, the expression inside the integral, has a zero greater than one at $\infty$. Therefore, by the residue theorem from complex variables:

(13a) $\quad \int_{r_0}^{r_\infty} \alpha_r \left(\dfrac{dP}{dM}\right) dM = \int_{r_0}^{r_\infty} \alpha_r \left(\dfrac{dP}{dM}\right)^2 dM =$ $\int_{r_0}^{r_\infty} \alpha_r \left(\dfrac{dP}{dM}\right)^3 dM = \ldots = K$ and equation 13 becomes $$\alpha_T = CKx - C^2Kx + C^3Kx - \ldots \quad (14)$$

(this can be simplified by noting the expansion of $P_{vk}$ between equations 9 and 10)

$$= \left(\frac{1}{1+\frac{1}{C}}\right)Kx = \left(\frac{C}{1+C}\right)Kx$$

$$= xP_v \int_{r_0}^{r_\infty} \alpha_r dP \quad \text{since } P_v = \frac{C}{1+C}$$

Note the similarity of equation 3 for a solution with a single size present and Equation 14 with a distribution of sizes. Equation 14 shows that the attenuation of a mixture of particles with no particle interaction is also directly proportional to $P_v$, $x$, and the characteristic attenuation. The characteristic attenuation of slurry is the intergration of the attenuation of a single particle times the difference in the weight retained on two screens with an infinitesimal size difference.

(15) $\alpha = \int_{r_0}^{r_\infty} \alpha_r dP$ is the characteristic attenuation of slurry In consideration of the attenuation of a mixture with particle interaction, it has been found that for distributions with mean diameters between 40 and 250 microns, which seem common for most copper milling operations, some particles will be in the scattering-loss region and some will be in the viscous-loss region for ultrasonic frequencies between 500 Khz and 3 Mhz. If the frequency is below 500 Khz, most distributions with mean diameters between about 40 and about 250 micron particles will be in the viscous-loss portion of the attenuation curve. See FIGS. 2 and 3.

If all particles are in the viscous-loss region, particle interaction is insignificant. Therefore, Equation 14 which gives an expression for the attenuation of slurry versus $P_v$ for no particle interaction is valid for sufficiently low frequencies where the attenuation is mainly due to viscous-loss. Equation 14 for slurry becomes:

(16) $\alpha_T = P_v \alpha_v x$ where $\alpha_v = \int_{r_0}^{r_\infty} \alpha_{vr} dP$ where $\alpha_{vr}$ is the viscous-loss portion of the characteristic attentuation of a single particle FIGS. 4 through 10 show measured data with increasingly coarser grinds at 765.0 Khz and 789.7 Khz which verifies Equation 16 for actual slurry samples. From 95 to 100 percent of the attenuation of these distributed samples is due to viscous loss at the solids frequency and, therefore, accounts for their linearity with percent by volume of solids ($P_v$). A simultaneous attenuation measurement at a higher frequency is shown on FIGS. 4 through 10. Comparison of the curves shows the nonlinearity which occurs at increasing $P_v$ when a significant percentage of the sample attenuation is due to scattering-loss. While prior art workers have assumed a linear relationship between attenuation and concentration ($C$), See Equation 4, it is shown herein that linearity only exists between $P_v$ and attenuation.

The assumed linear relationship of concentration and attenuation in other than the viscous-loss region is valid only when the concentration is less than about 10 percent.

The derivation of the equivalent of Equation 8 to define this nonlinear attenuation of slurry versus $P_v$ due to scattering-loss particle interaction is a repetition of previous derivations so it will not be done here. Differences arise in the final equation because part of the sample is in the viscous-loss and part in the scattering-loss regions. This equation is complex because it involves $P_v$ fractions in the two different loss regions and nonlinear terms caused by particle interaction of the scattering-loss portion.

$$\alpha_T = P_{vsc}(1+K_{sc}-K_{sh}P_{vsc})\alpha_s x + P_{vv}\alpha_v x$$

$P_{vsc}$ = amount of solids per unit volume in scattering-loss $P_{vv}$ = amount of solids per unit volume in viscous-loss $\alpha_s$ = equation 15 integrated over scattering-loss $\alpha_v$ = equation 15 integrated over viscous-loss Observe that this equation degenerates to Equation 16 if the sample is entirely in the viscous-loss region or to Equation 8 if particle interaction predominates and the viscous-loss term is negligible.

The size frequency data in FIGS. 4 through 10 verifies Equation 17 as the attenuation versus $P_v$ curve is nonlinear when a major part of the sample attenuation is due to scattering loss. Two of the finer samples which have a significant portion of the attenuation due to viscous-loss are even linear with $P_v$ at the size frequency.

Experimental data taken as high as 2.8 Mhz has shown that even though a significant part of the attenuation is due to scattering-loss, portions of the $P_v$ versus attenuation curves can be linearized. For instance, any $P_v$ span of 10 percent or less on the nonlinear size versus $P_v$ curves of FIGS. 4 through 10 can be approximated by the empirical Equation 18:

$$\alpha_T = P_v \alpha x + K_2 x \quad (18)$$

$K_2$ is a constant for any particular sample which would be a function of the sample distribution and the frequency.

Since most milling operations prefer to operate under steady state conditions over a narrow range of $P_v$, Equation 18 may be used to approximate scattering-loss operation by the instrument of this invention.

The reason a linear approximation is used to describe sample attenuation when operating in the scattering-loss region will become clear when the method of obtaining a signal sensitive to size only is discussed. Equation 18 is used to describe the attenuation versus $P_v$ in all further discussions ($K_2 = 0$ when Equation 16 is valid and all of the attenuation is in the viscous-loss region). It will be appreciated by those skilled in the art that at low levels of concentration particle interaction is insignificant and $K_2$ will be zero.

Having established the basic Equation 18 for attenuation of the ultrasonic signal resulting from the percent solids, the mathematical relationships which express the output of the apparatus of this invention as a function of the particle size distribution of the slurry may be derived. Suspended particles in a fluid attenuate an ultrasonic wave passing through them. The basic relationship which describes attenuation due to the suspended particles is;

$$E = E_o e^{-\alpha_T} \quad (19)$$

$E$ is sound-amplitude present if particles are suspended in the fluid
$E_o$ is sound-amplitude present at the same point if no particles were present
$e$ is the base of the Naperian logarithm
$\alpha_T$ is the attenuation coefficient due to suspended particles If no particles are present $\alpha_T$ equals zero. This is an important point since some reference must be used for attenuation measurements. Thus, since water is the suspending medium of slurry, particle free water is used to give a reference level on which all slurry attenuation measurements are based. Water does have a finite attenuation (i.e., 0.003 db/inch at 1 Mhz at 20° C) which changes with temperature; however, the attenuation value of water and its temperature coefficient are so small that they can be neglected when compared with the attenuation of slurry. Principles of Underwater Sound for Engineers, R.J. Urick, McGraw-Hill Book Company, New York, 1967, pp. 88 and 89. In the metric system, the attenuation coefficient $\alpha_T$, which is the logarithm of an amplitude ratio, is measured in nepers per centimeter. The English system equivalent $$E = E_o 10^{-0.05 \alpha_T} \quad (20)$$

has $\alpha$ in units of decibels per inch. Six decibels of attenuation are equivalent to a 100 percent decrease in sound-amplitude. A neper per centimeter equals 22.05 decibels per inch.

As discussed earlier, the attenuation coefficient $(\alpha_T)$ is a function of percent by volume of particles in the sound path $(P_v)$, length of the sound path $(x)$, and the characteristic attenuation of a sample $(\alpha)$. The characteristic attenuation was shown to be the summation of the attenuations of the individual fractions. The characteristic attenuation $(\alpha)$ is therefore a function of the sample distribution and the attenuation of an individual particle of radius $r$. As shown in the following equation the attenuation of an individual particle of radius $r$ is a function of the specific gravity of the particle (S.G.), the frequency of the sound wave $(f)$, temperature (viscosity and sound velocity $v$), and particle radius $(r)$.

Basic ultrasonic attenuation theory was developed by Sewell (1910), Epstein (1941), Urick (1948), and Carhart (1950). These men derived expressions for the characteristic attenuation of a single spherical particle covering the viscous-loss and scattering-loss ranges. The viscous-loss and scattering-loss are defined in FIG. 1. Weinel (1953) showed that for rigid spheres in water the various expressions are equal. His expression for the characteristic attenuation of a single particle of radius $r$ in water has a viscous-loss term $(\alpha_{vr})$ and a scattering-loss term $(\alpha_{sr})$.

$$(21) \quad \alpha_r = \left( \underbrace{\frac{18\gamma^2(1+\gamma)(S.G.-1)^2(\omega/v)}{81(1+\gamma)^2 + \gamma^2[9+4\gamma(S.G.+1/2)]^2}}_{\alpha_{vr} \text{ (viscous-loss term)}} + \underbrace{\frac{r^3(\omega/v)^4}{12}}_{\alpha_{sr} \text{ (scattering-loss term)}} \right) 22.05 \text{ db/inch}$$

Figure 11:
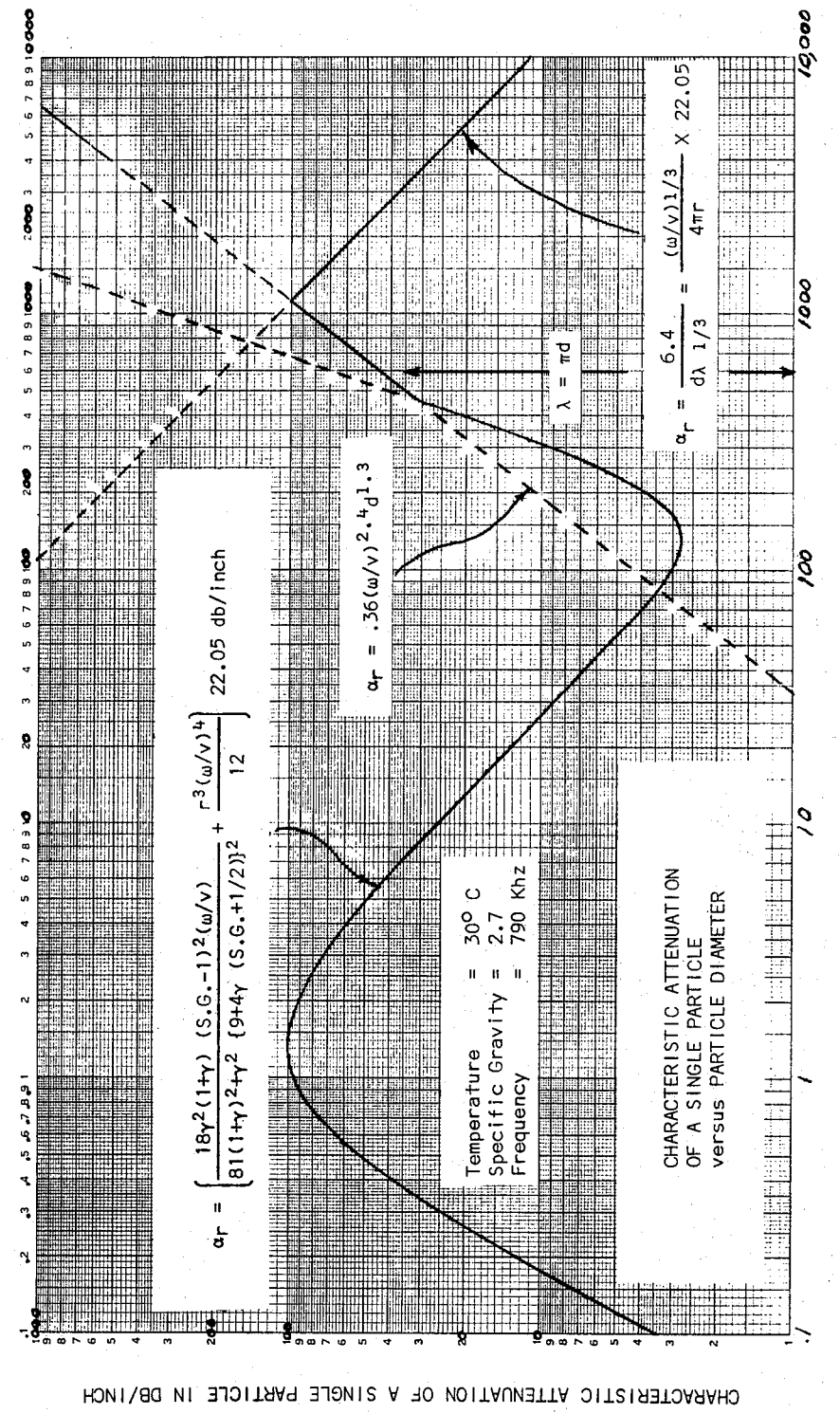
FIG. 11 is a graphical representation of the characteristic attenuation due to a single particle at a single frequency versus particle size showing the theoretical and empirical equations used.

$\alpha_r$ is the characteristic attenuation of a single particle of radius $r$
$r$ is particle radius in centimeters (1 cm = $10^4$ microns)
$f$ is frequency
$\omega = 2\pi f$
$\gamma = r\sqrt{\omega/2}$
is kinematic viscosity of water, in stokes
$v$ is sound velocity in water in centimeters per second
S.G. is specific gravity of the particle
22.05 db/inch equal to 1 neper per centimeter The viscous-loss term of Equation 21 has been experimentally verified for spherical particles with diameters less than $\lambda/\pi$ where $\lambda$ = wavelength = $v/f$. The scattering-loss term $(\alpha_{sr})$ is not completely valid because it increases without bound for larger particles as shown by the dotted line extension of the curve in FIG. 11. Empirical equations for particles larger than $\lambda/\pi$ were developed by Flammer (1962) supra for the transition region between the scattering-loss and diffraction-loss, and for the diffraction-loss region. FIG. 11 shows Flammer's empirical equations and Equation 21 for 790 Khz at 30° C for particles with a specific gravity of 2.7.

Combining the scattering-loss $(\alpha_{sr})$ term in Equation 21 and Flammer's empirical equation for the diffraction-loss from FIG. 11 gives an expression valid over the range of sizes of particles normally occurring in a slurry.

$$(21a) \quad \alpha_r = \left( \underbrace{\frac{18\gamma^2(1+\gamma)(S.G.-1)^2(\omega/v)}{81(1+\gamma)^2 + \gamma^2[9+4\gamma(S.G.+1/2)]^2}}_{\alpha_{vr}} + \underbrace{\frac{1}{\frac{12}{(\omega/v)^4 r^3} + \frac{4\pi r}{(\omega/v)^{1/3}}}}_{\alpha_{sr}} \right) 22.05 \text{ db/in}$$

Figure 12:
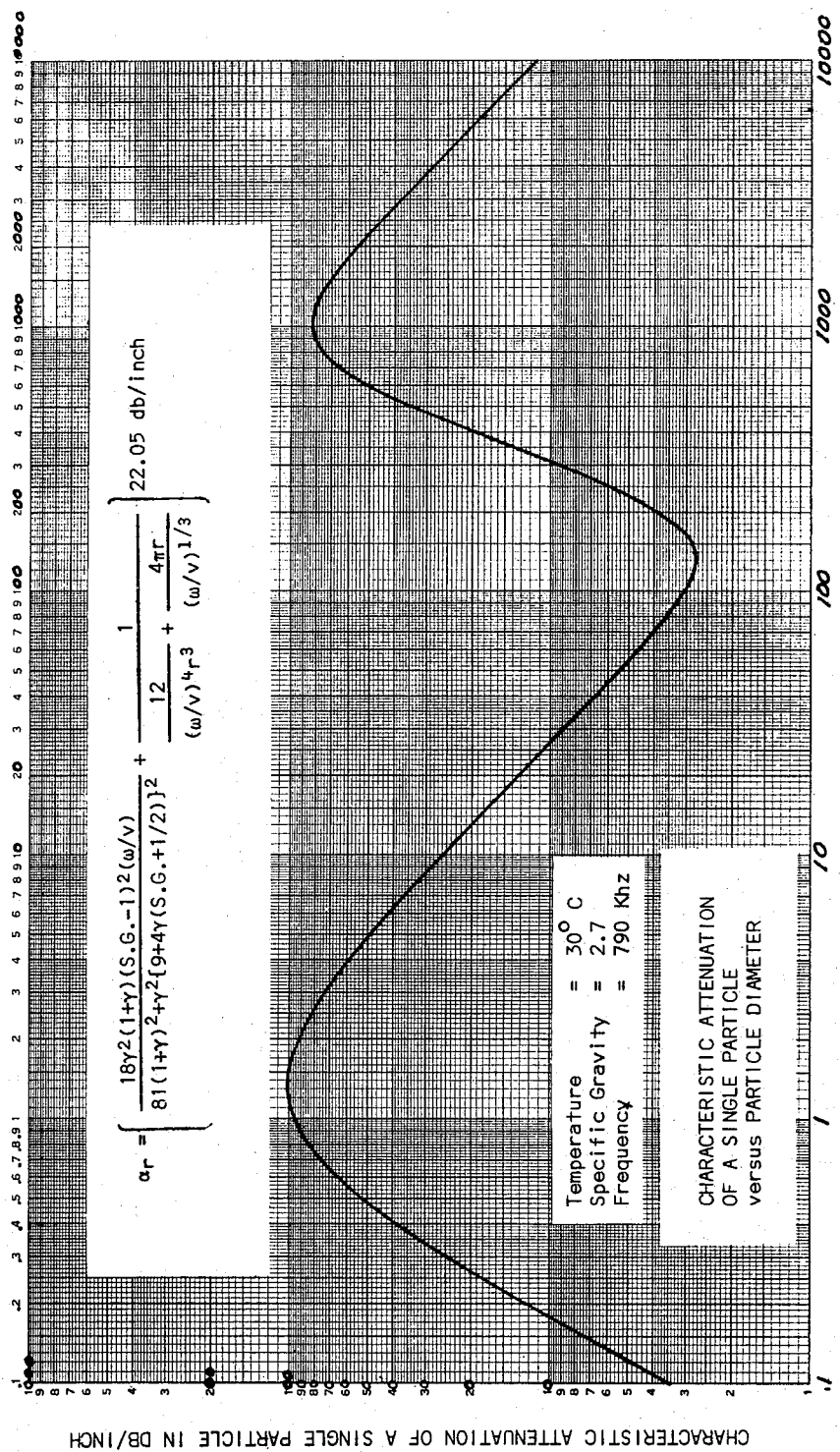
FIG. 12 is a graphical representation of Equation 22a corresponding to FIG. 11.
Figure 13:
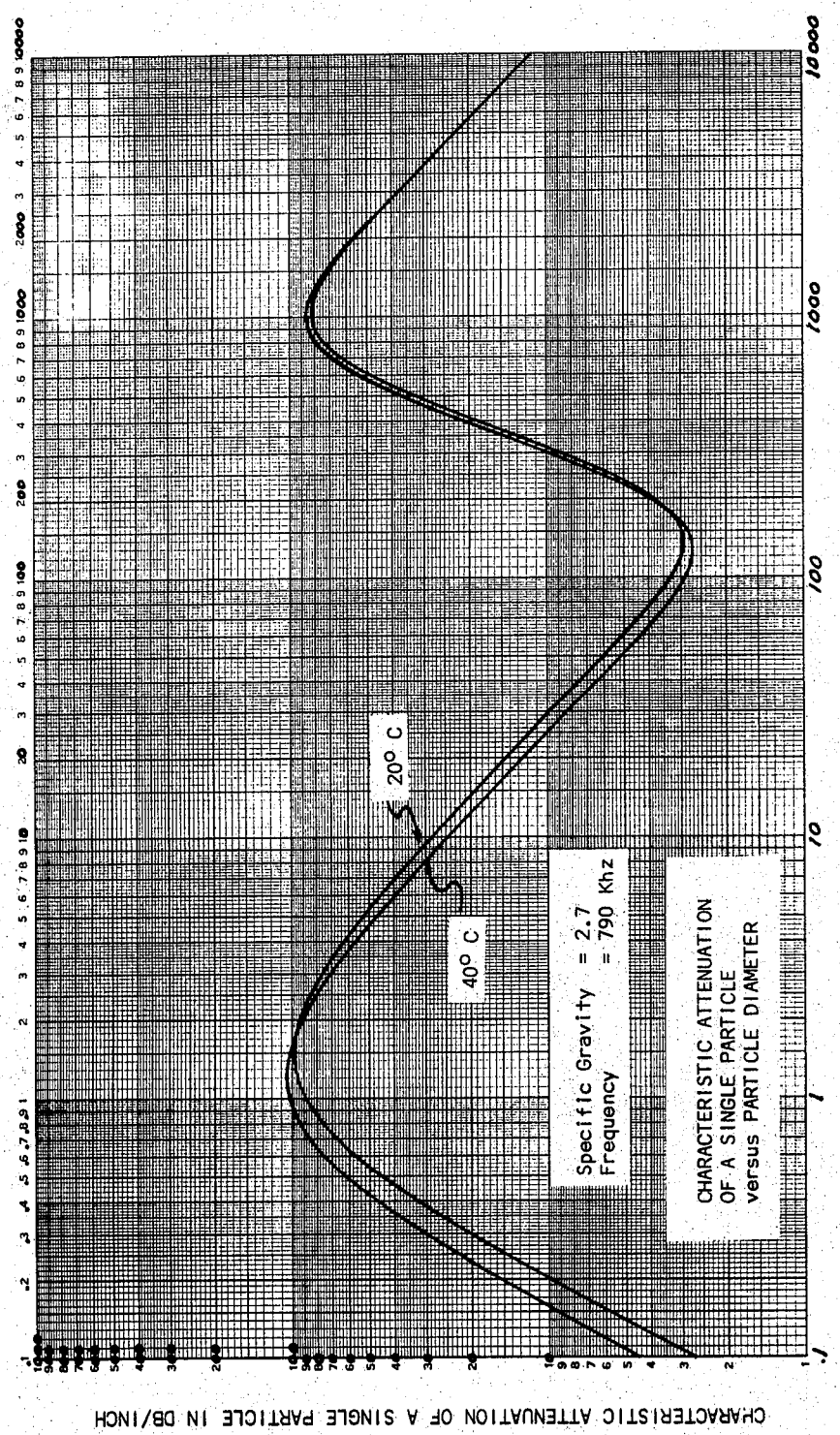
Figure 14:
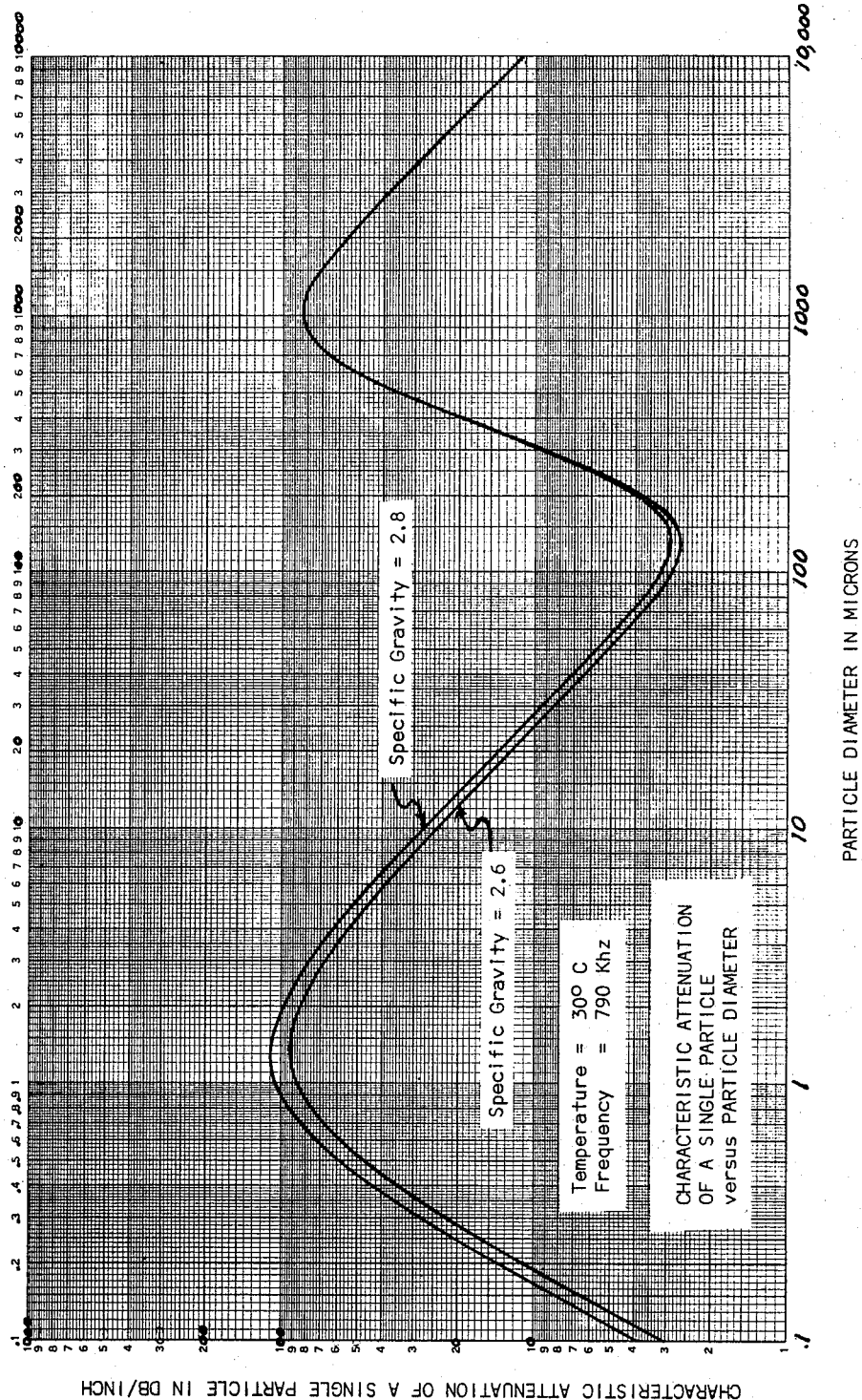

Infinited series are required to develop an exact expression for scattering-loss, which has not been done because of the complexity involved. The $\alpha_{sr}$ term in Equation 21a is, therefore, a simplified expression which is less accurate but is sufficient for our purposes. The reciprocals arise in the $\alpha_{sr}$ term so that the scattering and diffraction-loss will become negligible at the size extremes. Equation 21a is the expression used in this discussion for the characteristic attenuation of a single particle. FIG. 12 is a graph of this equation corresponding to FIG. 11. The temperature dependent terms of equation 21a are the viscosity of water and the velocity of sound in water. FIG. 13 and FIG. 14 respectively show temperature and specific gravity sensitivity of Equation 21a. Measurement of specific gravity variations in ore milling operations has indicated typical changes are less than ± 0.05; this gives a negligible change in the size output of the system.

If a slurry sample consisted of a single uniform size, Equation 21a would give the characteristic attenuation of the sample directly because the total attenuation would be due only to the single size particles present. The occurrence of multiple size fractions, however, requires the summation of the contribution of the different size fractions to the total attenuation. Therefore, Equation 15 for the characteristic attenuation of a slurry which was derived earlier requires a mathematical description of the particle size distribution of the slurry. Equation 22, used to mathematically describe a slurry sample, has been chosen because of the physical significance of the variables in the equation and the accuracy with which it describes the sample. Other equations which were investigated to describe the sample, but were difficult to manipulate mathematically or did not fit the data at the coarse end of the sample are: the Rosin and Rammler empirical distribution law, $P1 = 100 \, \text{Exp} \, [-(M/C)]^b$ where $c$ and $b$ are constants and $P1$ is the percent of particles having a size larger than $M$; and the Schuhmann equation, $P = 100 \, (M/K)^\alpha$ where $\alpha$ and $K$ are constants and $P$ is the percent of particles smaller than size $M$.

The cumulative weight percent retained on a standard size screen is the data acquired during the screen analysis of a sample. This weight percent ($P$) of a sample retained on a screen of size $M$ where $M$ is the diameter of the screen openings in microns is given by:

$$(22) \quad P = 50 - \frac{100}{\sqrt{\pi}} \int^z \text{EXP} \, [-(z^2)] dz \text{ where } z = \frac{\ln\left(\frac{(M - M_0)(M_\infty - M_0)}{M(M_\infty - M)}\right)}{\sqrt{2} \ln (\sigma)}$$

$\overline{M}$ = the geometric mean size in microns
$M_\infty$ = larger size occurring in the sample in microns
$M_o$ = smallest size occuring in the sample in microns
= 0 for the following discussion
$\sigma$ = standard deviation This equation describes a modified log-normal distribution is a special case of Equation 22 with $M_o$ of time and a minimum and maximum size of formation by F. Kottler, J. Franklin Inst., v. 250, P. 339 (1950); ibid., v. 250, p. 419 (1950). A general discussion of the various distributions which this equation describes is given in "Particle Size Measurement, Interpretation, and Application" by R.R. Irani and C.F. Callis, Wiley and Sons, New York, pp. 39–57 (1963). Irani and Callis give Equation 22 in terms of the ERF function as:

$$(22a) \quad P = 50 - 100 \, \text{ERF} \, (z) \text{ where ERF } (z) = \frac{1}{\sqrt{\pi}} \int_0^z \text{EXP} \, [-(z^2)] dz$$

As Irani and Callis point out, a simple log-normal distribution is a special case of Equation 22 with $M_o \rightarrow 0$ and $M_\infty \rightarrow \infty$. A simple log-normal distribution gives a straight line on a log-log plot of $P$ versus $M$. Slurry samples appear to be close to log-normal for sizes smaller than $M$. Due to classification by cyclones or other means most mills exhibit an artificial distribution. This artificial distribution can only approximately be represented at the coarse end of the sample by Equation 22 because, as the derivation by Kottler shows, the $M_\infty$ term is due to particle formation kinetics not classification. The coarse end of the sample is considered to be sizes larger than $\overline{M}$. Since all slurry samples investigated appear to approach a log-normal equation at the fine end of the sample, the $z$ variable of Equation 22 can be modified to:

$$(22b) \quad z = \frac{\ln\left(\frac{M}{\overline{M}}\left(\frac{M_\infty}{M_\infty - M}\right)^n\right)}{\sqrt{2} \ln (\sigma)}$$

where: $M_0 = 0$ and $P = 50 - 50 \, \text{ERF} \, (z)$

This modification introduces the variable $n$ which gives an adjustable curvature at the coarse end of the sample.

The sample can be seen to approach log-normal at the finer sizes since as $M \rightarrow 0$, $z \rightarrow \ln (M/\overline{M})/\sqrt{2}/\ln(\sigma)$. This modification sometimes gives a significant improvement in the curve fit of a typical sample's screen analysis data taken from 35 to 400 Tyler Mesh as shown by comparison of FIGS. 15 and 16 which show curve fits resulting from the 4 variable Equation 22b and the 3 variable Equation 22 ($M_o = 0$) respectively for the same screen analysis data.

For any particular grinding circuit, a typical sample can be described accurately using Equation 22b by defining the constants $M_\infty$, $\overline{M}$, $\ln(\sigma)$, and $n$. This involves measuring weight percents retained on standard size screens and using a computer routine to calculate $M_\infty$, $\overline{M}$, $\ln(\theta)$ and $n$ to give the least mean square error fit of the measured data to Equation 22b. This is a fairly lengthy procedure involving a complicated computer routine. Although the 4 variable Equation 22b normally provides the best fit of the curve to the screen analysis, FIG. 17 shows an excellent least mean square error fit for one concentrator's ore slurry using the 3 variable Equation 22. Either equation or others may be used, whichever provides the best fit to the data. FIGS. 15, 16, and 17 are plots of particle diameter in microns versus $P$ on log-probability paper. They are similar to graphs of the log of the screen size versus cumulative percent retained, which is the familiar Schumann Plot.

The constant $M_\infty$ is defined as the upper limit size asymptore; $\overline{M}$ can be defined by noticing that in Equation 22 when $P = 50$ percent, $z = 0$, therefore, $M = \overline{M} M_\infty/(M_\infty + \overline{M})$. When $M_\infty$ is very large as for a log-normal sample $M = \overline{M}$ at $P = 50$ percent. FIG. 18 shows $P$ versus $\overline{M}$ for variations in $M$ and $\ln(\sigma)$, which shows the affects $M_\infty$, $\overline{M}$, and $\sigma$ have on the cumulative percent +65 Tyler mesh ($P_{+65}$). Notice that for the particular values of the variables in FIG. 18 ($P_{+65}$) increases as $\overline{M}$, $M_\infty$, and $\ln(\sigma)$ increase.

Industry is typically interested in recovering the valuable ingredients in a crushed and/or ground product expending minimum time and energy to the total process. The recovery rate and/or amount since it is size distribution dependent is a function of the same three significant variables as Equation 22. To simplify calculations involving mill parameters, the cumulative weight percent retained on a standard Tyler Mesh sieve is typically used as an indication of the size of a product (e.g. $M_\infty$ and $\sigma$ constant). In reality, typical mill variations cannot be described assuming any two of the size variables fixed. Computer evaluation of typical data has shown that there is some parameter correlation during normal operation but no size parameter remains fixed: results show that $\overline{M}$ and $\ln(\sigma)$ increase or decrease together within certain limits. FIG. 19 shows this correlation for typical samples. The method of correlating $P_{+65}$ to the size output of the instrument of this invention discussed in the following pages assumes:

1. typical variation of $\overline{M}$ is less than 3 to 1
2. typical variation of $M_\infty$ is less than $\pm 10$ percent
3. constant $\sigma$ or a relationship between $\ln(\sigma)$ and $\overline{M}$
4. for scattering - loss operation only $P_v$ (percent by volume of solids) changes are small enough to enable linearization of $\alpha_T$, versus $P_v$ The analysis of operation of the instrument of this invention in the field has shown these assumptions to hold under normal mill operations. The first assumption must be true in order to keep the "grind" of the slurry at a tolerable level. Computer analysis of mill samples as in FIGS. 15, 16, and 17 indicates that an $\overline{M}$ variation of as large as 3 to 1 would mean that the mill circuit were under-grinding and over-grinding the ore respectively.

The greatest cause of the variation of $M_\infty$ in a mill circuit is probably the classifier (i.e., cyclone). A $\pm 10$ percent change in $M_\infty$ seems typical from data analysis as in FIGS. 15, 16, and 17. A larger variation in $M_\infty$ increases the correlation error of the size output to $P$ as will be discussed.

A relationship between $1n(\sigma)$ and $\overline{M}$ seems to be normal for typical mill operation as shown in FIG. 19. If $1n(\sigma)$ had no relationship to $\overline{M}$, this would increase the error of correlation of the size output to $P_{+65}$ as discussed later. By necessity $1n(\sigma)$ must remain within certain limits under normal mill operation for the same reasons $\overline{M}$ is bounded. The fourth assumption is necessary only if a frequency is chosen for operation where the samples measured have appreciable scattering loss. This assumption then enables a linearization of the relationship of the attenuation versus $P_v$.

The characteristic attenuation of a mixture of particles was derived earlier, Equation 15, as the integration of the characteristic attenuation of a single particle times the difference of the weight retained on two screens an infinitesimal size apart.

$$(23) \quad \alpha = \int_{r_0}^{r_\infty} \alpha_r dP$$

$\alpha$ is the characteristic attenuation of a distributed sample.

$\alpha_r$ is defined by equation (21a).

$P$ is defined by equation 22 or some other equation which accurately discribes the sample distribution.

$dP$ (the differential of $P$) is the difference in weight of the material retained on two screens and infinitesimal size apart.

$r_0$ and $r_\infty$ are the smallest and largest particle size in the sample.

The first step in calculating the output of the particle size and percent solids monitor of this invention is to compute the characteristic attenuation of the samples which are to be measured with the instrument. In order to do this, the constants $M_\infty$, $\overline{M}$, and $\sigma$ of Equation 22 must be defined. This can be done by using screen analysis data and a modified University of Coloroado CDC 6400 unsupported library computer program identified as LGCFR which adjusts the parameters of a function supplied by the user to give the best least-squares fit to a set of data. The function $P = 50 - ERF(z)$ was used along with the University of Colorado program for the ERF function identified as Computer Program No. 5-1-76; this routine defines $ERF(z)$ as:

$$(24) \quad ERF(z) = \frac{2}{\sqrt{\pi}} \int_0^z EXP[-(z^2)]dz$$

The factor of two differences in this definition from the definition used in Equation 22 is taken into account in the computer program. The LGCFR program prints out values for $M_\infty$, $M$, $1n(\sigma)$, the RMS error, and calculated and given values of the function. If Equation 22b were used, n would be printed out also.

Once $M_\infty$, $\overline{M}$, and $1n(\sigma)$, are known, Equation 23 for the characteristic attenuation can be evaluated. The applicants have successfully used a University of Colorado CDC 6400 supported library computer program No. D-1-6 called GAUSQZ which evaluates the integral of the function $F(x)$ on the interval $(A,B)$ using Gauss-Legendre quadrature. The interval is divided into $NP$ panels and an equation of order $N$ is used to approximate the area of each panel. For this particular program the constants used were:

$A = 0.05$ microns radius $= 5.0 \times 10^{-6}$ cm $=$ the lower limit of integration $B = \frac{1}{2}(M_\infty - 0.1)$ microns $= \frac{1}{2}(M_\infty - 0.1) \times 10^{-4}$ cm $=$ the upper limit of integration $N = 6 =$ the order of the quadrature formula for each panel $NP = 200 =$ the number of panels into which the interval $(A,B)$ is subdivided The GAUSQZ program sums the area of the panels and prints out values for characteristic attenuation ($\alpha$).

Equation 18 repeated here as Equation 25 for convenience, is the relationship used which gives the attenuation coefficient for a slurry sample.

$$\alpha_T = P_v \alpha x + K_2 x \quad (25)$$

Converting Equation 20 to decibels by taking 20 times the logarithm and substituting Equation 25 for $\alpha_T$ gives:

$$20 \log(E/E_o) = -\alpha_T = -P_v \alpha x - K_2 x \quad (26)$$

If the characteristic attenuation of a sample is calculated and the $K_2 x$ value known from actual field installation measurements, the amount the slurry attenuates a signal can be calculated from Equation 26.

Following the two steps outlined previously for determination of the values of the parameters which define the slurry characteristics using computer analysis for a number of samples from a particular mill site gives the $M_\infty$, $M$, $\sigma$, and characteristic attenuation variations at that site. Using a solids frequency of 790 Khz where $K_2 x$ has been found to be zero at most copper mills, the solids receiver output is calculated from Equation 26 as:

$$20 \log(E/E_o) = -P_v \alpha x \quad (27)$$

For a typical solids sensor spacing of 4 inches, the full scale ($P_v = 25$ percent) calculated solids attenuation is $-\alpha$ or equal to the characteristic attenuation. The $\alpha$ value can be compared with the solids calibration used at a given concentrator site as a comparison of calculated and measured attenuations.

FIG. 20 shows cumulative percent +65 versus size output readings on a 0 – 100 scale from the instrument of this invention for 24 samples from Magma Copper Corporation in San Manuel, Arizona. These 24 samples from Magma are some of the more extreme values from a total of 286 samples used to derive the curve of FIG. 20 and were used to calculate limiting values of $M_\infty$, $\overline{M}$, and $1n(\sigma)$. The curve of FIG. 20 was derived by a computer routine to provide the least square error fit to the 286 samples. The least square error equation for FIG. 20 is $P_{+65} = 1.14 + 9.58(x/100) + 4.25(x/100)^2$. Least square error is 0.64 percent. FIG. 21 shows the effect on the attenuation of changes in $1n(\sigma)$ and $M_\infty$. FIG. 22 is a compressed view of FIG. 21 with x's for the samples of FIG. 20. FIG. 22 shows that the solids characteristic attenuation remains fairly constant from fine to coarse grinds in a typical mill. FIGS. 20, 21, and 22 have been prepared for illustrative purposes only and are not completely accurate for the following reasons: (1) Only five sieves were used in the screen analysis from which the $M_\infty$, $M$ and $1n(\sigma)$ variations shown in FIGS. 20, 21, and 22 were calculated, (2) only three variables were used to fit the data to Equation 22 and; (3) Equation 21a (with the scattering-loss approximation) was used in the calculations of characteristic attenuation for these samples.

Exact correlation of measured and calculated numbers requires 10 sieves in the screen analysis, a 4 variable fit to the screen data, and a more complicated expression for the $\alpha_{sr}$ term of Equation 21a. A more accurate analysis narrows the band of x's shown in FIG. 22 and leaves the curves of FIGS. 20, 21, and 22 the same shape.

To obtain a number which can be correlated with the instrument particle size output requires first calculating the size receiver output. The size receiver of the instrument of this invention is the same as the solids receiver except it measures the attenuation of the slurry sample at a frequency higher than the solids frequency in the preferred embodiment. The constant $K_2x$ of Equation 26 is not negligible at the higher frequency. In normal operation the value of $K_2x$ is determined empirically and set into the instrument so that it is subtracted from the size receiver output prior to further electronic processing.

The value of $K_2x$ is determined under operation by artificially adding water to the slurry under measurement and observing if the size indication changes. An electronic adjustment which subtracts a constant from the size receiver output is manually adjusted to minimize size changes while artificially adding water. This $K_2x$ constant can be noted upon putting the sensors in water since as discussed after Equation 19 water has a reference attenuation of zero.

The size receiver output at $P_v = 25$ percent with a size sensor spacing of 2 inches is calculated from Equation 26 as:

$$20 \log (E/E_o) + K_2x = -P_v\alpha x = -(\tfrac{1}{4})\alpha(2) = -\alpha/2$$

(28)

Therefore, the calculated size receiver output should equal ½ the characteristic attenuation.

The size output of the instrument is directly proportional to size receiver output divided by the solids receiver output. Thus, since Equation 27 and Equation 28 gives the receiver outputs, dividing the characteristic attenuations of the slurry at the size and solids frequencies gives a calculated size output. Dividing the receiver outputs eliminates the $P_v$ variable from the size output; this explains why $P_v$ linearity is necessary for the preferred embodiment as noted earlier.

FIG. 23 shows the calculated size output versus cumulative percent +65 at a size frequency of 2,200 Khz and a solids frequency of 800 Khz for the range of $\overline{M}$, $M_\infty$, and $1n(\sigma)$ previously calculated for Magma. FIG. 24 shows the same information with a solids frequency of 1,400 Khz. The most significant difference between FIGS. 23 and 24 is the width of the error band of $P_{+65}$ for constant $\sigma$ operation. The $P_{+65}$ error caused by $M_\infty$ changes is approximately 25 percent larger with the higher solids frequency because of increased $M_\infty$ sensitivity at the higher solids frequency. This leads to the conclusion that if the solids frequency were made low enough the $P_{+65}$ correlation error to the instrument output due to $M_\infty$ changes could be minimized. A practical limit of error established by the electronics because of the low level of attenuation at lower frequencies, and the attendant loss of sensitivity, would probably prevent operation at the optimum low frequency; also the solids signal would no longer indicate $P_v$ accurately.

It was pointed out earlier that the evaulation of typical mill variations has shown that $\overline{M}$ and $1n(\sigma)$ increase or decrease together. The same computation used to develop the line shown in FIG. 19 gives the relationship $\overline{M} = (250/3) 1n(\sigma) - 50$ for the samples of FIG. 20. Using this relationship, the data of FIG. 23 is replotted in FIG. 25. Notice the reduced error band which FIG. 25 has compared to FIG. 23. The linear relationship between $\overline{M}$ and $1n(\sigma)$ makes the $M_\infty$ and $1n(\sigma)$ error effects much smaller than those observed in FIG. 23 where $\overline{M}$ and $1n(\sigma)$ are not dependent. Thus, the size output of the instrument of this invention has a much smaller error of correlation to $P_{+65}$ with the $\overline{M} = f(\sigma)$ relationship than if $1n(\sigma)$ were constant. As FIG. 19 shows $\overline{M} = f(\sigma)$ is typical.

Thus far, a minimum has been said about the frequencies of operation of the size and solids measurements. The reason is because a reasonable understanding of the preceding material is helpful in understanding the frequency selection criteria. As explained earlier, sensors operating at different frequencies may be used to derive two instrument output signals, one of which indicates particle size and the other percent solids. The actual frequencies selected for operation are dependent upon the size parameters $\overline{M}$, $M_\infty$ and $1n(\sigma)$ of the slurry to be measured and the percent solids of the slurry $P_v$. The instrument of this invention derives its "size only" signal through the mathematical operation of eliminating the percent by volume of solids variable from the receiver outputs. The receiver outputs are expressed by a modification of Equation 26 as:

$$20 \log (E/E_o) + K_2x = -P_v\alpha x$$

(29)

Division of one receiver output by the other yields: $-P_v\alpha_1x/-P_v\alpha_2x = \alpha_1/\alpha_2$
where: $\alpha_1$ and $\alpha_2$ are characteristic attenuations at different frequencies.

The $\alpha_1/\alpha_2$ function is related to the size parameters $\overline{M}$, $1n(\sigma)$, and $M_\infty$. For any log-normal sample where the distribution can be defined with two variables, the prior art shows the measurement of two attenuation ratios (i.e., $\alpha_1/\alpha_2$ and $\alpha_1/\alpha_3$) will uniquely define the sample size distribution. This requires three frequencies of operation. A graphical technique for obtaining $\sigma$ and $\overline{M}$ for a log-normal sample is given in Flammer, Supra p. A20. Flammer's work teaches that at least three frequencies are necessary to uniquely define a sample distribution, and that the distribution can be determined via a graphical technique. His teaching does not indicate that by proper selection of two frequencies a readout which correlates size distribution to a single variable can be obtained in a man made grinding circuit as discovered by applicant's. An extensive analysis program was needed to find and prove this. The analysis program, the results of which are in this disclosure, show that:

1. Attenuation is not linear with concentration but is linear with $P_v$ (percent by volume of solids) with certain defined restrictions as pointed out in Equation 17. This is important because non-linearity must be known to enable the ratio of attenuations to be correlated to particle size $(P)$.

2. Correlation of a ratio of the attenuations at two different frequencies to the percent retained on a certain size screen is possible because of the predictable manner in which a grinding circuit operates.

3. $P_v$ can be obtained by proper selection of a single operating frequency, as described earlier, or by selection of two frequencies sufficiently close together where the attenuation is linear, and $P_v$ can be defined via a subtraction of the attenuations.

Figure 2:
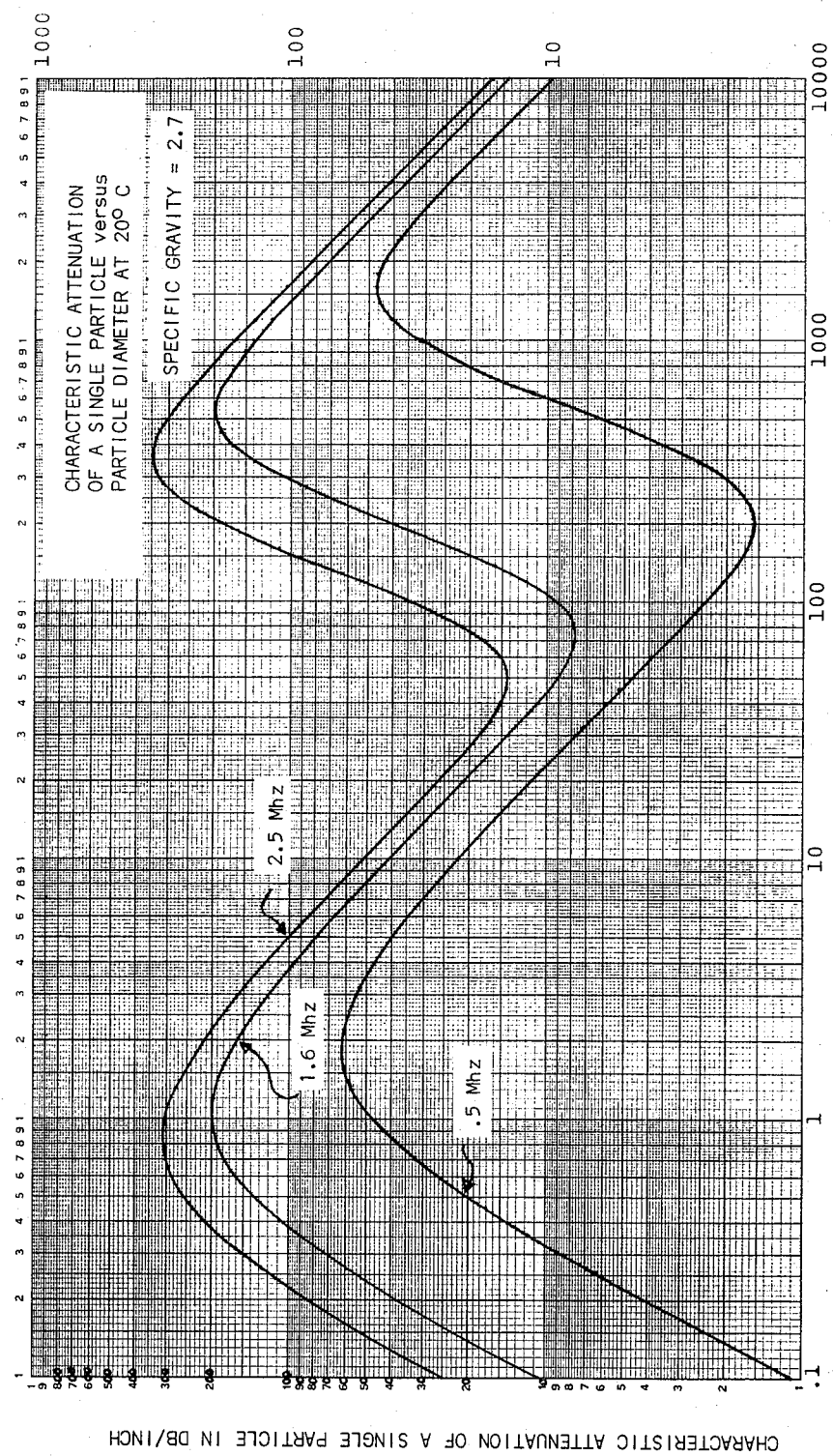
FIG. 2 is a graphical representation of the characteristic attenuation due to a single particle at three different ultrasonic frequencies versus particle size.
Figure 3:
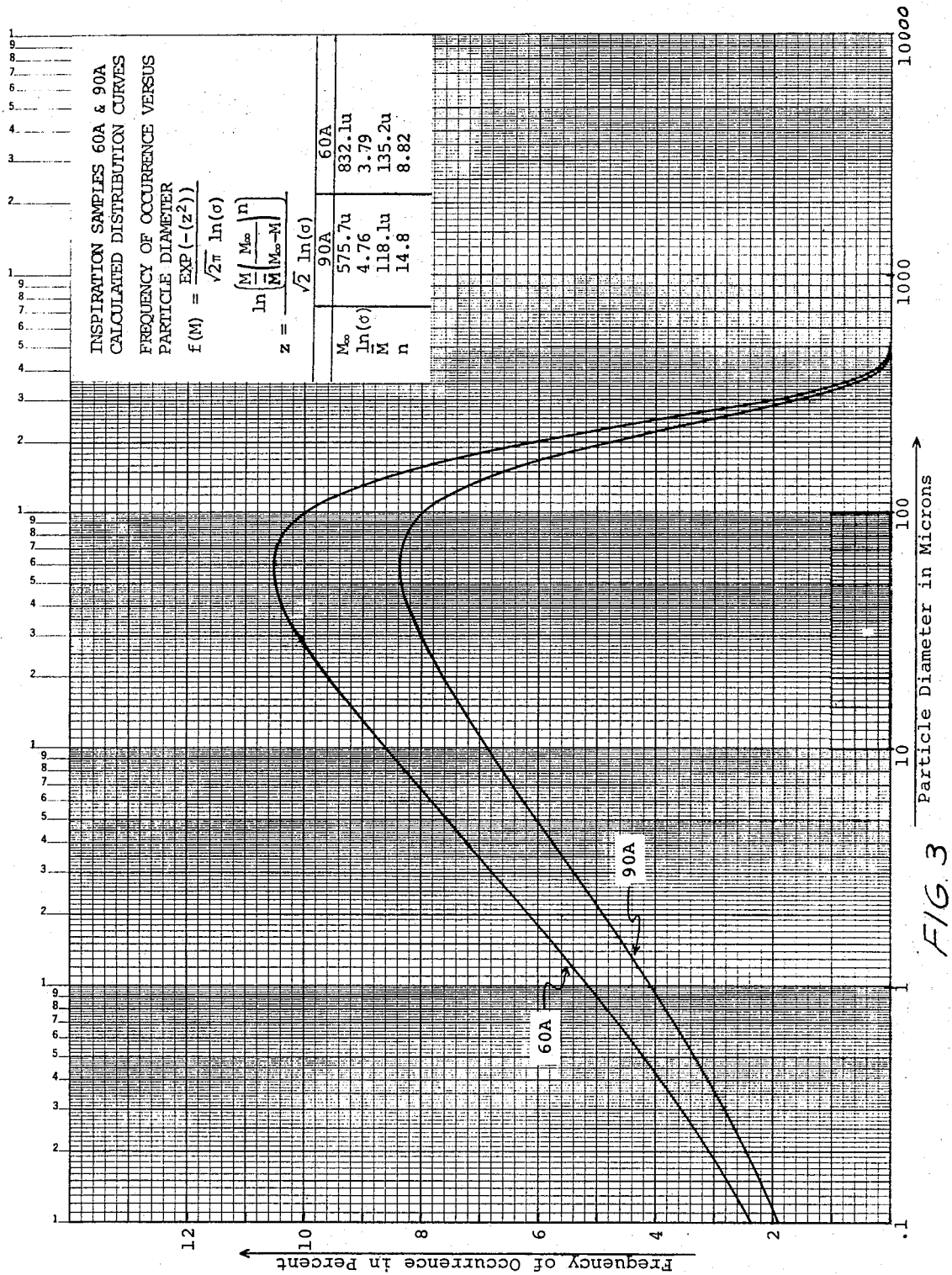
FIG. 3 is a graphical representation of the weight probability density or frequency of occurrence versus particle size for Inspiration Samples 60A and 90A.
Figure 4:
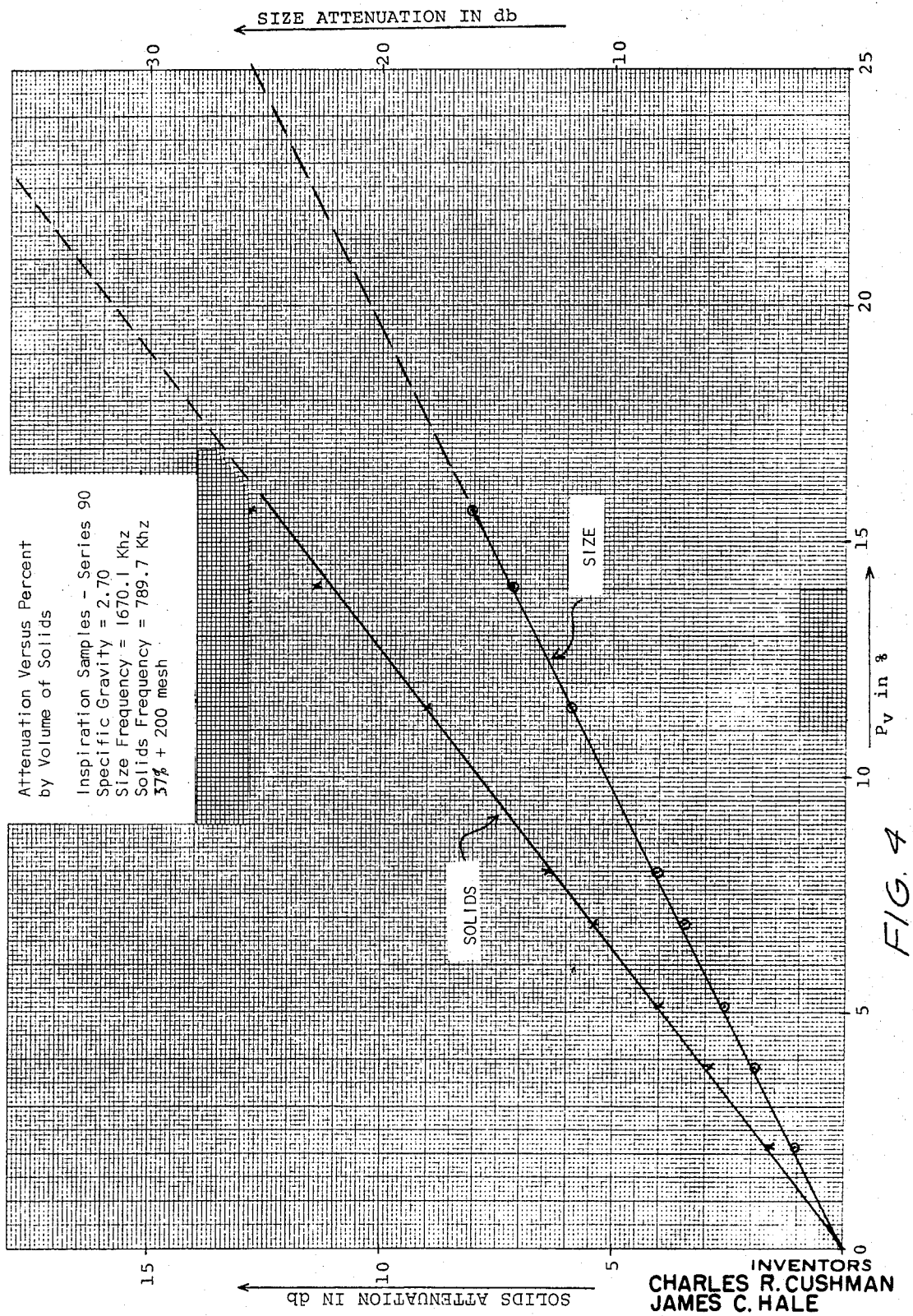
FIG. 4 is a graphical representation of attenuation versus percent by volume of solids for Inspiration Sample Series 90 at two frequencies.

From a comparison of FIGS. 23 and 24, it is seen that $\overline{M}$ and $1n(\sigma)$ interdependency cause the $P_{+65}$ correlation to $\alpha_1/\alpha_2$ to become excellent; therefore, $P_{+65}$ is a good function of $\overline{M}$, $1n(\sigma)$ and $M$ which correlates well with $\alpha_1/\alpha_2$. The specific frequencies of operation can be seen to be unimportant as long as $\alpha_1$ and $\alpha_2$ are different and $\alpha_T$ is linear with $P_v$ for the particular slurry to be measured. Thus, the possibilities of frequency selection for a given slurry are limited by system considerations only; i.e., required percent solids readout, dynamic range considerations of the electronics, and linearity of $\alpha_T$ with $P_v$. In the preferred embodiment of the invention, the solids frequency is generally lower than the size frequency and is preferably selected to give a percent solids readout which is as nearly independent of the size of the particles as possible. This frequency is determined by experimental measurements of the characteristic attenuation at the finest and coarsest grinds experienced at a particular installation. Alternatively, this frequency can be selected by use of the equations developed herein to determine the frequency at which the calculated characteristic attenuation at the finest grind equals the characteristic attenuation at the coarsest grind. In practice the frequency value is usually selected first, using screen analysis data, then is verified by actual measurement. The size frequency is also established by calculation and verified experimentally. In the first and preferred embodiment of the invention the size frequency is selected to be as high as possible to yield the maximum attenuation which can be accommodated by the electronics. This criteria provides the maximum sensitivity of the instrument to changes in particle size. When the frequencies are selected by the above criteria, sample attenuation usually falls mainly in the viscous-loss region at the solids frequency and somewhat less than half of the attenuation falls in the scattering-loss region at the size frequency. A comparison of FIGS. 2 and 3 shows the relationship between the frequency of operation, attenuation and a typical sample distribution. Although this frequency selection criteria yields excellent results and measurement accuracy, system operation is complicated because of the $K_2x$ constant of Equation 26, which must be empirically optimized to give the best system performance and is not always the same from site to site.

A second frequency selection criteria is to choose the frequencies for best correlation of the size output to a screen fraction such as cumulative percent +65 ($P_{+65}$) with no regard for the percent solids readout. The frequency selection criteria can be explained by FIGS. 22 and 23 by noticing that as the frequency is reduced, the $M_\infty$ sensitivity of the characteristic attenuation is lower because $M_\infty$ mostly affects the coarse end of the sample which, if moved into the viscous-loss to scattering-loss transition region, will have minimum effects on characteristic attenuation, see FIG. 1. Thus, if the sensitivity to $M_\infty$ of the size characteristic attenuation is lowered, the $M_\infty$ error band of FIG. 23 will be reduced for constant $\sigma$ operation. The percent solids readout could thus be lost as neither frequency would be optimized to yield the minimum sensitivity of attenuation to changes in particle size. This criterion would select both frequencies so that the sample attenuation would be almost entirely in the viscous-loss region where $\alpha_T = P_v \alpha x$ and the constant $K_2x = 0$.

A third frequency selection criteria similar to the first one involves selecting the solids frequency in the same manner but selecting a lower size frequency to minimize the effects of the $K_2x$ constant by operating with more of the sample in the viscous-loss region. In this case, the lower limit of the size frequency is determined by the gain, drift and noise characteristics of the sensors and the electronics. As the two frequencies get closer together, the two sample attenuations become more nearly equal and the $\alpha_1/\alpha_2$ size signal approaches a constant, requiring high electronic gains to measure any change. The lower size frequency also results in lower total size attenuation and lower size sensitivity, which limits the minimum size frequency by the electronics gain, drift, and noise.

In the three criteria of frequency selection discussed above, the size frequency is preferably higher than the solids frequency and the size receiver output signal is divided by the solids receiver output signal to derive the particle size reading. In the second criteria, however, the upper frequency could be selected in accordance with the first critiera for solids frequency selection which would yield the percent solids readout. The lower frequency, which would place the sample attenuation well into the viscous-loss region, would provide an output signal which is a function of both the size and number ($P_v$) of particles. Either receiver output signal could then be divided by the other as convenient, for the necessary electronics circuitry to provide the particle size output signal.

It is further contemplated that due to slurry characteristics, the frequencies of operation of the instrument of this invention may be selected to permit operation in any of the loss regions described herein or the transition regions between them. For example, extremely fine or coarse grinds may require operation entirely in the diffraction loss region. It will be appreciated by those skilled in the art that the nonlinearities in $\alpha_T$ versus $P_v$ which may result from such operation may require substantially different processing of the signals by the electronics and sensors in order to achieve the proper readouts of particle size and percent solids. Such different processing may include linearizing networks, logarithimic expansion or compression networks, the combination of signals from three or more pairs of sensors, etc. The equations derived previously may be used to define this operation.

As pointed out above, the only limitations on the present frequency selection criteria are the dynamic measurement capabilities of the instrument to measure slurry attenuation. Extension of these capabilities to measure both higher and lower attenuations accurately will make the frequency selection criteria even broader.

In the following discussion, the preferred embodiment of the invention is explained in which the size measurement frequency is determined by the dynamic range of the electronics, and solids frequency is selected to yield minimum sensitivity to particle size changes.

Referring now to FIG. 26, there is shown a block diagram of the circuitry of the particle size and percent solids monitor according to the present invention. A standard unijunction oscillator 1 drives a monostable multivibrator 2 causing it to change state in response to the pulses from oscillator 1 at the rate established by oscillator 1. The output from multivibrator 2 is applied to gate 4 which connects the output from oscillator 3 to transducer driver 17. The rate and duration of the opening of gate 4 is established by the signal received from multivibrator 2. Oscillator 3 is free-running at whatever operating frequency is selected to match the slurry characteristics as discussed earlier. When gate 4 is opened by a signal from multivibrator 2, the fixed frequency output of oscillator 3 is applied to the transducer driver 17 which provides a low impedance output signal by switching between the positive and negative terminals of the power supply at the frequency of oscillator 3. Transmitting transducer 5 is an electromechanical transducer such as a piezoelectric type adapted to convert the electrical signals received from driver 17 to high frequency sound waves. Transducer 5, along with transducers 6, 5′, and 6′ may be enclosed in a housing 16 through which slurry 18 is passed via inlet 14 and outlet 15 in such a manner that transducers 5, 6, 5′, and 6′ are in direct contact with the slurry. The ultrasonic wave generated by transmitting transducer 5 passes through slurry 18, being attenuated by slurry 18 in the manner described previously and is received by receiving transducer 6 which functions in the opposite manner from transmitting transducer 5 and converts the attenuated ultrasonic wave back into an electrical signal which is applied to the input of A.C. to D.C. converter 7, providing a substantially instantaneous measurement of the attenuation of the ultrasonic signal by the slurry. The D.C. output from converter 7 is applied to logarithmic compression circuit 8 which converts the 60 db. dynamic range input signal to a 0 to one-half volt signal for application to differential amplifier 9. Differential amplifier 9 provides a gain on the order of about 20 and the capability for introduction of an adjustable voltage, divided down from the power supply voltage to compensate the signal for the $K_2x$ constant discussed earlier. The compensated output signal from differential amplifier 9 is applied to divider 10 as the numerator which will be discussed presently.

Also included in FIG. 26 is a system 19, enclosed by dotted line 20 which will, if used, be operated at a different frequency from the system just described and may be used to provide an output which is proportional to the percent solids by volume in the slurry. System 19 may, in substance, be a duplicate of the system identified by reference numerals 2 through 9 and identified by the same numerals primed. In systems 19, monostable multivibrator 2′ changes state in response to pulses from monostable multivibrator 2 operating gate 4′ in the same manner as gate 4 was operated by multivibrator 2. The signal to multivibrator 2′ from multivibrator 2 is timed in such a manner that the ultrasonic wave emitted by transducer 5′ is not initiated until the ultrasonic wave from transducer 5 is terminated. This avoids cross talk or cross-coupling in the electronic circuitry, particularly in the more sensitive amplifier inputs. The duration of the ultrasonic waves emitted by transducers 5 and 5′ are independently adjustable at the multivibrators 2 and 2′ and may be adjusted in conjunction with the spacing between transmitting and receiving transducers 5 and 6 and 5′ and 6′ respectively to provide the maximum pulse duration possible without encountering cancellation and reinforcement effects due to reflected waves between the transducers. The output signal from amplifier 9′ of percent solids system 19 is applied to divider 10 and driver 11.

In divider 10 the signal from amplifier 9 which is a function of both particle size an percent solids is divided electronically by the signal from amplifier 9′ which is a function of percent solids and is essentially independent of particle size. The circuitry and operation of the divider 10 are essentially the same as Hybrid Systems Corporation of Burlington, Massachusetts, analog divider 106A as shown in their short form catalog SF-10-70, or analog divider M311 produced by Intronics, Inc. of Newton, Massachusetts, from their 1972 product catalog. The output of divider 10, which is the quotient obtained from the division process and is essentially a function of particle size only, is applied to driver 11. Driver 11 converts the signals from divider 10 and percent solids system 19 into standard 4–20 or 10–50 ma signals for application to particle size indicating and/or controlling devices 12 and 13 and percent solids indicating and/or controlling devices 12′ and 13′.

It will be appreciated by those skilled in the art that there are many other electronic approaches which could be used to perform the necessary steps involved in processing and comparing the signals from two pairs of transducers operating at different frequencies to yield the desired independent particle size and percent solids outputs. It should also be noted that if the percent solids of the slurry were to be maintained constant, a single pair of transducers could be used and the output signal correlated to the particle size distribution of the slurry. It is also contemplated that the percent solids data may be obtained by any suitable means.

As noted earlier, the preferred embodiment of the invention involves selection of the frequencies of operation for the size and solids measurements that yield maximum attenuation and no size sensitivity respectively. This places the operating point for the particle size measurement which is actually a composite measurement since it responds to changes in both particle size and percent solids, partially into the scattering-loss region of the characteristic attenuation curve of FIG. 1 which yields the best sensitivity to changes in the particle size distribution. Perhaps more important for this particular approach is the selection of the percent solids frequency which yields the minimum sensitivity to changes in particle size. The selection of both operating frequencies is dependent upon the average particle size and percent solids present in the particular slurry to be monitored which varies from mill to mill. The operating frequencies for most mill cyclone overflow slurries in the metallic ore milling industry appear to fall between about 0.3 and about 3.0 Mhz. This is based on particle size distribution having accumulated percents by weight of between 5 percent and 50 percent retained on a standard 100 mesh screen, for example. It will be appreciated by those skilled in the art that particle size distributions from any one ore milling operation can be identified approximately by specifying the percent by weight of the whole sample that would be retained on one standard mesh screen if the whole sample were passed through that screen — 65 mesh and 100 mesh screenings are often used by mill operators for this purpose. With slurries having wider variation in particle size distribution, a broader range of frequencies from about 0.1 to about 10 Mhz, would be required to fulfill the requirements of the selection criteria described earlier.

With reference to FIG. 26, while the system for measuring solids content 19 is a substantial duplicate of the ultrasonic particle size distribution monitor, the frequency of the oscillator 3' is chosen with respect to different criteria than the frequency of oscillator 3 in the section in which particle size information is derived. Referring to FIGS. 27 and 28, there is shown further evidence that among samples of milled ore slurry whose percent solids is intentionally varied, attenuation is a function of both the frequency of the ultrasonic signal and the relative coarseness of the particle size distribution, as well as the solids content of the slurry. The relationship between attenuation, frequency and particle size distribution is such that a preferred frequency range can be selected for the solids content measurement at which the changes in particle size distribution have little or no effect on attenuation of the applied frequency, over a wide range of variation in the percent solids in the slurry. At such a preferred frequency, changes in attenuation noted by the receiving transducer 6' of the circuit 19 in in FIG. 26 contain information pertaining substantially only to the amount of solids content of the slurry. Changes in particle size produce little or no attenuation change over normal ranges of change in particle size. Several tests of the kind illustrated by FIGS. 27 and 28 have shown that this relationship is representative of a very wide range of milled ore size distributions, and it would appear to be valid for all wet milling processes. It is also evident that the solids content frequency range will always be at a different frequency than that chosen for the section of the instrument from which particle size information is derived, where the criteria for frequency selection are sensitivity to particle size changes and placement of the mode of attenuation in the desired region as discussed earlier. Thus, when operating using a solids frequency within the preferred range, the output of the system 19 is representative only of changes in percent solids of the slurry passing transmitter and receiver transducers 5' and 6'. In the divider 10, this solids content intelligence is used to correct the output of amplifier 9 and the resulting information, relating now only to particle size, is displayed on readout device 12 and/or fed to automatic controller 13.

The results shown in FIG. 27 are from tests run with milled ore samples from the Magma Copper Company mill at San Manuel, Arizona. The Magma samples respresent a somewhat finer grind than many copper mill outputs. In the fine sample, 12.4 percent of the solids were retained on a 100 mesh screen; the coarse sample showed 16.3 percent solids on a 100 mesh screen. The samples were run at frequencies of 0.9, 1.4, 2.2 and 3.0 Mhz. During these runs the solids content was varied from 12 percent to about 21 percent by weight of solids for both samples at all frequencies. Percents by weight of solids were determined from an averaged measurement based on at least three manually collected samples. The results of these tests are shown in FIG. 27. For the Magma ore it was found that changes in attenuation due to differences in particle size distribution were minimized when the operating frequency was about 1.4 Mhz. At this frequency, the curves for the two samples, which differ significantly in particle size distribution, are coincident. It will be appreciated that the operating frequency for measurement of solids content will be chosen to provide a minimum difference in attenuation as a function of changes in particle size distribution, while providing a significant change of attenuation as a function of the change in solids content. For this same ore, the ultrasonic frequency for the composite measurement was selected as 2.2 Mhz, at which frequency a significant portion of the attenuation was in the scattering-loss region. The effects of changes in solids content on the signal from the composite measurement are proportional to the changes in signal from the portion of the system measuring solids content only. After proportioning and conditioning, the latter may be used to correct the composite measurement, therefore, to eliminate from it the effects of changes in solids content. The resultant output is representative only of particle size distribution and changes thereof.

FIG. 28 shows the results of tests similar to those plotted on FIG. 27; the data of FIG. 28 are from samples from The Pima Mining Company mill, located south of Tucson, Arizona. The finest of these milled copper ore samples showed 22.9 percent retained ore on a 100 mesh screen; the medium sample showed 28.7 percent, and the coarse sample 31.4 percent. As in FIG. 27, it will be noted that the differences in attenuation produced by these three samples of different particle size distribution are less as the frequency of the ultrasonic signal was decreased. It will further be noted that the fine sample shows the most attenuation of the three at the lowest frequency of these tests (0.53 Mhz), the medium sample is next, and the coarse sample produced the least attenuation. This reversal of the positions of these curves, from the positions of the curves of higher frequencies, shows that the peak attenuation for this range of particle size distributions is in the viscous-loss region.

Comparison of FIGS. 27 and 28 illustrates the effect that relative coarseness of grind has upon selection of proper frequencies of operation for the two sections of the particle size monitoring system. The milled ore samples from the Pima mill were considerably coarser than those from Magma San Manuel mill. This difference in range of size distribution resulted in the choice of very different operating frequencies. As may be seen by these figures, 1.4 Mhz produced a prominent separation of the three Pima samples of different size distributions, whereas at the same frequency the finer Magma samples showed no separation whatsoever. Thus, it may be seen that selection of operating frequencies for the solids content and composite measurements will be dependent upon the relative coarseness of the range of particle size distributions produced by any one ore milling facility.

Referring now to FIG. 29, there is shown a plot of the attenuation versus percent by weight of solids for three samples of ground tungsten ore. The three curves are plots of data generated by three samples of ore containing 0.8 percent scheelite in a siliceous gangue, representing respectively a coarse grind, medium (normal) grind, and a fine grind. The frequency used was 1.92 Mhz as this frequency produced significant attenuation in the scattering-loss region for all three distributions.

In addition to the sources of attenuation previously cited, attenuation of a beam of ultrasonic energy will also be caused by bubbles of gas suspended in a slurry. The amount of such attenuation is a function of frequency, number of bubbles, and bubble size as explained in "Underwater Acoustics Handbook II" by Albers 1965, pp. 47–48 and 86–100. A number of tests were conducted to determine the effects on the particle size monitor of entrained air in milled ore slurries, and the results showed that there can be a very significant degree of attenuation so produced. Care must be taken when adjusting the system receiver outputs to the water reference zero to insure that air bubbles are not present between the sensors. Air bubbles will significantly affect the water reference zero upon which slurry attenuation measurements are based. FIG. 30 shows the attenuation caused by entrained air in the classifier overflow flowstream in a typical milling circuit at the Magma Copper Company Mill in San Manuel, Arizona. Under conditions of this kind, use of the particle size monitor may not be practical without a method of compensation for the attenuation caused by entrained gas, or a means of controlling or removing some or all of the gas bubbles. As FIG. 30 illustrates, entrained gas causing most of the additional attenuation may become liberated over a period of a few minutes if the slurry is agitated only enough to maintain suspension of all particles, in an open container, trough, and the like. Alternative means may be provided to remove or control bubbles of gas which produce an objectionable level of attenuation, or which cause variations in attenuation that decrease the accuracy and reliability of particle size distribution measurements below an acceptable level. Several devices are offered commercially for the purpose of removal of entrained air in liquids. A suitable device is disclosed and claimed in U.S. Patent application Ser. No. 034,949, filed May 6, 1970, assigned to the same assignee. Tests of one specific means of entrained air removal at the Magma San Manuel facility proved that relatively large quantities of air can be effectively removed, and that the measurements of the particle size monitor on the milled ore slurry after air removal are stable, accurate, and reliable. The tests at Magma mill also indicated quite conclusively, however, that under conditions where the amount of entrained gas is essentially stable, the system of this present invention can be used with completely satisfactory results without the use of an active air removal device.

FIG. 31 shows typical recorded traces for fine, coarse and normal grind samples of milled copper ore from Duval Corporation's Esperanza Mill at Sahuarita, Arizona, with the density in percent by weight solids being the same for each sample. The monitor frequency for these runs was 1.44 Mhz.

Referring now to the strip chart recorder traces of FIGS. 32, 33, and 34, the trace of FIG. 32 is the output signal from the portion of the system monitoring only changes in percent solids; the trace of FIG. 33 shows the effect on the output signal of the particle size monitor when no signal compensation is made to correct for changes in percent solids; and, the trace of FIG. 34 shows the effect on the output of the particle size monitor when signal compensation is used.

Referring now to FIG. 35, there is shown the application of the particle size distribution monitoring system of this invention to the grinding and classification section of an ore mill. The new material is fed into a ball mill 64 or other suitable mill via inlet 62. The milled ore is discharged from the mill to a sump 66 and is transferred by a pump 68 to a classifier 70, such as a cyclone separator. The oversized material is discharged from the classifier 70 into sump 73 to be returned to the mill 64 via conduit 74 for regrinding. The amount and size of the ore returned to the regrind circuit is one factor in determining the amount of grinding required. As pointed out previoulsy, the ultrasonic monitor of this invention has a degree of sensitivity to the presence of air bubbles and it is desired to maintain the amount of entrained air either relatively constant or to provide means, such as special air removal apparatus or baffles or a series of sump tanks, to stabilize the entrained air before the measurement of particle size distribution is made. It is to be understood that the term stabilize is intended to encompass the removal of all entrained air. To this end an air stabilization or removal means 76 is positioned in the sampling line 78 from the classifier overflow sump 84 of classifier 70 to stabilize the entrained air in the slurry. The measuring station for the ultrasonic transducers 80 is positioned downstream of the air removal means in a flow line or in a sump 77. If there is a tendency for any settling out to occur, an agitation means 79 is provided to stir the slurry and maintain the particles suspended to present a uniform sample to the sensors for measurement. It will be appreciated that where the flow rate is sufficient to avoid settling additional agitation may not be required. The output signals from these transducers are responsive to both particle size distribution and percent solids in the slurry, as previously stated. When the contribution to the signal of percent solids has been corrected by the instrument 82, the resulting signal provides information representative only of changes occurring in particle size distribution of the milled ore. This resultant signal may be used to automatically adjust feed rate controller 72 to regulate the amount of unmilled ore fed to the circuit for grinding.

The operation of this invention has been verified under actual mill operating conditions through an extensive series of tests at the Magma Copper Company Mill in San Manuel, Arizona, supplemented by numerous other tests at several other sites. In most of these tests, the particle size monitor system of this present invention was located in the mill circuit as shown in FIG. 35. In the Magma tests the system was used to monitor changes in particle size distribution, but was not so connected as to provide automatic control, and was operated as previously described, with continuous correction for changes in solids content, connected as shown in FIG. 26.

In other tests conducted on site at other copper milling companies in Arizona, the particle size monitor system has been set up as shown in FIG. 35 and has been connected so as to automatically control the rate of new feed delivered to the grinding mill. On another test the instrument of this invention has enabled control and stabilization of a mill grinding circuit to a better degree than ever achieved before with a resultant improvement in ore throughput through the mill at a more stable grind. In this test the output from the particle size and percent solids monitor was also used to control new ore feed but was done indirectly through adjustment of classifier dilution water which caused the classifier operating characteristics to change which in turn, through other sensing means, caused the new ore feed to be adjusted. It will be obvious to those skilled in the art of grinding mill control, that there are many control circuits that may be devised to take advantage of the continuous particle size readout of this invention to effect the much needed control of the grinding mill circuit. The optimum control system will depend largely upon the ore and mill circuit characteristics present at any given site of installation of the particle size and percent solids monitor system of this invention.

In one series of tests, for example, the particle size monitor system was set up to record on a strip chart, changes in particle size distribution in the flowstream of the classifier overflow. Six samples of slurry were taken at random intervals during test period lasting several hours. The samples were labeled and the sample number marked on the strip chart recorder at the precise point in time at which the corresponding sample was drawn.

After the test the samples were analyzed, using conventional mesh analysis techniques, and the cumulative percentage of the total sample retained on several different sized screens was recorded for each sample.

The cumulative percent retained on a 65 mesh screen was plotted against the output of the instrument of this invention as determined from the readings on the strip chart recorder, as shown in FIG. 36. The best straight line fit to these points, the solid line in the center of the group, was derived via computer solution of the estimating equation, $y = a + bx$, a statistical method frequently used to establish the degree of linear correlation between two variables. Included in the computer print-out was the value for the standard estimating equation, yielding in this case, $y -10.46 + 0.559x$ and the value of the standard error of estimate, $Sxy$, of 0.131. Values of $\pm Sxy$ and $\pm 2Sxy$ are drawn on the plot of FIG. 36 to provide a measure of accuracy of the instrument of this invention since $\pm 2Sxy$ accounts for a confidence level of 95.4 percent. From FIG. 36 it can be seen that with an instrument reading of 28.5db, the cumulative percent retained on a 65 mesh screen is $5.5\% \pm 0.26\%$, with a confidence level of 95.4 percent.

Another measure of the instrument accuracy is provided by the "coefficient of correlation" (a quantity defined in statistics as the square root of the "explained variation" divided by the "total variation"). Perfect correlation would occur if all the data points were found to lie on a straight line, and the coefficient of correlation would have a value of 1.00. The coefficient of correlation for the test run plotted in FIG. 38 is a 0.997, or nearly perfect correlation between the indications of the instrument of this invention and the mesh analysis data.

The instrument of this invention is designed to provide a continuous measurement of the particle size distribution and the percent solids by volume contained within a slurry sample continuously withdrawn from a process flowstream such is found in a typical metallic ore concentration plant (mill). Since the instrument provides outputs which are representative of the entire sample, it will be appreciated that in order to maintain the best accuracy of measurement a substantially homogeneous sample or a sample with constant deviation from homogeneity must be presented to the instrument sensors. Any segregation of the particles which is allowed to occur will produce errors in the measurement of particle distribution and/or percent solids. In practice, precautions taken to assure a homogeneous sample, include agitation of the sump of slurry in which the sensors are located, sample flow velocity sufficient to prevent particle segregation and flow orientation such that the volume distribution of the particles is either uniform or constant in the cross section of slurry through which the ultrasonic signals are passed.

In a preferred embodiment of the invention, FIG. 37, the transducer means 100 for coupling the ultrasonic energy to the fluid medium containing suspended particles (slurry), the size distribution and percent solids of which are to be measured, are oriented to transmit and receive ultrasonic energy in a single plane through which the slurry is passed. The spacing between each of a pair of transducers comprising transmitter 102 and receiver 103 and transmitter 106 and receiver 108 may be varied to adjust the total attenuation of the ultrasonic signal by the slurry. A flow diverter 110 also shown in FIG. 37 is positioned so as to increase the velocity of the slurry across the surface of the transducers to minimize the deposit of solid material on the faces of the transducers. Piezoelectric type transducers are used in the preferred embodiment of the invention but it will be appreciated by those skilled in the art that any suitable transducer device capable of converting an electrical signal into a mechanical motion and a mechanical motion into an electrical signal could be used, such as an electromagnetic transducer and the like. It will be obvious that the two measurements could be made by placing the two pairs of transducers, one above the other or side by side in a pipe, trough, chamber or launder or the like. An important requirement on transducer placement is to assure continuous contact between the transducers and the slurry to be measured and provide for measurement of essentially the same block of slurry at the same time with both pairs of transducers. The slurry may be in the form of a continuous flowstream or an agitated non-flowing body of slurry to assure that the sample being measured is homogenous. The single plane orientation wite slurry flowing upward between the transducers as shown in FIG. 37 is preferred because it minimizes the effect of measurement errors due to a non-uniform distribution of particles in the slurry since both pairs of transducers are effectively looking through the same slurry sample at the same time. This embodiment is compatible with the electronics apparatus shown in block diagram form in FIG. 26.

Another method of performing the same measurement but using only one pair of transducers, a transmitter 26 and receiver 28 suitable for operation at two different frequencies is shown in block diagram form in FIG. 38. Operation of this apparatus is substantially the same as previously described referring to FIG. 26 except as described below; Simultaneously with the application of signal from multivibrator 2 to gate 4 which applies the signal from oscillator 3 to transducer driver 17, a signal from multivibrator 2 is applied to electronic switches 22 and 24. Upon receipt of these signals, electronic switch 22 connects the output signal from driver 17 to transmitting transducer 26 and electronic switch 24 connects the output signal from receiving transducer 28 to the input of converter 7. After a preset delay, to allow time for the ultrasonic signal to pass through the slurry from transmitting transducer 26 to receiving transducer 28, a signal is sent from multivibrator 2 to multivibrator 2' causing it to change state. Simultaneously with the signal to multivibrator 2' the signal from multivibrator 2 to electronic switches 22 and 24 changes state causing them to connect transmitting transducer 26 to driver 17' and receiving transducer 28 to converter 7' respectively. The signal to multivibrator 2' causes it to change state, sending a signal to gate 4'. Upon receipt of this signal gate 4' connects the output of oscillator 3' to transducer driver 17'. In this manner, the signal from driver 17' which is at a different frequency than driver 17 is applied to transmitting transducer 26. This cycle repeats itself at the rate established by unijunction oscillator 1 which may be set to be compatible with the transit time of the ultrasonic signals through the slurry and the desired durations of the signals from transducer drivers 17 and 17'. The balance of the circuitry functions substantially as described earlier for the 2 transducer pair arrangement of FIG. 26.

It will also be appreciated by those skilled in this art that a sensor 112 utilizing a single transmit and receiver transducer 114 with reflector means 116 as shown in FIG. 39 could be used in a sensor. Such a system is shown in block diagram form in FIG. 40. Unijunction oscillator 1 provides a series of pulses to clock 36 establishing the rate at which the measurement cycle described below repeats. Signals from clock 36 are simultaneously applied to gate 4 and electronic switch 30 such that when driver 17 is energized by the signal from oscillator 3 by gate 4 the output of driver 17 is connected to transducer 32 by electronic switch 30. As soon as the burst from driver 17 is complete a signal from clock 36 causes electronic switch 30 to connect transducer 32 to the input of converter 7. The ultrasonic signal from transducer 32 traverses across the slurry to reflector 34 where it is reflected back to transducer 32 which is now acting as a receiver with its output connected to converter 7. Clock 36 then provides simultaneous signals to multivibrator 2' and electronic switch 30 which causes electronic switch 30 to connect transducer 32 to the output of driver 17' and causes driver 17' to be energized by the signal from oscillator 3' by way of gate 4'. Again, as before, when the burst from driver 17' is complete, clock 36 deliver a signal to electronic switch 30 causing it to connect transducer 32 to the input of converter 7'. It will be appreciated by those skilled in the art that the duration of bursts from drivers 17 and 17', the timing of these bursts, the timing of signals to electronic switch 30 and the spacing between transducer 32 and reflector 34 must be adjusted properly to allow operation under this method.

It is also contemplated by the inventors that three or more transducer pairs might be used. Such an approach may provide substantially better measurement accuracy by proper selection of three or more different frequencies to give a percent solids signal independent of size variations when such size variations are large using two closely spaced frequencies for percent solids measurement and/or a separate particle size distribution output using two frequencies chosen to provide optimum particle size accuracy independent of percent solids variation as discussed earlier.

What is claimed is:

1. A particle size distribution monitor which comprises a source of ultrasonic energy, transducer means connected to said source and positioned to transmit and receive a beam of ultrasonic energy through a continuous flowing fluid sample containing a known percent by volume of particles in suspension, means adapted to make an instantaneous measurement of the attenuation of the beam in passing through the slurry and develop a single output signal representative of the total particle size distribution of the sample.

2. The particle size distribution monitor of claim 1 wherein the transducer means includes a transmitter transducer and a receiver transducer with the transmitter being positioned to transmit ultrasonic energy through a fluid containing particles in suspension and the receiver being positioned to receive the transmitted signal.

3. The particle size distribution monitor of claim 1 including air stabilizing means adapted to stabilize the entrained air in a sample being measured.

4. The particle size distribution monitor of claim 1 including agitation means adapted to establish and maintain substantially uniform particle suspension in the slurry.

5. A particle size distribution monitor which comprises a first source of ultrasonic energy, transducer means connected to said first source and positioned to transmit and receive a first beam of ultrasonic energy through a fluid containing particles in suspension, means adapted to measure the attenuation of said first beam in passing through the slurry and develop an output signal representative thereof, a second source of ultrasonic energy operating at a frequency different from the first source, said transducr means being connected to said second source in timed relation with the connection of the transducer with said first source and positioned to transmit and receive a second beam of ultrasonic energy through the fluid containing particles in suspension, means adapted to measure the attenuation of said second beam in passing through the slurry and develop an output signal representative thereof and means for modifying one output signal with the other output signal to produce a resultant signal representative of the particle size distribution of the suspended particles.

6. The particle size monitor of claim 5 wherein the transducer means connected to said first and second sources of ultrasonic energy is positioned such that the ultrasonic beams lie in the same plane.

7. The particle size monitor of claim 5 wherein the frequency of one source is selected such that the attenuation thereof as a function of shift in particle size distribution of suspended particles is substantially constant.

8. The particle size monitor of claim 5 wherein the transducer means includes a transmitter transducer and a receiver transducer with a transmitter being positioned to transmit ultrasonic energy through the fluid containing particles in suspension and a receiver being positioned to receive the transmitted signal.

9. The particle size distribution monitor of claim 5 including air stabilizing means adapted to stabilize the entrained air in a sample being measured.

10. The particle size distribution monitor of claim 5 including agitation means adapted to establish and maintain substantially uniform particle suspension in the slurry.

11. The particle size monitor of claim 5 including a transducer means connected to each of said two sources of ultrasonic energy.

12. A particle size distribution monitor which comprises a source of ultrasonic energy adapted to generate two ultrasonic signals of different frequencies, transducer means connected to said ultrasonic source positioned and adapted to transmit and receive a beam of one ultrasonic frequency and then another in timed relation therewith through a fluid containing particles in suspension, means adapted to measure the attenuation of each beam in passing through the slurry and develop an output signal representative thereof and means for modifying one output signal with the other output signal to produce a resultant signal representative of the particle size distribution of the suspended particles.

13. The particles size monitor of claim 12 wherein one frequency of the source is selected such that the attenuation thereof as a function of shift in particle size distribution of suspended particles is substantially constant.

14. The particle size distribution monitor of claim 12 including air stabilizing means adapted to stabilize the entrained air in a sample being measured.

15. The particle size distribution monitor of claim 12 including agitation means adapted to establish and maintain substantially uniform particle suspension in the slurry.

16. The particle size monitor of claim 12 wherein the transducer means connected to said source of two beams of ultrasonic energy is positioned such that the ultrasonic beams lie in the same plane.

17. A particle size distribution monitor according to claim 12 including a further source of ultrasonic energy adapted to generate ultrasonic energy at one other frequency, transducer means connected to said further source positioned and adapted to transmit and receive a beam of ultrasonic energy through said fluid containing particles in suspension, means adapted to measure the attenuation of said beam in passing through the slurry and develop a further output signal representative thereof and means for modifying the further output signal with one of said other output signals to produce a resultant signal representative of the percent by volume of solids in the slurry.

18. The particle size monitor of claim 12 wherein the transducer means includes a transmitter transducer and a receiver transducer with a transmitter being positioned to transmit ultrasonic energy through the fluid containing particles in suspension and a receiver being positioned to receive the transmitted signal.

19. A particle size and percent solids monitor which comprises a source of ultrasonic energy, transducer means connected to said source and positioned to transmit and receive a beam of ultrasonic energy through a fluid containing particles in suspension, means adapted to measure the attenuation of the transmitted beam in passing through the fluid containing particles in suspension and produce an output signal representative thereof, means for measuring percent solids adapted to develop an output signal representative of the percent solids in the fluid containing particles in suspension and modifying one output signal with the other output signal to produce a resultant signal representative of the particle size distribution of the suspended particles.

20. The particle size and percent solids monitor of claim 19, wherein the frequency of the ultrasonic energy is selected such that the attenuation of the ultrasonic beam differs significantly as the particle size distribution of the suspended particles becomes more corase or more fine.

21. The particle size and percent solids monitor of claim 19, wherein the frequency of the ultrasonic energy is selected such that the attenuation of the ultrasonic beam is due substantially to scattering-loss wherein the attenuation increases with the particle size distribution of the suspended particles becoming more coarse and decreases with the particle size distribution of the suspended particles becoming more fine.

22. The particle size distribution monitor of claim 19 including air stabilizing means adapted to stabilize the entrained air in a sample being measured.

23. The particle size distribution monitor of claim 19 including agitation means adapted to establish and maintain substantially uniform particle suspension in the slurry.

24. The particle size and percent solids monitor of claim 19 wherein the means of measuring percent solids comprises a second source of ultrasonic energy, transducer means connected to said second source and positioned to transmit and receive a beam of ultrasonic energy through the fluid containing particles in suspension and means adapted to measure the attenuation of the transmitted beam passing through the fluid containing particles in suspension and produce an output representative thereof, wherein the frequency of the second source of ultrasonic energy is selected to be at a frequency different from the first source and such that the attenuation thereof is substantially unaffected by typical changes in particle size distribution in a particular fluid suspension of particles.

25. The particle size and percent solids monitor of claim 19 wherein the means of measuring percent solids comprises a second source of ultrasonic energy, transducer means connected to said source and positioned to transmit and receive a beam of ultrasonic energy through the fluid containing particles in suspension and means adapted to measure the attenuation of the transmitted beam passing through the fluid containing particles in suspension and produce an output representative thereof, wherein the frequency of the first source of ultrasonic energy is selected such that the attenuation of the ultrasonic beam is due substantially to viscous loss, scattering loss and/or diffraction loss and the frequency of the second source of ultrasonic energy is selected such that the attenuation of the ultrasonic beam as a function of changes in particle size is substantially constant.

26. The particle size and percent solids monitor of claim 19 wherein the means of measuring percent solids comprises a second source of ultrasonic energy adapted to be connected to the transducer means in timed sequential relation to the connection thereto of the first source of ultrasonic energy and the frequency of the second source of ultrasonic energy is selected to provide a substantially constant attenuation of the transmitted signal as a function of shift in the particle size distribution of the suspended particles.

27. The particle size and percent solids monitor of claim 24 wherein the frequency of the first source of ultrasonic energy is selected to be at a higher frequency than the frequency of the second source.

28. The particle size and percent solids monitor of claim 25 wherein the frequency of the first source of ultrasonic energy is selected to be at a frequency higher than that of the second source.

29. The particle size and percent solids monitor of claim 25 wherein the frequency of the first source of ultrasonic energy is selected such that the attenuation of the ultrasonic beam is due substantially to scattering-loss wherein the attenuation increases with the particle size distribution of the suspended particles becoming more coarse and decreases with the particle size distribution becoming more fine. attenuation 30. A particle size monitor which comprises a first source of ultrasonic energy adapted to generate a first frequency, transducer means connected to said first ultrasonic source positioned and adapted to transmit and receive a first beam of ultrasonic energy through a fluid containing particles in suspension, means adapted to measure the attenuation of the transmitted beam in passing through the fluid containing particles in suspension and produce first output signal representative thereof, a second source of ultrasonic energy adapted to generate a second frequency different from said first, transducer means connected to said second ultrasonic source positioned and adapted to transmit and receive a second beam of ultrasonic energy through the fluid, means adapted to measure the attenuation of the transmitted beam passing through the fluid containing particles in suspension and produce a second output signal representative thereof, and means for modifying said first output signal with said second output signal to produce a resultant signal representative of the particle size distribution of the suspended particles.

31. The particle size monitor of claim 30 including a third source of ultrasonic energy adapted to generate a third frequency, transducer means connected to said third source positioned and adapted to transmit and receive a third beam through the fluid containing particles in suspension, means adapted to measure the attenuation of the third beam in passing through the slurry and develop a third output signal representative thereof and means for modifying said third output signal with a selected one of said first and second output signals to produce another resultant signal representative of the percent by volume of particles in the fluid suspension.

32. The particle size distribution monitor of claim 30 wherein the transducer means includes a transmitter transducer and a receiver transducer with the transmitter being positioned to transmit ultrasonic energy through a fluid containing particles in suspension and the receiver being positioned to receive the transmitted signal.

33. The particle size distribution monitor of claim 30 including air stabilizing means adapted to stabilize the entrained air in a sample being measured.

34. The particle size distribution monitor of claim 30 including agitation means adapted to establish and maintain substantially uniform particle suspension in the slurry.

35. The particle size monitor of claim 30 wherein the transducer means connected to said first and second sources of ultrasonic energy is positioned such that the ultrasonic beams lie in the same plane.

36. A method of monitoring the particle size distribution of particles suspended in a fluid medium under dynamic conditions which comprises the steps of transmitting a first beam of ultrasonic energy of one frequency through the fluid containing suspended particles, detecting the attenuated beam after passing therethrough, developing a first signal representative of the attenuation of the first beam, transmitting a second beam of ultrasonic energy of a different frequency than the first through the fluid containing suspended particles, detecting the attenuated beam after passing therethrough, developing a second signal representative of the attenuation of the second beam and modifying said first signal with said second signal to produce a resultant signal representative of the particle size distribution of the suspended particles.

37. The method of claim 36 wherein the frequency of one of said beams of ultrasonic energy is selected such that the attenuation thereof is due substantially to scattering-loss wherein the attenuation increases with particle size distribution of the suspended particles becoming more coarse and decreases with the particle size distribution of the suspended particles becoming more fine.

38. The method of claim 36 wherein the frequency of one of said beams of ultrasonic energy is selected to provide a substantially constant attenuation of the transmitted signal as a function of shift in particle size distribution of the suspended particles.

39. The method of claim 36 wherein the frequency of the first beam of ultrasonic energy is selected such that the attenuation of the ultrasonic beam is due substantially to viscous loss, scattering loss and/or diffraction loss.

40. The method of claim 36 including the step of stabilizing any entrained air in the fluid suspension.

41. The method of claim 36 including the step of agitating the sample to establish and maintain a substantially uniform particle suspension in the slurry.

42. The method of claim 36 including transmitting a third beam of still another frequency through the fluid containing suspended particles, detecting the attenuated beam after passing therethrough, developing a third signal reprsentative of the third beam and modifying the third signal with a selected one of said first and second signals to produce another resultant signal representative of the percent by volume of particles in fluid suspension.

43. A method of monitoring the particle size distribution of particles in a fluid medium under dynamic conditions which comprises the steps of transmitting a beam of ultrasonic energy through the fluid containing suspended particles, detecting the attenuated beam after passing therethrough, developing a first output signal representative of the attenuation of the beam, measuring the percent by volume of particles in suspension and developing a second output signal representative thereof modifying said first output signal with the second output signal to produce a resultant signal representative of the particle size distribution of the suspended particles.

44. The method of claim 43 wherein the frequency of the beam of ultrasonic energy is selected such that the attenuation of the ultrasonic beam is due substantially to viscous loss, scattering loss and/or diffraction loss.

45. A method of monitoring the particle size distribution of particles suspended in a fluid medium under dynamic conditions which comprises the steps of transmitting a beam of ultrasonic energy through the fluid containing suspended particles, maintaining the percent by volume of particles in suspension substantially constant, detecting the attenuated beam after passing therethrough, and developing a signal representative of the attenuation of the beam and of the particle size distribution.

46. The method of claim 45 including the step of stabilizing any entrained air in the fluid suspension.

47. The method of claim 45 including the step of agitating the sample to establish and maintain a substantially uniform particle suspension in the slurry.

48. A method of monitoring the particle size distribution of particles suspended in a fluid medium under dynamic conditions which comprises the steps of transmitting a first beam of ultrasonic energy through the fluid containing suspended particles, detecting the attenuated beam passing through the fluid containing suspended particles, developing a first signal representative of the attenuation of the first beam, transmitting a second beam of ultrasonic energy of a frequency different than the first through the fluid, developing a second signal representative of the changes in attentuation of the second ultrasonic beam as a function of changes in solids content of the fluid containing suspended particles, and modifying one output signal with the other output signal to produce a resultant signal representative of the particle size distribution of the suspended particles.

49. A method of monitoring the particle size and percent solids distribution of particles suspended in a fluid medium according to claim 48 wherein the second signal is developed as a function of a received beam of ultrasonic energy transmitted through the slurry, the frequency of which is selected to provide a substantially constant attenuation of the transmitted signals with shifts in the particle size distribution of the suspended particles, such that the second signal is representative of the attenuation resulting from changes in percent by volume of solids in the fluid containing particles in suspension.

50. The method of claim 48 wherein the frequency of the first and second source of ultrasonic energy are selected such that the difference between the frequencies thereof is sufficient to produce readily distinguishable attenuation levels therebetween in passing through a slurry of suspended particles to be measured.

51. The method of claim 48 wherein the frequency of the first source of ultrasonic energy is selected such that the attenuation of the first source of ultrasonic energy is due substantially to viscous loss, scattering loss and/or diffraction loss and the frequency of the second source of ultrasonic energy is selected such that the attenuation of the ultrasonic beam as a function of changes in particle size is substantially constant.

52. The method of claim 48 wherein the frequency of the first source of ultrasonic energy is selected to be higher than the frequency of the second source of ultrasonic energy.

53. The method of claim 48 wherein the frequency of the first source of ultrasonic energy is selected such that the attenuation of the ultrasonic beam is due substantially to scattering loss wherein the attenuation increases with particle size distribution of the suspended particles becoming more coarse and decreases with the particle size distribution becoming more fine.

54. The method of claim 48 including the step of stabilizing any entrained air in the fluid suspension.

55. The method of claim 48 wherein the frequency of the first beam of ultrasonic energy is selected such that the attenuation of the ultrasonic beam is due substantially to viscous loss, scattering loss and/or diffraction loss.

56. The method of claim 49 including the step of stabilizing any entrained air in the fluid suspension.

57. The method of claim 49 including the step of agitating the sample to establish and maintain a substantially uniform particle suspension in the slurry.

* * * * *